United States Patent
Swoboda et al.

(10) Patent No.: US 12,030,216 B2
(45) Date of Patent: Jul. 9, 2024

(54) METHOD FOR SEPARATING WAFERS FROM DONOR SUBSTRATES

(71) Applicant: Siltectra GmbH, Dresden (DE)

(72) Inventors: Marko David Swoboda, Dresden (DE); Christian Beyer, Freiberg (DE); Ralf Rieske, Dresden (DE); Albrecht Ullrich, Dresden (DE); Jan Richter, Dresden (DE)

(73) Assignee: Siltectra GmbH, Dresden (DE)

( * ) Notice: Subject to any disclaimer, the term of this patent is extended or adjusted under 35 U.S.C. 154(b) by 0 days.

(21) Appl. No.: 18/454,474

(22) Filed: Aug. 23, 2023

(65) Prior Publication Data

US 2023/0390961 A1     Dec. 7, 2023

Related U.S. Application Data

(63) Continuation of application No. 16/637,877, filed as application No. PCT/EP2018/071438 on Aug. 7, 2018, now Pat. No. 11,787,083.

(30) Foreign Application Priority Data

Aug. 11, 2017   (DE) .......................... 102017007586.7

(51) Int. Cl.
*B28D 5/00* (2006.01)
*B23K 26/00* (2014.01)
(Continued)

(52) U.S. Cl.
CPC ........ *B28D 5/0011* (2013.01); *B23K 26/0006* (2013.01); *B23K 26/53* (2015.10); *B28D 5/0064* (2013.01); *B23K 2103/56* (2018.08)

(58) Field of Classification Search
CPC .... B28D 5/0011; B28D 5/0064; B23K 26/53; B23K 26/0006; B23K 2103/56
(Continued)

(56) References Cited

U.S. PATENT DOCUMENTS 10,112,256 B2 * 10/2018 Hirata ................ B23K 26/0853
10,562,130 B1 *  2/2020 Donofrio ................ H01L 22/12
(Continued)

FOREIGN PATENT DOCUMENTS

DE     102016201780 A1    8/2016
DE     102015008037 A1   12/2016
(Continued)

*Primary Examiner* — Omar Flores Sanchez
(74) *Attorney, Agent, or Firm* — Murphy, Bilak & Homiller, PLLC

(57) ABSTRACT

A method for separating wafers from donor substrates incudes: determining at least one individual property of a respective donor substrate, the at least one individual property including doping and/or crystal lattice dislocations of the respective donor substrate; generating donor substrate process data for the respective donor substrate, the donor substrate process data including analysis data of the analysis device, the analysis data describing the at least one individual property of the respective donor substrate; generating, via a laser device, modifications inside the respective donor substrate to form a separating region inside the respective donor substrate, the laser device being operable as a function of the donor substrate process data of the respective donor substrate; and generating mechanical stresses inside the respective donor substrate to initiate and/or guide a crack for separating at least one wafer from the respective donor substrate.

18 Claims, 19 Drawing Sheets

(51) Int. Cl.
*B23K 26/53* (2014.01)
*B23K 103/00* (2006.01)

(58) Field of Classification Search
USPC .............................................. 225/2, 96, 96.5
See application file for complete search history.

(56) References Cited

U.S. PATENT DOCUMENTS

| | | | |
|---|---|---|---|
| 10,940,611 B2* | 3/2021 | Iancu | B28D 5/0011 |
| 11,024,501 B2* | 6/2021 | Donofrio | H01L 21/304 |
| 11,201,126 B2* | 12/2021 | Priewasser | H01L 24/04 |
| 2013/0040466 A1* | 2/2013 | Abe | B23K 26/0823 |
| | | | 257/E21.347 |
| 2018/0126484 A1* | 5/2018 | Richter | B28D 5/0011 |
| 2019/0366586 A1* | 12/2019 | Rieske | B23K 26/53 |
| 2020/0051831 A1 | 2/2020 | Beyer | C30B 29/36 |
| 2020/0164470 A1* | 5/2020 | Booth | B23K 26/0622 |
| 2020/0388538 A1* | 12/2020 | Swoboda | C30B 33/00 |

FOREIGN PATENT DOCUMENTS

| | | |
|---|---|---|
| DE | 102017003830 A1 | 10/2018 |
| WO | 2011066491 A2 | 6/2011 |
| WO | 2016083610 A2 | 6/2016 |

* cited by examiner

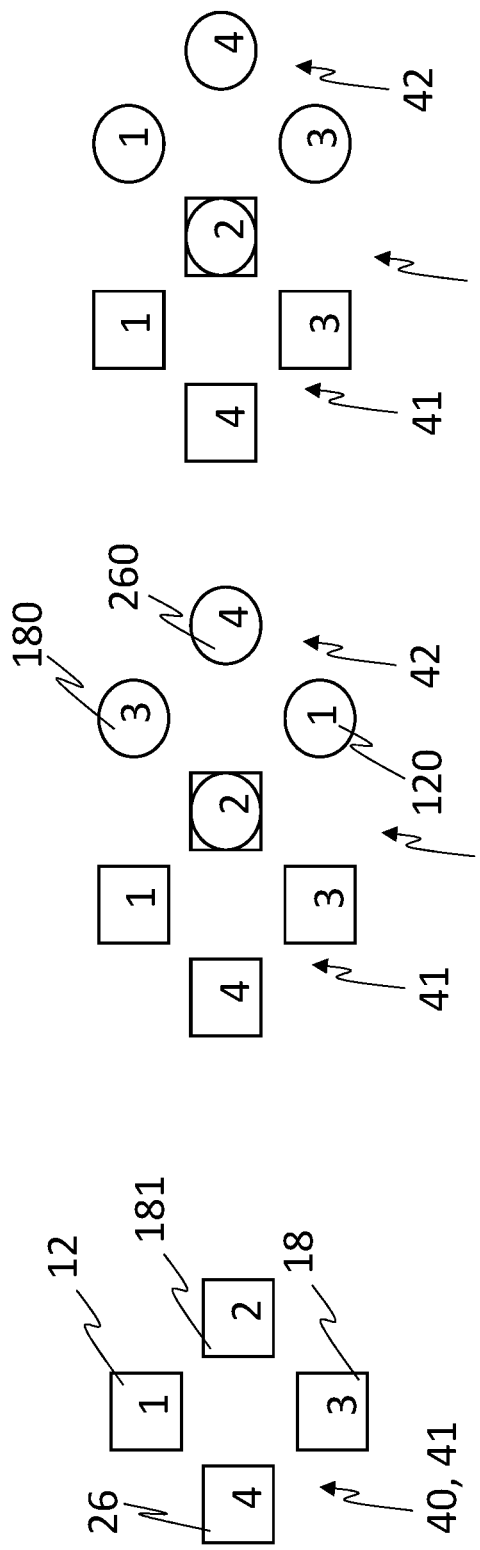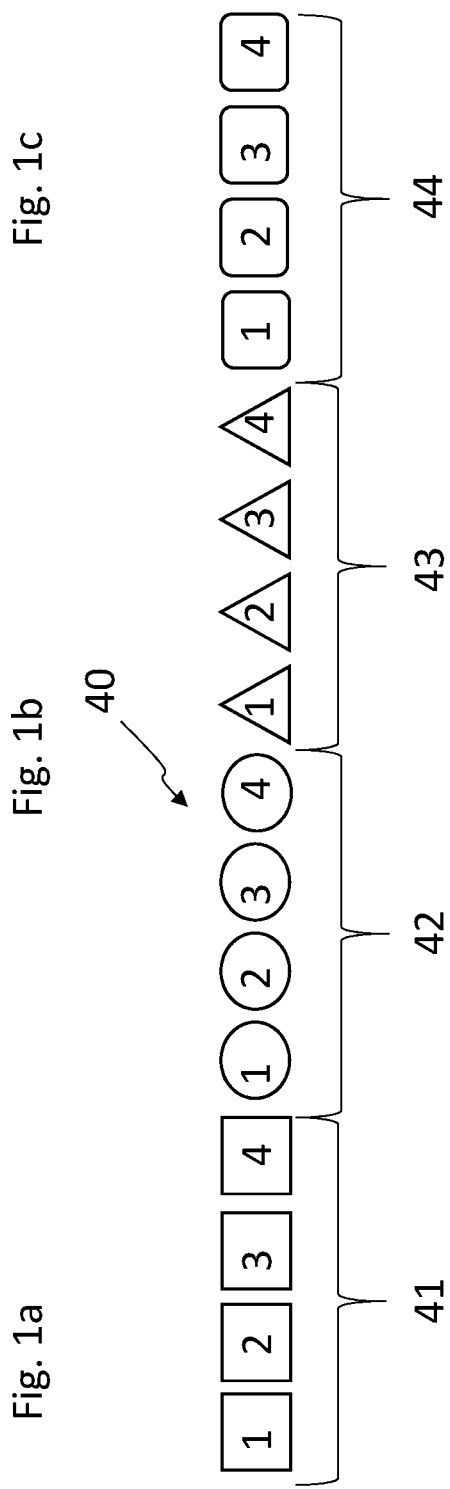

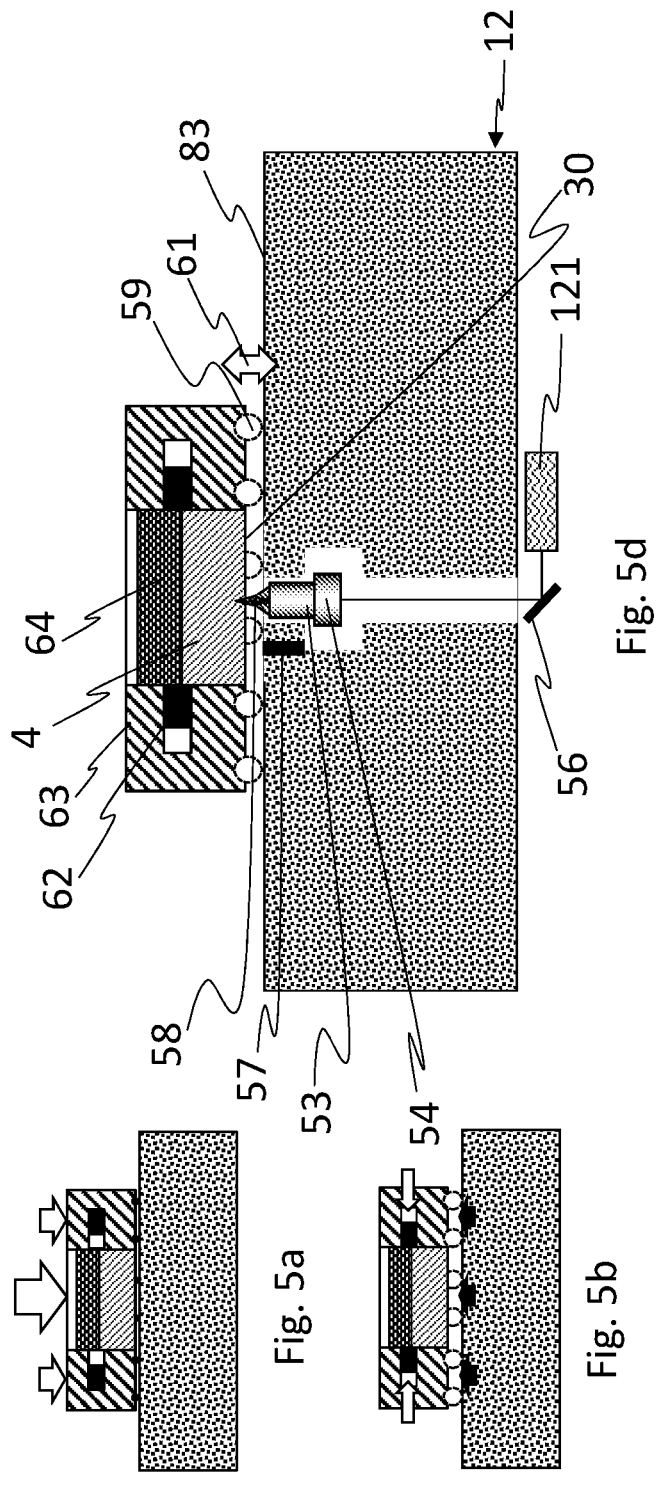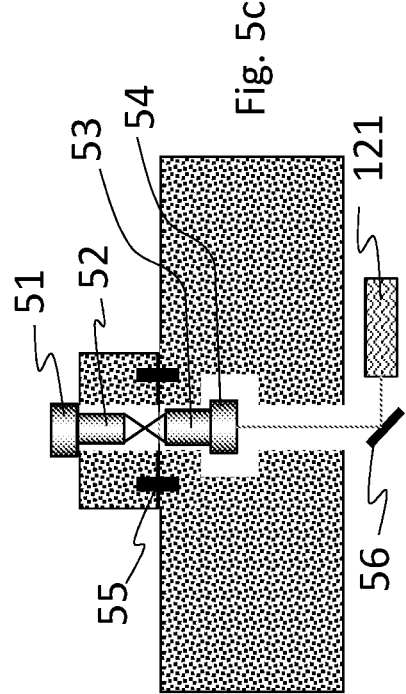

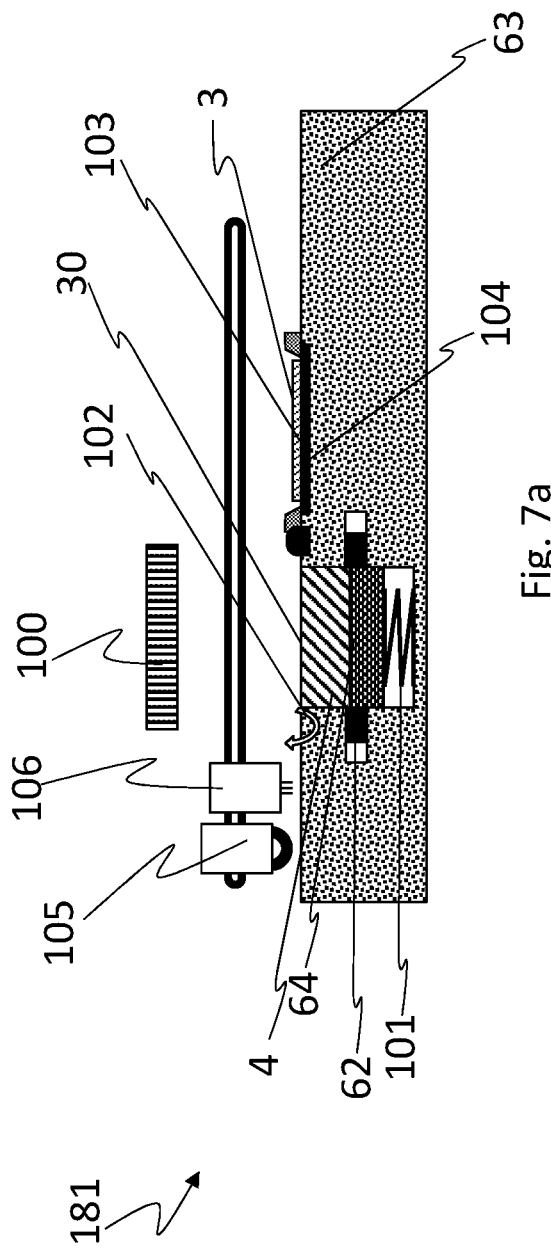
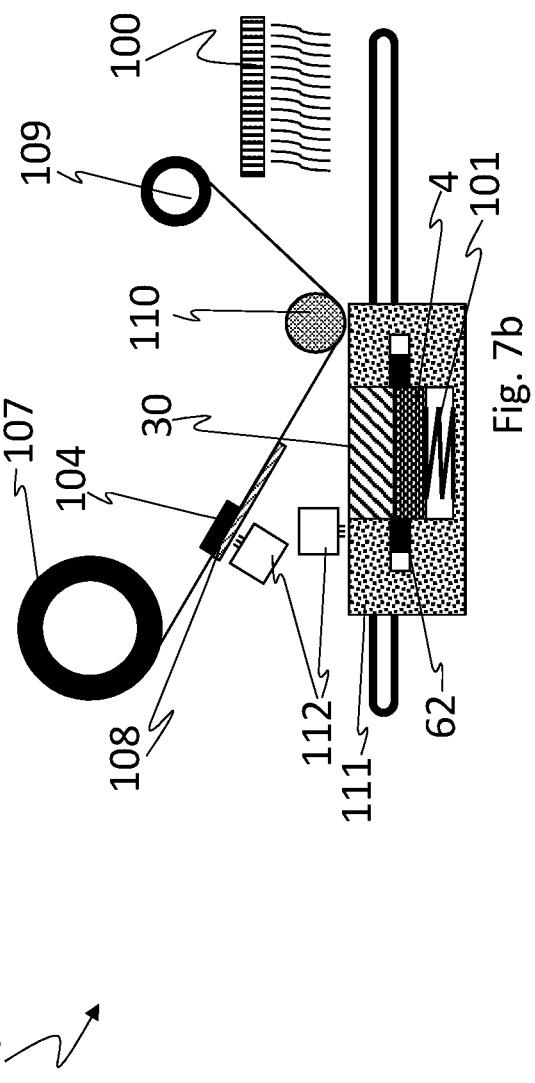

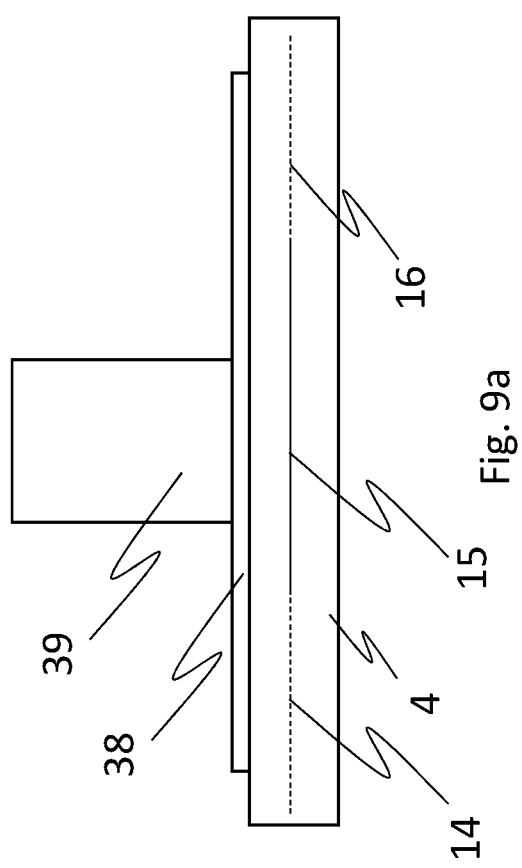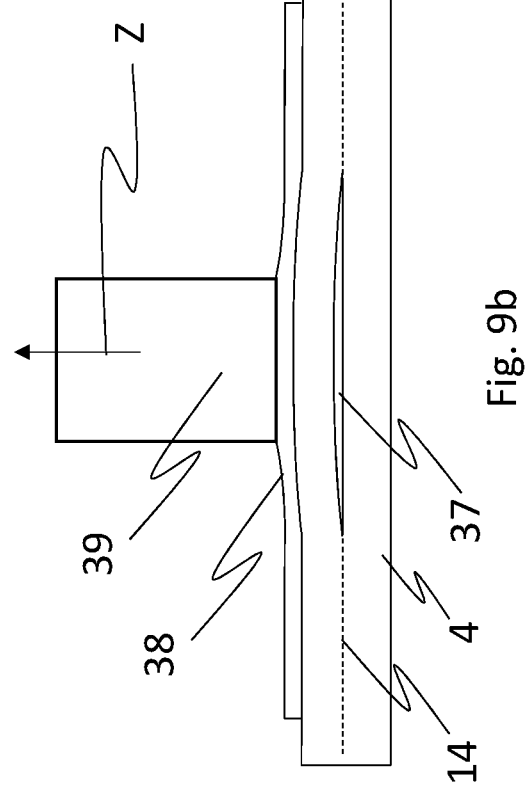

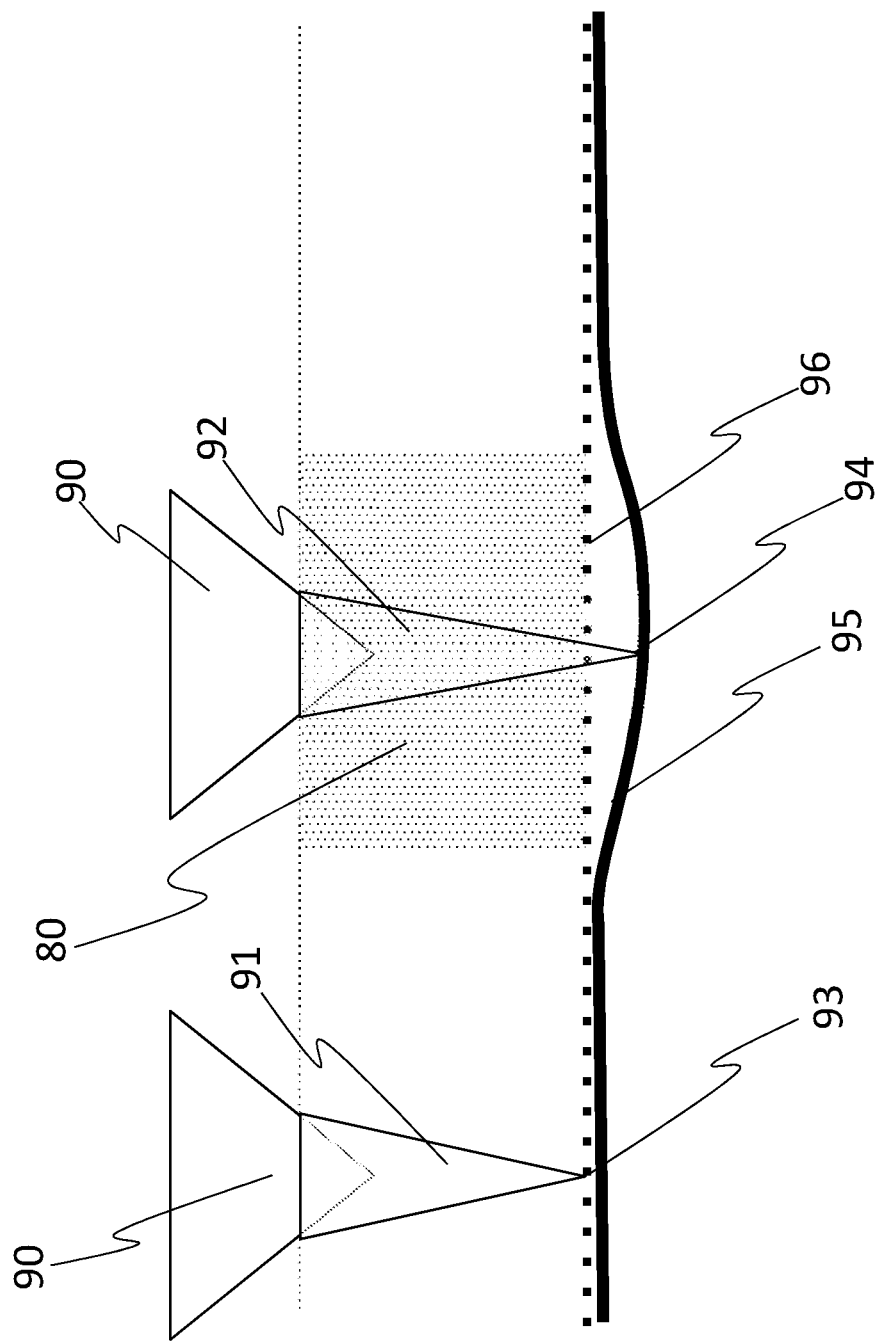

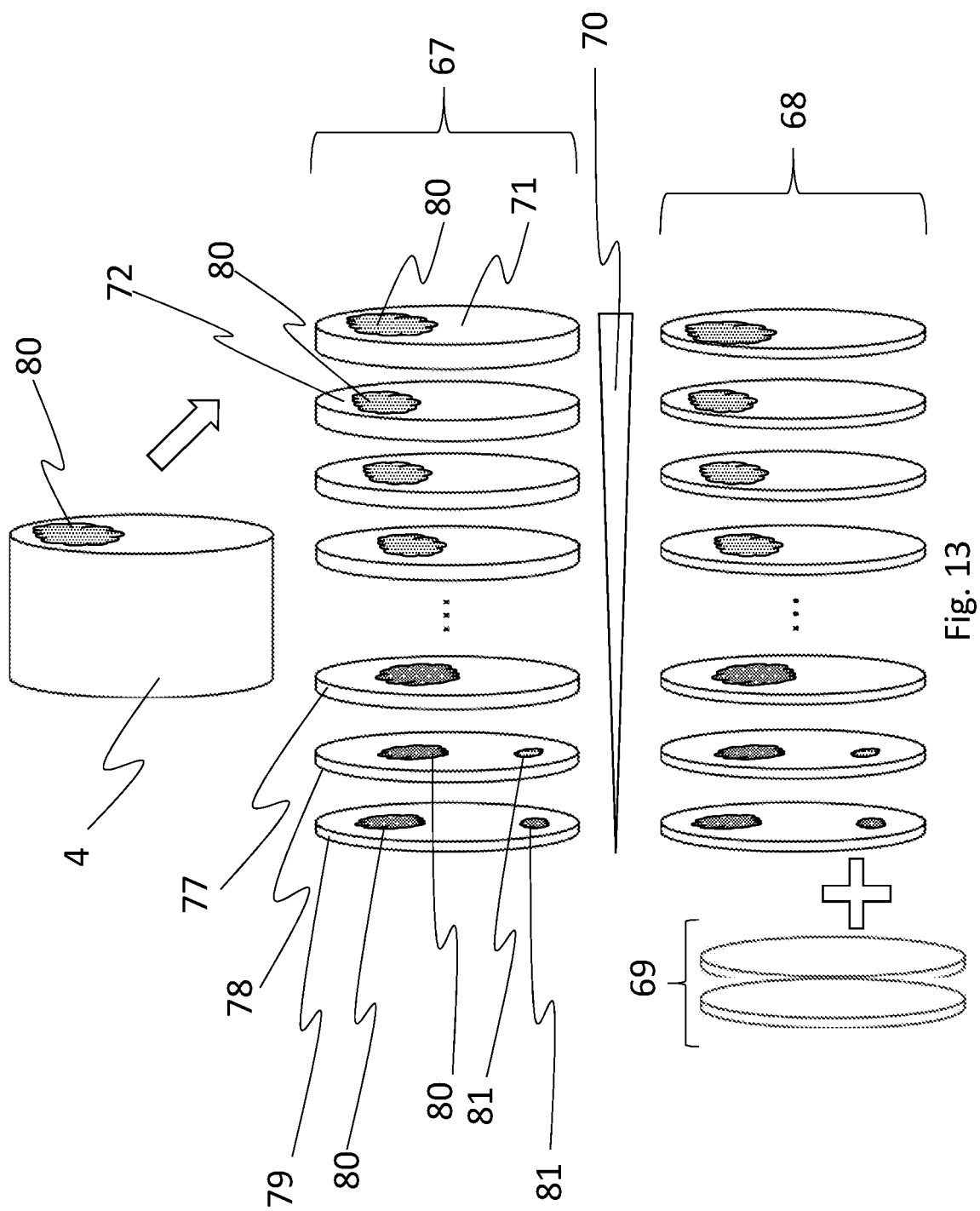

METHOD FOR SEPARATING WAFERS FROM DONOR SUBSTRATES

BACKGROUND

Semiconductor materials are for example grown in large cylinders of crystalline material, so-called ingots, while industrial processes often require wafer material with a different thickness and surface quality. Wafering of brittle semiconductor materials is often carried out with diamond- or slurry-based wire saw processes. These sawing processes lead not only to kerf loss of potentially valuable material, but also surface roughness and damage to the crystal below the surface. These aspects of wafering with sawing processes make necessary polishing and grinding steps necessary during the wafer production process, which leads to additional damage and process costs.

In order to address these problems during the conventional wafering and thinning of semiconductors, so-called kerfless technologies have been developed, which promise a reduction of the kerf losses 13 if not in fact their elimination, as well as of damage below the surface and grinding process steps. In particular, externally applied so-called spalling processes utilization stresses—often thermally induced—in order to divide crystalline materials along crystal planes with a well-defined thickness. Spalling may be carried out with nickel-chromium alloys, silver-aluminum paste, epoxy resin, aluminum and nickel. Kerf-free wafering techniques have the potential to drastically reduce damage in semiconductor production methods. Stress-based separating methods such as so-called spalling (or splitting), use externally applied stresses in order to divide crystalline materials along their crystal planes with a well-defined thickness. After spalling, however, substrates exhibit so-called Wallner lines which are due to crack propagation in the crystal.

Spalling has been made possible by using differences in the thermal expansion coefficients between a brittle material and a polymer adhering on the surface of the material. Cooling the connected materials below the glass transition temperature of the polymer induces stresses which lead to material separation along a crack plane. One advantage of this special method in contrast to other types of spalling is that no increased diffusion of undesired chemical components through the material occurs because of the process of cooling, in contrast to high-temperature methods that are also used for spalling.

Spalling methods, however, are inclined to be limited in their control over the wafer thickness achieved, and an adjustment of the vertical position of the crack propagation is complicated. Furthermore, very prominent patterns of Wallner lines occur on the surface during spalling. This pattern consists of strip-shaped grooves and ridges, which originate from the crack propagation in the semiconductor material and allow derivation of the crack dynamics in the substrate. Usually, the crack begins at a certain point on the edge and then propagates rapidly from the edge of the substrate. Wallner lines of conventional spalling surfaces greatly increase the resulting surface roughness, often to the extent beyond which additional polishing or grinding steps are required before the further processing and the production of circuits on the substrate.

Document WO2016/083610 of the Applicant discloses laser-assisted separation of solid layers from donor substrates, in particular examples of the modification generation.

A method is disclosed by Document DE102016201780A1 in which cracks for separating a wafer are generated in an ingot by means of laser beams. The separation is carried out as a function of an ultrasound application. This method is disadvantageous since it is very fixed because of its process parameters and furthermore requires a high reprocessing outlay, high costs and material losses being entailed by the reprocessing.

SUMMARY

A production facility according to the invention for separating wafers, or solid slices, from donor substrates preferably comprises at least one analysis device for determining at least one individual property, in particular the doping, of the respective donor substrate, a data device for generating donor substrate process data for individual donor substrates, the donor substrate process data comprising analysis data of the analysis device, the analysis data describing at least the one individual property of the donor substrate, a laser device for generating modifications inside the donor substrates in order to form a separating region inside the respective donor substrate, the laser device being operable as a function of the donor substrate process data of a specific donor substrate in order to process the specific donor substrate, and a separating device for generating mechanical stresses inside the respective donor substrate in order to initiate and/or guide a crack in order to separate respectively at least one wafer from a donor substrate. The analysis device may alternatively be referred to as a measuring device, in particular as a measuring device for recording donor substrate properties.

For efficient cleavage of material (in particular wafer/s) from a donor substrate, formula-based process management can therefore be made possible. These formulae are preferably so robust in relation to process variations and variations within the properties of the raw material, and preferably provide such corresponding margins, that, while taking into account all deviations/tolerances, they achieve the separation of workpieces accurate to specification (i.e. low-stress wafers with geometric dimensions within the tolerances).

Depending on the facility, some processes may be toleranced more narrowly if additional information about the property variations is available. For example, the laser facility may internally measure local absorption variations and refractive index variations and then, for example, use them for local adaptation of the laser energy or scribing depth within the facility and of the formula.

The full potential of the present invention is best exploited superordinate process management, since crucial interactions of the processes between the various facilities or apparatus parts may then be represented, or taken into account.

The present invention therefore leads to a facility which provides a superordinate system for process management in the donor substrate treatment/solid separation. Measurement data of a plurality of, in particular all, subprocesses/facilities/apparatuses are preferably combined in a database, and the facility or system itself carries out adaptations to these formulae for process control over the splitting profile. The term "learning splitting process" is used for this.

This solution is therefore advantageous since recording of the donor substrate process data is made possible, so that the processing process or separating process can be adapted individually to the individual properties of each donor substrate. For example, differences in the refraction properties and/or dopings of the respective specific donor substrate at the respective specific treatment position may therefore be determined and compensated for. This makes it possible to generate the modifications very precisely, so that material losses can be reduced because of the reduction of grinding and polishing outlay.

An overriding object of the present invention is furthermore to provide an optimal concept of a production facility, in particular a cold-split cluster tool facility, which ensures optimal total facility effectiveness in terms of availability, price, performance and quality. In particular, the concatenation of a plurality of individual process tools, or treatment devices, may lead during production to great restrictions in terms of the total facility effectiveness when too low a process capability (Cpk values too low) of individual process tools and/or insufficient buffering of the individual process tools are included in the facility concept. In the event of certain process failures (holdup, break in the process chain, etc.) this makes it possible to safeguard the required total facility effectiveness by planned redundancies.

According to one preferred embodiment of the present invention, to this end allocation means may be used. Preferably, for each wafer and/or each donor substrate, at least one and preferably a plurality of allocation means are provided for recording wafer process data or for associating wafer process data respectively with at least one specific wafer separated by the separating device, the wafer process data comprising at least parts of the analysis data that were generated for the respective donor wafer from which the specific wafer was separated.

Allocation means may in this case be any means that provide an association of the respective specific wafer with wafer data, in particular analysis data for this specific wafer. Allocation means may therefore be codes, in particular QR codes or barcodes, which provide an association or link with the allocated data. In addition or as an alternative, the allocation means may be configured as a data medium. Preferably, the allocation means in this case comprise RFID components. Furthermore, in addition or as an alternative, it is possible to use for example markings by data matrix code (DMC), RFID chips, cryptochips, trusted platform modules, holograms, etc., which can store and track the individual specific properties of the working means used, for example magnetic profiles (nanomagnets), signatures in the form of IR and/or UV features of the films, components and tools used. There is therefore the possibility of optimized tools synchronization, formula and article control, which optimally makes possible, and ensures with quality or requirement compliance, the handling of local and global process parameters and job data (independently flexible, multiple jobs, manual processes, finishing work, packaging, etc.).

Another important feature consists in the option to produce a component and cell protection concept, in particular throughout the entire production chain, in order to optimally protect the individual tools or devices, in particular of a specific production unit and/or a plurality of production units, against inappropriate handling. Optimal operation of the individual tools of the total line is therefore ensured and the total facility effectiveness can be tracked and can be optimized stepwise. Starting from a tool concept (tool software), through line control (Linux software), to superordinate fab control (plant software), optimal tool and line configurations, formula management and facility changes (databases, authentication server, safety concepts, management of change—MOC) are therefore possible according to tasks and query spectrum. Likewise, unauthorized or manual changes may be recorded and tracked.

The following parts of the description and/or the dependent claims relate to further preferred embodiments.

According to another preferred embodiment of the present invention, at least one transport device is provided for moving the donor substrate reduced by the separated wafer to a further analysis device or to the analysis device in order to determine the at least one property again, the donor substrate process data allocatable to the specific donor substrate being modified by means of the newly recorded analysis data. Preferably, the specific donor substrate is conveyed after the separation of the wafer to a measuring device for determining the surface properties of the exposed surface of the donor substrate after the separating step. Subsequently or alternatively, the donor substrate may be transported to a surface preparation device, in particular for material removal, in particular for smoothing the surface exposed as a result of the wafer separation. From the surface preparation device, the donor substrate is preferably transported to the analysis device. The transport between a first device and a second device, or between a first device and a measuring device or analysis device, may in this case be carried out by means of a robotic arm or servo motors or conveyor belts, etc. Preferably, the donor substrate is moved with the same transport mechanism inside the production unit, although it is also possible for different mechanisms to be used for different transport sections. Furthermore, individual or several measurements or analyzes may be carried out directly treatment devices, particularly in the surface treatment device, the laser device, the application device and/or the separating device. The donor substrate can therefore be conveyed by means of the transport device at least from the analysis device or the further analysis device to the laser device or a further laser device and from the laser device or the further laser device to the separating device or to the further separating device and from the separating device or from the further separating device to the surface preparation device or to a further surface preparation device, and preferably thereafter to the further analysis device or to the analysis device.

Preferably, at least one measuring device is provided for generating measurement data, the measurement data describing the thickness of the separated wafer. The thickness of the wafer may in this case, for example, be measured at predetermined positions. An average value may then be formed from these measurement values. In addition or as an alternative, the thickness values may be recorded for all predetermined positions and added to the donor substrate process data and/or to the wafer data. This is advantageous since knowledge about the thickness and topography of the examined surface is thereby obtained.

Preferably, in addition or as an alternative, the average thickness of the wafer or at least one region of the wafer, in particular of a plurality of or all region of the wafer, is recorded, average thickness in this case preferably being intended to be understood as an average value between minimum thickness and maximum thickness. The minimum thickness and the maximum thickness are in this case recorded over the entire area of the wafer, or over the entire area of the respective region in the longitudinal direction (axial direction) of the wafer.

Surface roughnesses, charge carrier densities, refractive index, absorption, waviness, total thickness variation (TTV) and total wafer thickness, crack lengths and laser processing outcome may all be optically detected, inter alia by using autofocus or chromatic white light sensors, by means of Raman measurements, by ellipsometry or also automated image processing of high-resolution cameras (for example Fourier analyzes of recorded images).

A problem is that transmissive methods are not possible for relatively large thicknesses of the workpieces (in the case of SiC above 2 mm) because of the strong absorption in the material.

This is a disadvantage particularly for the refractive index and for doping determination. In this case, however, an indirect measurement may for example be carried out. For example, the charge carrier density in reflection may be determined by means of Raman, eddy currents or surface conductivity. With the charge carrier density, it is then possible to calculate doping, refractive index and other optical parameters.

Surface roughnesses may, however, also be detected mechanically, as may thicknesses and their variances, since measuring sensors and tips as well as micrometer screws may be used.

There are likewise interferometric methods for surface characterization, or stimulating methods with photoluminescence or X-ray and UV radiation.

For purely geometrical measurement data (height profile before the lasering and after the splitting), optical methods are suitable since they are generally much faster than mechanical ones.

According to another preferred embodiment of the present invention, the measurement data are processable as a fraction of the donor substrate process data, a refractive index determination being performable by means of the donor substrate process data used in order to separate a specific wafer and the measurement data of the specific wafer, in order to determine refractive index data for adapting the donor substrate process data for generating modifications again inside the specific donor substrate.

This embodiment is advantageous since, by the adaptation of the refractive index, the modifications can be generated more precisely, i.e. with less distance from the respectively desired position. A planarization margin or a component of a planarization margin may be reduced as a result of the correction of the refractive index, so that the wastage per donor substrate is reduced.

The refractive index determination preferably comprises the step of recording the thickness of the separated solid or recording the actual distance of the modifications from the penetration surface. With knowledge of the thickness of the wafer, or with knowledge of the distance of the modifications from the penetration surface, the refractive index may be determined or the initial refractive index (by means of which the position for the modifications in order to separate the specific wafer was established) may be adapted, in particular adapted with position resolution, as a function of a discrepancy revealed by the measurement.

According to another preferred embodiment of the present invention, a surface preparation device, in particular a polishing device, is provided for preparing the surface of the donor substrate which has been exposed as a result of wafer separation, preparation data being generatable by the surface preparation device, the preparation data describing the material fraction eroded during the preparation, in particular the average thickness of the eroded material fraction, and/or the surface roughness.

The surface preparation device is in this case used to prepare the cleavage surface, i.e. to prepare the surface on the donor substrate exposed by the wafer separation and/or to prepare the surface exposed on the wafer by the separation. This is preferably carried out separately for the exposed surface of the donor substrate and the exposed surface of the wafer. Preferably, the exposed surface of the donor substrate is treated with a first surface preparation device and the exposed surface of the wafer is treated with a second surface preparation device. While for the donor substrate it is important to be returned to the process as quickly as possible, for the thin slices, or the wafers, it is the yield that is important. Since this process is no longer contained within the splitting cycle and may be externally carried out in a highly parallel manner, careful processing is expedient in this case and does not reduce the throughput of the production facility.

There are planarization methods both for single-side and two-side processing. In the described separating method by means of a polymer film to which heat is applied, an optically polished surface lies opposite a brittle fracture surface, so that warping takes place in stress equilibrium.

Preferably, a grinding facility with different grain sizes and the possibility of single-sided grinding is used for the surface preparation, for example a high-strength grinding tool which is typical in industry for semiconductor wafers up to 300 mm. Typically, there are in this case two grinding steps with different grain sizes of the grinding wheel, one coarse grinding step with grain sizes of less than 2000 and a fine grinding step with grain sizes of more than 2000.

After relatively coarse grinding steps, a polishing step may furthermore be carried out with a polishing facility in order to bring the surface quality back to optical quality and impart an initial roughness for a subsequent CMP step (chemical-mechanical polishing). The amount of material removed in the grinding process is a process variable (material loss optimization) that may be influenced by laser parameters and height map optimization. Typically (depending on the material), between 20 and 100 µm of material are removed during the grinding. The material removal is calculated very simply from the difference between the input and output thicknesses of the wafer (ingot, boule) and in modern industrial facilities is already measured automatically during the processing.

The process speeds for small removals of less than 100 µm are a few to less than one minute for all wafer sizes.

The overall process may, however, also be optimized for throughput by tolerating possibly higher material losses, for example because of higher laser energy used and higher resulting crack lengths at the laser modifications.

The aim is to remove so much material that no laser or other damage remains on the surface or in the material after the CMP step (the chemical-mechanical polishing).

According to another preferred embodiment of the present invention, the donor substrate comprises or consists of a crystalline material and the donor substrate preferably comprises crystal lattice planes which are inclined with respect to a planar main surface, the main surface bounding the donor substrate on one side in the longitudinal direction of the donor substrate, a crystal lattice plane normal being inclined in a first direction relative to a main surface normal, the laser device being configured in such a way that the introduction of laser radiation into the interior of the donor substrate can be carried out through the main surface in order to modify the material properties of the donor substrate in the region of at least one laser focus, the laser focus being formable by laser beams emitted by the laser device, a linear configuration being formable in the donor substrate by the variation of the material property and by varying the penetration position of the laser radiation into the donor substrate, in particular by a relative movement of the donor substrate with respect to the laser device, the variations of the material property being generated on at least one generation plane in the donor substrate, the crystal lattice planes of the donor substrate being aligned with an inclination relative to the generation plane, the linear configuration being inclined relative to a line of intersection resulting at the intersection between the generation plane and the crystal lattice plane, the donor substrate cracking in the form of subcritical cracks because of the varied material property.

The donor substrate process data particularly preferably comprise drive data for driving the laser device as a function of at least one individual property of the donor substrate specifically to be treated by means of the laser device, in particular the refractive index of the donor substrate between the position of the modification generation and the penetration position of the laser beams into the donor substrate and/or the doping of the donor substrate between the position of the modification generation and the penetration position of the laser beams into the donor substrate.

This embodiment is advantageous since, as a result of the fact that the linear configuration is inclined relative to a line of intersection, or straight line of intersection, resulting at the intersection between the generation plane and the crystal lattice plane, the crack growth perpendicularly to the scribing direction is limited. The modifications per scribing line are therefore not generated in the same crystal lattice planes. For example, the first 1-5% of the modifications per scribing line may therefore intersect only a fraction, in particular less than 75% or less than 50% or less than 25% or less than 10% or no crystal lattice planes of the last 1-5% of the modifications of the same scribing line. The scribing line is in this case preferably longer than 1 cm or longer than 10 cm or longer than 20 cm or up to 20 cm long or up to 30 cm long or up to 40 cm long or up to 50 cm long. Much fewer modifications are generated in the same crystal lattice planes per scribing line, so that crack propagation along these crystal lattice planes is limited.

This leads to a substantial further advantage of the present invention, namely that the scribing direction need not necessarily be configured in such a way that the further cracks generated must overlie the cracks generated last. Now, it is also possible for the scribing direction to be oppositely directed. This is because, owing to the possible shortness of the cracks due to the method according to the invention, no shadowing of the cracks formed last takes place. This makes it possible that, despite the opposite scribing direction, for example line spacings of less than 100 µm, in particular less than 75 µm or less than 50 µm or less than µm or less than 20 µm or less than 10 µm or less than 5 µm or less than 2 µm may be produced.

According to the present invention, the generation of a material modification or the generation of a crystal lattice defect, in particular the causing of a locally limited phase conversion, in particular the conversion of silicon carbide into silicon and carbon, may be preferably understood as a variation of the material property.

According to another preferred embodiment of the present invention the laser radiation is generated with pulse lengths of less than 10 ns or less than 5 ns or less than 2 ns or less than 1 ns, in particular less than 800 ps or less than 600 ps or less than 500 ps or less than 400 ps or less than 300 ps or less than 200 ps or less than 150 ps or less than 100 ps or less than 50 ps or less than 10 ps. Inside the donor substrate, the laser radiation causes modifications to be generated preferably by means of multiphoton excitation and the donor substrate to crack, preferably subcritically or subcritically in sections or critically in sections, in the region of the modifications generated. Critical cracking of the donor substrate means that at least two subcritical cracks are connected to one another, and preferably that a plurality of subcritical cracks are connected to one another, in particular up to or more than 10 cracks or up to or more than 50 cracks or up to or more than 100 cracks or up to or more than 250 cracks. In this case, a crack which has a crack length of more than 100 µm, in particular a length of up to or more than 200 µm or a length of up to or more than 500 µm or a length of up to or more than 1000 µm or a length of up to or more than 2000 µm or a length of up to or more than 3000 µm or a length of up to or more than 5000 µm, may also be regarded as a critical crack.

According to one preferred embodiment of the present invention, the subcritical cracks are generated with a crack length of between 10 µm and 100 µm, in particular between µm and 70 µm and preferably between 30 µm and 50 µm and particularly preferably between 35 µm and 45 µm, in particular 40 µm.

According to another preferred embodiment of the present invention, the donor substrate therefore comprises or consists of a chemical compound such as silicon carbide, the chemical compound preferably comprising a substance or a plurality of substances selected from the third, fourth and/or fifth main groups of the periodic table and/or the $12^{th}$ subgroup of the periodic table, the material variation representing a predetermined substance conversion of the starting material, in particular silicon carbide, of the donor substrate into a target material, in particular silicon and carbon.

According to another preferred embodiment of the present invention, the substance conversion represents a decomposition of the chemical compound into a plurality of or into all individual constituents or elements. This embodiment is advantageous since the material combination most suitable for separation of the solid fraction can be adjusted in a defined way by the deliberate decomposition of the chemical compound of the solid.

According to the present description, a solid starting material is preferably intended to mean a monocrystalline, polycrystalline or amorphous material. Monocrystallines with a highly anisotropic structure are preferably suitable because of the highly anisotropic atomic bonding forces. The solid starting material preferably comprises a material or a material combination from one of main groups 3, 4, 5 and/or subgroup 12 of the periodic table, in particular a combination of elements of the $3^{rd}$, $4^{th}$, $5^{th}$ main group and subgroup 12, for example zinc oxide or cadmium telluride.

Besides silicon carbide, the semiconductor starting material may for example also consist of silicon, gallium arsenide GaAs, gallium nitride GaN, silicon carbide SiC, indium phosphide InP, zinc oxide ZnO, aluminum nitride AlN, germanium, gallium(III) oxide $Ga_2O_3$, aluminum oxide Al2O3(sapphire), gallium phosphide GaP, indium arsenide InAs, indium nitride InN, aluminum arsenide AlAs or diamond.

The solid or the workpiece (for example wafer), or the donor substrate, preferably comprises a material or a material combination from one of main groups 3, 4, 5 of the periodic table, for example SiC, Si, SiGe, Ge, GaAs, InP, GaN, Al2O3(sapphire), AlN. Particularly preferably, the solid comprises a combination of elements occurring in the fourth, third and fifth groups of the periodic table. Conceivable materials or material combinations are in this case, for example, gallium arsenide, silicon, silicon carbide, etc. Furthermore, the solid may comprise a ceramic (for example $Al_2O_3$—aluminum oxide) or consists of a ceramic, preferred ceramics being in this case, for example, perovskite ceramics (for example ceramics containing Pb, O, Ti/Zr) in general and lead magnesium niobate, barium titanate, lithium titanate, yttrium aluminum garnet, in particular yttrium aluminum garnet crystals for solid-state laser applications, SAW (surface acoustic wave) ceramics, for example lithium niobate, gallium orthophosphate, quartz, calcium titanate, etc. in particular. The solid therefore preferably comprises a semiconductor material or a ceramic material, or particularly preferably the solid consists of at least one semiconductor material or a ceramic material. The solid is preferably an ingot or a wafer. The solid is particularly preferably a material that is at least partially transparent for laser beams. It is therefore furthermore conceivable for the solid to comprise a transparent material or consist of or be made partially of a transparent material, for example sapphire. Further materials which may be envisioned as a solid material in this case, on their own or in combination with another material, are for example wide-bandgap materials, InAlSb, high-temperature superconductors, in particular rare-earth cuprates (for example $YBa_2Cu_3O_7$). In addition or as an alternative, it is conceivable for the solid to be a photomask, in which event in the present case any photomask material known at the application date, and particularly preferably combinations thereof, may be used as photomask material. Furthermore, the solid may in addition or as an alternative comprise or consist of silicon carbide (SiC). The solid is preferably an ingot, which in an initial state, i.e. in a state before the separation of the first solid fraction, preferably weighs more than 5 kg or more than 10 kg or more than 15 kg or more than 20 kg or more than 25 kg or more than 30 kg or more than 35 kg or more than 50 kg. The solid fraction is preferably a solid layer, in particular a wafer having a diameter of at least 300 mm.

According to another preferred embodiment of the present invention, the separating device comprises an application device for applying a layer comprising at least one polymer material, in particular a polymer film, onto the donor substrate, or an application device is formed before the separating device in the transport path of the donor substrate, and the separating device preferably comprises a pressing device for pressing at least in sections or fully onto the layer comprising the at least one polymer material, and the separating device comprises a heat treatment device for cooling the layer of at least one polymer material which is arranged on the donor substrate and to which pressure is applied by the pressing device.

Preferably, in this case layer data relating to at least one parameter of the layer comprising at least one polymer material are provided by the application device, the layer data in this case preferably comprising the material composition and/or the layer dimensions, in particular the layer thickness, and/or pressing force data are provided by the pressing device, the pressing force data preferably comprising the pressing force of the pressing device on the layer, comprising at least one polymer material per unit area and/or comprising the one force distribution over the area, and/or heat treatment data are provided by the heat treatment device, the heat treatment data preferably comprising the temperature of the layer comprising the at least one polymer at the instant of crack initiation and/or crack propagation.

This embodiment is advantageous since the donor substrate process data may be further refined by means of the additionally recorded data, and very comprehensive data recording and therefore adaptation of the control of the separating process are thereby possible. Preferably, respectively at least one process parameter, and preferably a plurality of process parameters, are therefore recorded in relation to a plurality of treatment devices, in particular the in relation to the multiplicity of treatment devices, and particularly preferably in relation to all the treatment devices, and are modified in order to separate a further wafer and provided as modified donor substrate process data.

According to another preferred embodiment of the present invention, a processor device is provided for modifying the donor substrate process data, the predefined supplementing and/or adaptation of donor substrate process starting data by means of at least two types of data being brought about by the modification of the donor substrate process data in order to adapt at least one operating parameter, in particular the focal depth and/or the laser energy, of the laser device, the data being selected from the group of data which comprises analysis data, measurement data, in particular thickness, refractive index data, modification measurement data, preparation data and/or data of the measuring device for determining the surface properties of the exposed surface of the donor substrate after the separating step, or surface property data of the exposed surface of the donor substrate and/or data of the measuring device for determining the surface properties of the exposed surface of the wafer after the separating step, or surface property data of the exposed surface of the wafer.

By means of the analysis device, workpiece properties may therefore preferably be recorded and converted into data form. In addition or as an alternative, these donor substrate properties may comprise the donor substrate thickness and/or the donor substrate dimensions and/or the TTV of the main surface of the donor substrate. The donor substrate process data preferably comprise data for the laser dose and/or the laser pattern and/or the pulse shape and/or the pulse length.

By means of a modification measuring device, preferably at least the local refractive index and/or the TTV and/or the scribing depth, in particular the modification generation depth in relation to the main surface of the donor substrate, is recorded and preferably transmitted to a database or processing device for modifying the donor substrate process data and/or for the documentation.

In the event that one or at least one cleaning and/or activation device is present, the donor substrate process data preferably comprise activation intensity data by which the activation intensity to be achieved by the cleaning and/or activation device is specified. Preferably, at least one operating parameter, in particular surface energy and/or field homogeneity and/or streamer frequency and/or plasma parameter, of the cleaning and/or activation device is recorded during the specific treatment of a donor substrate and preferably transmitted to a database or processor device for modifying the donor substrate process data and/or for documentation.

In the event that an application device is present, in particular a laminating device for applying a stress generation layer, for example a polymer film, in particular comprising or consisting of PDMS, the donor substrate process data preferably comprise data by which an application pressure to be achieved by the application device and/or a treatment temperature for heating the stress generation layer and/or the main surface and/or a treatment duration, in particular a heating duration and/or pressing duration, is specified.

If the separating device is configured as an ultrasonic device, the donor substrate process data preferably comprise data by which the position of the ultrasound application to the donor substrate is specified, and/or by which the intensity of the ultrasound is specified and/or by which the wavelength of the ultrasound is specified.

If the separating device is configured as a tensile device, donor substrate process data preferably comprise data by which a tensile force or a tensile force profile is specified, and/or at which position of the main surface the tensile forces are to be induced in the donor substrate.

If the separating device is configured as a cold splitting device, donor substrate process data preferably comprise data by which a heat treatment of the donor substrate and/or of the stress generation layer is specified, and/or by which a heat treatment profile and/or a heat treatment duration is specified. The separating device preferably likewise comprises a pressing device. In addition or as an alternative, the donor substrate process data therefore preferably also comprise data by which a pressure on the stress generation layer is specified. Preferably, a pressure profile as a function of the surface coordinates of the main surface is specified, and/or a minimum and/or maximum or specific pressing force for generating a defined pressure is specified.

During the cold splitting, preferably at least one cold splitting parameter, in particular the splitting force and/or the splitting duration and/or the splitting temperature, is recorded and preferably transmitted to a database or processor device for modifying the donor substrate process data and/or for documentation.

After the separation of the wafer from the donor substrate, by means of a measuring device for determining at least one surface property of the exposed surface of the wafer after the separating step, roughness, in particular local roughness or roughness distribution over the exposed surface, and/or damage depth, in particular local damage depths or damage depth distribution over the exposed surface, is preferably recorded and preferably transmitted to a database or processor device for modifying the donor substrate process data and/or for documentation.

In the event that a wafer surface treatment device is present, the donor substrate process data preferably comprise data by which a processing depth and/or a processing speed and/or a processing path is specified.

A measuring device for measuring the separated and surface-treated wafer is preferably provided. By means of the measuring device, the planarity of the treated wafer surface and/or the damage depth and/or stresses (polarimeter) and/or the refractive index as a function of the scribing depth is preferably recorded or determined, and preferably transmitted to a database or processor device for modifying the donor substrate process data and/or for documentation.

Depending on the absorption of the material, which is strongly influenced by the doping, a certain critical intensity must be achieved for processing during the laser process at the target depth. Thus, if the material is more strongly absorbent, for the same scribing depth a higher input pulse energy must be selected at the laser so that after passing through the material the same power is available at the depth for the laser modification. A position-resolved laser energy map for the workpiece is therefore obtained from the position-resolved measurement of the doping before the laser processing via a conversion table or a predetermined function. This map is initially to be understood as relative, and indicates what percentage of the absolute laser energy is used at a specific point on the sample.

Once the wafer surface has been measured in a surface map, warping, local elevations and similar defects of the substrate in a height map may be compensated for in such a way that the laser process does not follow the surface, but rather a maximally planar processing and laser modification plane is generated, which afterwards no longer requires any special corrections and therefore minimizes grinding losses and general material losses. The height map may be corrected by position-resolved changes in the optical density (conversion table of doping->refractive index or predetermined function).

Because of the absorption in the material, the absolute laser energy for damage at greater depths must be higher so that there is sufficient energy for the required crystal damage at the focal point.

At the same time, the scribing depth is a function of the laser energy used, which leads to coupling of the height map, laser energy map and/or absolute laser energy.

In the case of a fixed scribing depth set by the optical structures, the critical threshold energy beyond which a material modification takes place may already be achieved earlier in the beam path for relatively high laser pulse energies, which would lead to modification above the target depth sought. Thus, if an energy higher than the laser pulse energy absolutely required for the threshold value is initially sought for reasons of process reliability, or if this is used, it may be expedient to compensate for the earlier reaching of the threshold along the beam by means of a correction to the target depth or the optical structures. This leads to corrections for the laser energy map, the height map and/or the absolute laser energy.

According to another preferred embodiment of the present invention, the at least one operating parameter of the laser device and/or the grinding and/or polishing apparatus and/or the laminating apparatus and/or the separating device is/are adaptable as a function of the data of the processor device or database recorded as a result of a specific wafer separation, at least one operating parameter of the laser device and/or the grinding and/or polishing apparatus and/or the laminating apparatus and/or the separating device being adapted for all or for more than 25%, in particular for more than 40% or more than 50% or more than 75% or more than 90% or for more than 95%, of all wafers separated from a specific donor substrate in order to reduce a planarization margin.

The planarization margin may therefore, depending on the wafer to be separated or respectively for a predefined number of wafers, be reduced successively over the course of the boule or ingot, and additional slices or wafers may be generated therefrom. Thus, purely by way of example, 1-2 wafers with a thickness of 350 µm may be separated per 25 mm boule. If thinner target thicknesses are produced, this additional potential may be further increased significantly.

The planarization margin is that additional thickness (laser scribing depth=target thicknesses+planarization margin) with which a split wafer is produced, inclusive of all thickness, planarity and roughness tolerances. These tolerances are removed in subsequent planarization steps in order to obtain slices accurate to specification. This specification may, however, still allow tolerances (for example SiC wafers with 350+/−25 µm). If it is then possible to carry out production deliberately/reliably at the lower tolerance limit without waste, additional parts may be produced (50 wafers times 23 µm margin means 3 additional wafers).

Particularly preferably, the donor substrate process data therefore comprise data, in particular measurement data and/or analysis data, relating to one or at least one preceding wafer separation of the specific donor substrate. During the treatment of a specific donor substrate in order to separate a first wafer, the process data are preferably replaced or supplemented by predefined process data, in particular of preceding donor substrate treatments of other donor substrates. Furthermore, for the separation of individual or several wafers, process data and/or wafer data of other donor substrates and/or wafers separated from other donor substrates are used or consulted for definition of the specific donor substrate treatment and/or wafer separation.

That is to say, during the wafer separation, in particular during the splitting, preferably not only "empirical values" of the boule splitting currently being carried out are processed and stored in the process management computer, but measurements from the database of earlier donor substrate treatments, in particular wafer separations, in particular splittings, are also included. Particularly preferably, by means of statistical methods, process parameters, in particular apparatus parameters, are predicted or determined with the aid of the process-integrated measurement technology, and in this case particularly preferably further refined, in particular continuously.

Example: for constant doping content and the same laser energy of wafer n and wafer n−1 of a boule, the "post-split" roughness of wafer n is significantly greater than for wafer n−1. The reason may, for example, be that owing to the smaller thickness of the boule for wafer n, the crack varies more greatly around the laser plane because the workpiece is less stiff. An indication of this could be that the splitting duration at the same cooling temperature changes for wafer n in comparison with wafer n−1. This means that, for the same laser damage layer, the crack is nevertheless initiated differently. In this case, the process may be tracked in different ways. The application pressure of the cold plates during the cold splitting is increased for wafer n+1. If no improvement occurs, in parallel, for example, the absolute laser energy levels will be adapted for wafer n+2. Over the processing of a plurality of boules of the same material, further correlations may thereby be determined so that the application pressure of the cold plates is generally determined from the thickness of the workpiece before the splitting.

However, it is also conceivable that the cause of the difference is not the stiffness of the material, but that during the laser process, for example thermal volume processes need to be taken into account more greatly for thinner workpieces. It is then expedient to adapt the absolute laser energy for wafer n+1. This would lead over time to a new correlation of absolute laser energy with the workpiece thickness, which leads to corrections before the laser process.

Such a cluster tool, or such a facility with superordinate process management and a database, may already offer significant benefit without a "learning split" by means of statistical methods. Because of the sequential nature of the method carried out by the facility according to the invention, with the slice-wise measurement technology in any case, in particular for the doping content and/or the refractive index, a doping tomogram and/or refractive index tomogram of the wafer may provide accurate information about the conditions during the crystal growth and therefore enable the crystal grower to adjust their processes, in particular the furnace, more rapidly for better crystals.

In a similar way to reducing the planarization margin, process margins or parameter margins may be implemented in order to accelerate the overall process and/or in order to save on energy in the overall process and/or in order to reduce waste.

Process and/or parameter margins may in this case be defined by the process parameters or operating parameters recorded during the respective treatment by means of a device, in particular a surface treatment device, laser device, cleaning and/or activation device, application device, separating device and/or wafer surface treatment device and/or subsidiary devices, for example the pressing device of the separating device, and/or by the values or data recorded by means of at least one measuring device. Preferably, for some or each of the process parameters or operating parameters and/or for some or each of the recorded values, an ideal value may be determined and the deviation recorded for this ideal value in this case preferably represents the maximum possible resolvable margin.

In this case, the donor substrate process data which are available before the laser treatment in order to separate the next wafer are to be understood as donor substrate process starting data. The substrate process data before the separation of the first wafer of a specific donor substrate or before the separation of the last wafer of a specific donor substrate or before the separation of a wafer between the first and last wafers of a specific donor substrate may therefore be understood as donor substrate process starting data.

According to another preferred embodiment of the present invention, the wafer process data additionally comprise position data, the position data describing the position of the wafer in the donor substrate, and/or comprise measurement data of the measuring device, the measurement data comprising the thickness of the separated wafer.

This embodiment is advantageous since, with knowledge of specific wafer properties, downstream production processes, for example growth of defined layers, may be implemented much more efficiently.

In addition or as an alternative, the invention may relate to a method for producing microcracks in a donor substrate. The method according to the invention in this case preferably comprises at least the steps mentioned below: Providing the donor substrate. The donor substrate may in this case alternatively be referred to as a solid or boule or thick wafer or ingot. The donor substrate preferably comprises or consists of a crystalline material. Particularly preferably, the donor substrate comprises a single crystal or consists at least mostly thereof or consists entirely thereof. The donor substrate comprises crystal lattice planes, at least one extent direction of the crystal lattice planes being aligned with an inclination relative to a planar main surface. At least most and preferably at least 95% of the crystal lattice planes, and particularly preferably all the crystal lattice planes, are therefore aligned with an inclination relative to a planar main surface at least in an extent direction of the crystal lattice planes. The main surface bounds the donor substrate in the longitudinal direction of the donor substrate on one side. The main surface is in this case formed by the donor substrate. Generation of modifications inside the specific donor substrate in order to form a separating region inside the donor substrate by means of a laser device. The modifications are particularly preferably generated by means of laser beams of the laser device, the laser beams particularly preferably entering the donor substrate through the main surface. The separating region is preferably configured to be planar or substantially planar. The donor substrate is limited on the opposite side from the main surface by a further bounding surface. The separating region is preferably formed or generated closer to the main surface than to the further bounding surface. The main surface and the further bounding surface are preferably oriented substantially or exactly parallel to one another.

This solution is advantageous since the modifications can be introduced very precisely into the donor substrate in a short time.

In the scope of the present invention, the modifications may particularly preferably be regarded or referred to as point material variations.

In addition or as an alternative, the object mentioned above may be achieved by a method for reducing a planarization margin provided during the division of a donor substrate into a multiplicity of solid slices. The method according to the invention in this case preferably comprises at least the steps: determining at least one individual property, in particular the doping and/or the crystal lattice dislocations, of a specific donor substrate by means of an analysis device, generating analysis data by means of the analysis device as a function of the at least one individual property determined, generating donor substrate process data for the specific donor substrate by means of a data device, the donor substrate process data comprising the analysis data of the analysis device, the analysis data describing at least the one individual property of the donor substrate, and the donor substrate process data defining a first planarization margin, generating modifications inside the specific donor substrate in order to form a separating region inside the donor substrate by means of a laser device, the laser device being operated as a function of the donor substrate process data which are allocatable to the specific donor substrate, generating mechanical stresses inside the specific donor substrate in order to initiate and/or guide a crack in order to separate a wafer from the specific donor substrate by means of a separating device, and determining the at least one individual property, in particular the doping and/or refractive index and/or the crystal lattice dislocations, of the specific donor substrate reduced by the specific wafer by means of the or a further analysis device, generating new analysis data by means of the respective analysis device as a function of the at least one individual property determined, and modifying the donor substrate process data in order to generate modifications again in the specific donor substrate by means of the new analysis data and defining a second planarization margin as a constituent of the donor substrate process data, the second planarization margin being less than the first planarization margin.

The aforementioned object may be achieved by a data set as claimed in claim 15. The data set according to the invention is in this case preferably generated in an aforementioned separate method. The data set in this case preferably comprises at least the analysis data and/or refractive index data recorded before each laser treatment.

The present invention may furthermore relate to a data medium which comprises at least one data set as mentioned above.

The present invention may furthermore relate to a computer program product for carrying out a method according to the invention.

The aforementioned object is furthermore by a method as claimed in claim 15 for dividing a donor substrate into a multiplicity of solid slices,
comprising at least the steps:
determining at least one individual property, in particular the doping and/or the refractive index, of a specific donor substrate by means of an analysis device, generating analysis data by means of the analysis device as a function of the at least one individual property determined,
generating donor substrate process data for the specific donor substrate by means of a data device, the donor substrate process data comprising the analysis data of the analysis device, the analysis data describing at least the one individual property of the donor substrate,
generating modifications inside the specific donor substrate in order to form a separating region inside the donor substrate by means of a laser device, the laser device being operated as a function of the donor substrate process data which are allocatable to the specific donor substrate,
generating mechanical stresses inside the specific donor substrate in order to initiate and/or guide a crack in order to separate a wafer from the specific donor substrate by means of a separating device, and determining the at least one individual property, in particular the doping, of the specific donor substrate reduced by the specific wafer by means of an analysis device, generating new analysis data by means of the analysis device as a function of the at least one individual property determined, and modifying the donor substrate process data by means of the new analysis data, generating modifications inside the specific donor substrate in order to form a separating region inside the donor substrate by means of the laser device or by means of a further laser device, the laser device or the further laser device being operated as a function of the modified donor substrate process data, generating mechanical stresses inside the specific donor substrate in order to initiate and/or guide a crack in order to separate a wafer from the specific donor substrate by means of a separating device.

In additional as an alternative, the aforementioned object may be achieved by a method for generating process data for driving components of a production facility for separating wafers from donor substrates. This method preferably comprises at least the steps: generating analysis data by means of an analysis device as a function of at least one property of a donor substrate, generating donor substrate process data for the specific donor substrate by means of a data device, the donor substrate process data being used in order to adjust a laser device for generating modifications inside the donor substrate, the donor substrate process data comprising the analysis data of the analysis device, the analysis data describing at least the one individual property of the donor substrate, determining the at least one individual property, in particular the doping, of the specific donor substrate reduced by the specific wafer by means of an analysis device, generating new analysis data by means of the analysis device or a further analysis device as a function of the at least one individual properties determined, the new analysis data being recorded for the same donor substrate, the donor substrate being shortened at least by the specific wafer when the new analysis data are generated, modifying the substrate process data by means of the new analysis data in order to adjust the laser device or a further laser device, modifications that are distanced less far from the penetration surface than during at least one preceding laser treatment of the same donor substrate being generatable as a function of the modified donor substrate process data.

The aforementioned object is achieved according to the invention by a method for separating at least one solid layer or a wafer, in particular a solid slice, from a donor substrate. The method according to the invention in this case preferably comprises at least the steps: providing the donor substrate and generating or arranging a stress generation layer, or polymer layer, or polymer film, on an in particular planar surface of the donor substrate axially bounding the donor substrate. Providing and pressing at least one pressure application element of a pressure application device, or of a pressing device, on at least one predetermined fraction of the stress generation layer in order to press the stress generation layer onto the surface. Separating the solid layer from the donor substrate by thermal action on the stress generation layer, so that mechanical stresses are generated in the donor substrate, a crack for separating a solid layer being formed by the mechanical stresses, the pressure application element being pressed onto the stress generation layer during the thermal action on the stress generation layer. This method is preferably carried out by means of a manufacturing facility as claimed in one of the preceding claims. The production facility according to the invention, in particular at least one production unit, in particular a separating device, in particular a separating device for carrying out cold splitting, can thus such a pressing device up. Particularly preferably, the production facility according to the invention is constructed in such a way that heat treatment, in particular cooling, of the polymer layer or stress generation layer by means of the heat treatment device and pressure application onto the polymer layer or stress generation layer by means of the pressing device may be carried out simultaneously.

This solution is advantageous since it has been found that the crack extends much more accurately along a desired separating region, or a desired separating plane, or a desired separating control, when a further force counteracts the mechanical stresses generated by the stress generation layer. The stress generation layer contracts because of the thermal action, so that tensile forces are initiated in the donor substrate by the stress generation layer. The applied pressure in this case counteracts the tensile forces so that force peaks are reduced and the crack propagates in a much more defined way.

According to one preferred embodiment of the present invention, the pressure application element is in flat contact with the stress generation layer at least in sections during the pressure application. Preferably, the pressure application element in this case covers more than 20% or more than 30% or more than 50% or more than 75% or more than 90% or all of the surface axially bounding the donor substrate, which after the separation is a constituent of the solid layer. Preferably, the pressure application element in this case bears on the stress generation layer arranged or generated on this surface. Preferably, the pressure application element in this case contacts more than 20% or more than 30% or more than 50% or more than 75% or more than 90% of the surface of the stress generation layer overlying the donor substrate in the axial direction.

According to another embodiment of the present invention, the at least one pressure application element generates the pressure in an edge region, the edge region preferably comprising the outer in the radial direction, or off-center, or peripheral 5% or 10% or 15% or 20% or 30% or 40% or 50% or 60% or 70% or 80% of the surface of the stress generation layer arranged on the donor substrate, and/or the at least one pressure application element generates the pressure in a central region, the central region preferably comprising the inner in the radial direction, or central, or extending as far as the center 5% or 10% or 15% or 20% or 30% or 40% or 50% or 60% or 70% or 80% of the surface of the stress generation layer arranged on the donor substrate, or the at least one pressure application element generates the pressure over the entire planar fraction of the surface, on which the stress generation layer is arranged, of the donor substrate. This embodiment is advantageous since the pressure for influencing the crack propagation may be applied as required.

According to one preferred embodiment of the present invention, the pressure application element is arranged in a mobile fashion and is deflected relative to the donor substrate by the stress generation layer as a result of the thermal action on the stress generation layer, or the donor substrate is arranged in a mobile fashion and is deflected relative to the pressure application element by the stress generation layer as a result of the thermal action on the stress generation layer. Preferably, by means of a pressure or force measuring device, the applied pressure or the applied force (per unit area) is recorded and/or the deflecting force generated by the polymer material, or the polymer layer, or the polymer film, is recorded and added to the process data and/or wafer data.

The deflection of the pressure application element in this case preferably does not take place until after a predefined minimum force is exceeded. The predefined minimum force is preferably additionally or alternatively a constituent of the process data and/or wafer data.

According to another preferred embodiment of the present invention, the modifications are generated along a line, in particular point line/s or line/s generated from points, or a plurality of, in particular parallel, lines in order to form modification lines, or wherein the modifications are generated while forming a modification line or a plurality of, in particular parallel, modification lines, in particular point line/s or line/s generated from points. According to another preferred embodiment of the present invention, the individual modifications generate compressive stresses in the donor substrate, so that the donor substrate cracks at least for the most part in the extent direction of the crystal lattice planes, which is preferably inclined relative to the main surface, due to the modification line or modification lines.

According to another preferred embodiment of the present invention, the modifications are generated for each modification line in such a way that, when there are more than M crystal lattice dislocations (per cm2) in the donor substrate, the crack for each modification line propagates in the extent direction of the crystal lattice planes which are inclined relative to the main surface less than 50 μm from the next point of the modification line or the generation, or the modifications are generated for each modification line in such a way that, when there are fewer than O crystal lattice dislocations (per cm2) in the donor substrate, the crack for each modification line propagates in the extent direction of the crystal lattice planes which are inclined relative to the main surface more than 100 μm, in particular more than 200 μm or more than 250 μm or more than 300 μm or more than 350 μm, or the modifications are generated for each modification line in such a way that, when there are more than O crystal lattice dislocations (per cm2) in the donor substrate and fewer than M crystal lattice offsets (per cm2) in the donor substrate, the crack for each modification line propagates in the extent direction of the crystal lattice planes which are inclined relative to the main surface between 50 μm and 100 μm, in particular between 50 μm and 100 μm or 50 μm and 200 μm or 50 μm and 250 μm or 50 μm and 300 μm or 50 μm and 350 μm. In this case, particularly preferably, O<M.

This solution is advantageous since a treatment rule is provided for different material qualities. Using this treatment rule, donor substrates of different quality can be split reliably and with low material losses. In addition or as an alternative, the treatment rule defines that with an increasing material quality, i.e. a decreasing dislocation density, longer cracks or longer subcritical cracks are to be provided. Conversely, in the case of a lower material quality, i.e. an increasing dislocation density or crystal lattice dislocation density, shorter cracks are to be provided.

This solution is furthermore advantageous since the analysis device for determining at least one individual property of the respective donor substrates records or analyzes or determines the crystal lattice offsets of one or more donor substrates.

As an alternative, it is however possible that the data device uses the data of the analysis device and crystal lattice dislocation data for generating donor substrate process data for, in particular, individual donor substrates. The donor substrate process data in this case preferably comprises analysis data of the analysis device, which preferably comprise or represent or have data for doping of the donor substrate. The analysis device may therefore be a device for preferably wafer-resolved property determination. The data device then preferably generates donor substrate process data which comprise at least or precisely two properties of the donor substrate, namely the crystal lattice dislocation density, particularly in relation to the whole donor substrate, and/or the doping, in particular wafer-resolved, and/or refractive index, in particular wafer-resolved. It is in this case possible for the doping to be determined by the analysis device and for the crystal lattice dislocation density information to be provided in data form. As an alternative, the crystal lattice dislocation density may likewise be recorded by the analysis device or the crystal lattice dislocation density may be recorded, or determined, by a crystal lattice dislocation device.

The cracks propagating around the modifications may in this case also be referred to as subcritical cracks. Subcritical cracks are cracks which are connected to one another only by a subsequent main crack and split the donor substrate by the connection, in particular splitting it into a solid layer and the remaining solid. As an alternative, subcritical cracks may in this case also be referred to as microcracks.

The dislocations, or crystal lattice dislocations, can be made visible and counted by means of etching methods on a surface. The dislocation density is preferably to be understood as an average dislocation density over the entire surface—they are preferably "threading dislocations", which means dislocations that "penetrate through a surface" or reach as far as the surface (for example, they may be seen by etching them there) or "penetration dislocations". This therefore describes a classification according to the dislocation direction in relation to the surface. In addition or as an alternative, the dislocations may be described or defined by the dislocation type (step and/or screw dislocation).

One important action mechanism is that the microcracks, or the subcritical cracks, which are generated by the laser modification, cause stresses inside the solid. These stresses ensure that the main crack advantageously continues along with the aid of the preliminary damage. This effect is primarily achieved by the vertical component of the crack propagation being suppressed by the compressive stresses introduced. The magnitude of the stresses introduced may in this case depend very greatly on the length of the microcracks. For example, two short microcracks have a significantly lower stress than a single microcrack with a length which corresponds to adding the lengths of the two microcracks together. This leads to the effect that the introduced internal stress of many short cracks is less than the stress of a few long cracks, even if the total crack length is the same in both cases. This may, for example, likewise be observed when the entire solid surface experiences preliminary damage. According to the invention, therefore, in crystals with few dislocations and a very high associated strength, preferably more internal stresses are generated in the solid. This may, in particular, be achieved by fewer but instead longer microcracks.

The stress which is required in order to make a microcrack grow decreases with the size of the microcrack.

According to one preferred embodiment of the present invention, O is 250 $cm^{-2}$, in particular 500 $cm^{-2}$ or 1000 $cm^{-2}$ or 2000 $cm^{-2}$ or 3000 $cm^{-2}$. In addition or as an alternative, M is preferably 5000 $cm^{-2}$, in particular 7500 $cm^{-2}$ or 10000 $cm^{-2}$ or 12500 $cm^{-2}$. This embodiment is advantageous since a defined crack propagation results, or is generated, as a function of the dislocations of a donor substrate material, in particular of a specific boule or ingot, in particular a defined batch or production run.

According to another preferred embodiment of the present invention, in addition or as an alternative, the propagation of the crack takes place in the extent direction, which is inclined relative to the main surface, of the crystal lattice planes as a function of the size of the individual modifications. Preferably, at least most of the modifications are generated with a volume of less than A or the modifications of a modification line are generated with an average modification volume of less than A when the number of crystal lattice dislocations (per $cm^2$) is greater than M, or at least most of the modifications are generated with a volume of more than C or the modifications of a modification line are generated with an average modification volume of more than C when the number of crystal lattice dislocations (per $cm^2$) is less than O, or at least most of the modifications are generated with a volume of between A and C when the number of crystal lattice dislocations (per $cm^2$) lies between M and O. In this case, particularly preferably, A<C.

The size of a modification is preferably the volume of the modification. In the case of SiC, the blackening of the material, in particular the material fractions varied by a substance conversion, represents the size or the volume of the modification.

This solution is advantageous since a treatment rule is provided for different material qualities. Using this treatment rule, donor substrates of different quality can be split reliably and with low material losses. In addition or as an alternative, the treatment rule defines that with an increasing material quality, i.e. a decreasing dislocation density, larger modification volumes are to be provided. Conversely, in the case of a lower material quality, i.e. an increasing dislocation density, smaller modification volumes are to be provided.

According to another preferred embodiment of the invention, the volume A or the average volume A is less than or equal to 100 $\mu m^3$, in particular less than or equal to 75 $\mu m^3$ or less than or equal to 50 $\mu m^3$ or less than or equal to 25 $\mu m^3$, and/or the volume C is greater than or equal to 250 $\mu m^3$, in particular greater than or equal to 500 $\mu m^3$ or greater than or equal to 750 $\mu m^3$ or greater than or equal to 1000 $\mu m^3$. This embodiment is advantageous since a defined modification volume or average modification volume results, or is generated, as a function of the dislocations of a donor substrate material, in particular of a specific boule or ingot, in particular a defined batch or production run.

According to another preferred embodiment of the present invention, in addition or as an alternative, the propagation of the crack takes place in the extent direction, which is inclined relative to the main surface, of the crystal lattice planes as a function of laser energy provided in order to generate the respective modifications. Preferably, at least most of the modifications are generated with a laser energy of less than D or the modifications of a modification line are generated with an average laser energy of less than D when the number of crystal lattice dislocations (per $cm^2$) is greater than M, or at least most of the modifications are generated with a laser energy of more than E or the modifications of a modification line are generated with an average laser energy of more than E when the number of crystal lattice dislocations (per $cm^2$) is less than O, or at least most of the modifications are generated with a laser energy of between D and E when the number of crystal lattice dislocations (per $cm^2$) lies between M and O. In this case, particularly preferably, D<E.

This solution is advantageous since a treatment rule is provided for different material qualities. Using this treatment rule, donor substrates of different quality can be split reliably and with low material losses. In addition or as an alternative, the treatment rule defines that with an increasing material quality, i.e. a decreasing dislocation density, a higher laser energy is to be provided, in particular is to be used for the modification. Conversely, in the case of a lower material quality, i.e. an increasing dislocation density, a lower laser energy is to be provided, in particular to be used for the modification.

According to another preferred embodiment of the present invention, the laser energy D per modification, or the average laser energy D per modification is less than or equal to 10 µJ, in particular greater than or equal to 5 µJ or greater than or equal to 3 µJ or greater than or equal to 2 µJ, and/or the laser energy E or the average laser energy E is greater than or equal to 30 µJ, in particular greater than or equal to 50 µJ or greater than or equal to 100 µJ or greater than or equal to 200 µJ. This embodiment is advantageous since a defined laser energy or average laser energy results, or is generated, as a function of the dislocations of a donor substrate material, in particular of a specific boule or ingot, in particular a defined batch or production run.

According to another preferred embodiment of the present invention, in addition or as an alternative, a multiplicity of mutually parallel modification lines are generated, the distance between directly neighboring modification lines at least for most of the modification lines in the case of more than M crystal lattice dislocations (per $cm^2$) being less than J or, in the case of fewer than O crystal lattice dislocations (per $cm^2$) being greater than K or, in the case of fewer than M crystal lattice dislocations (per $cm^2$) and more than O crystal lattice dislocations (per $cm^2$) lying between J and K. In this case, particularly preferably, J<K.

This solution is advantageous since a treatment rule is provided for different material qualities. Using this treatment rule, donor substrates of different quality can be split reliably and with low material losses. In addition or as an alternative, the treatment rule in this case defines that with an increasing material quality, i.e. a decreasing dislocation density, larger distances are to be provided between respectively two directly neighboring modification lines. Conversely, in the case of a lower material quality, i.e. an increasing dislocation density, smaller distances are to be provided between respectively two directly neighboring modification lines.

According to another preferred embodiment of the present invention, the distance J is less than or equal to 15 µm, in particular less than or equal to 40 µm or less than or equal to 25 µm or less than or equal to 10 µm, and/or the distance K is greater than or equal to 80 µm, in particular greater than or equal to 100 µm or greater than or equal to 150 µm or greater than or equal to 250 µm. This embodiment is advantageous since a defined distance between respectively two directly neighboring modification lines results, or is generated, as a function of the dislocations of a donor substrate material, in particular of a specific boule or ingot, in particular a defined batch or production run.

Another important action mechanism is that tearing of the solid is hindered by the laser modifications. This effect may occur because the modifications are preferably precisely where the solid, or the donor substrate, is intended to slide along the microcracks. Although the running dislocations of the fracture can propagate very well along these microcracks, at some point they necessarily encounter the modification which is the cause of the occurrence of the microcracks. Clearly, the crystal structure is broken inside the modification, so that the fracture cannot progress further along the previous fracture plane. Rather, the fracture must go around the modification. For example, this may happen by the fracture continuing along a surface of the modification, in the vicinity of the interface of material with a phase conversion and the "normal" crystal. In this case, the situation arises that the material of the phase conversion is primarily associated with a particular side of the fracture surface, in particular the material of the phase conversion being primarily on the boule side and less on the wafer side. The circumvention of the laser modification requires extra energy, and it is therefore advantageous to generate the laser modifications themselves further away from one another, in particular when the material has a high strength because of few dislocations. This may, for example, be done by adapting the line spacing of the modifications to the crystal quality. In particular, a larger spacing of the modifications for low dislocation densities.

Another possibility consists in forming fewer modifications within a line, i.e. to increase the distance between two modifications along a processing path. In this case, distances of >10 µm and/or >15 µm, and/or >20 µm and/or >30 µm, but particularly preferably <500 µm or preferably <300 µm, are advantageous.

According to another preferred embodiment of the present invention, the modifications are generated on a generation plane, in particular on at least one generation plane or on precisely one generation plane, the crystal lattice planes of the donor substrate in this case preferably being aligned with an inclination relative to the generation plane, in particular at an angle of between 0.1° and 10°, in particular between 1° and 6°, in particular between 2° and 4° or at an angle of 2° or 4°, a crystal lattice plane normal preferably being inclined in a first direction relative to a main surface normal. The modification lines are in this case preferably aligned with an inclination relative to a line of intersection resulting at the intersection between the generation plane and the crystal lattice plane. The angle is in this case preferably not equal to 0° and not equal to 90° and not equal to 180° and not equal to 270° and not equal to 360°. This embodiment is advantageous since each modification preferably intersects a different totality of crystal lattice planes. The effect of this is that the likelihood that a crack will propagate only with a predefined length increases, or is very high.

According to another preferred embodiment of the present invention, in addition or as an alternative, the modification lines are aligned with an inclination relative to the line of intersection resulting at the intersection between the generation plane and the crystal lattice plane at an angle of less than the angle P or an angle greater than the angle Q or an angle between P and Q. In this case, the modification lines are preferably generated at an angle of less than the angle P when the number of crystal lattice dislocations (per $cm^2$) is greater than M, or the modification lines are generated at an angle greater than the angle Q when the number of crystal lattice dislocations (per $cm^2$) is less than O, or the modification lines are generated at an angle between the angles P and Q when the number of crystal lattice dislocations (per $cm^2$) lies between M and O.

This solution is advantageous since a treatment rule is provided for different material qualities. Using this treatment rule, donor substrates of different quality can be split reliably and with low material losses. In addition or as an alternative, the treatment rule defines that with an increasing material quality, i.e. a decreasing dislocation density, the modification lines are preferably generated at an angle greater than the angle Q relative to the line of intersection. Conversely, in the case of a lower material quality, i.e. an increasing dislocation density, the modification lines are preferably generated at an angle of less than the angle P relative to the line of intersection.

According to another preferred embodiment of the present invention, the angle P is less than or equal to 10°, in particular less than or equal to 8° or less than or equal to 6° or less than or equal to 4°, and/or the angle Q is greater than or equal to 10°, in particular greater than or equal to 15° or greater than or equal to 20° or greater than or equal to 25°. This embodiment is advantageous since a defined angle between the modification lines and the line of intersection results, or is generated, as a function of the dislocations of a donor substrate material, in particular of a specific boule or ingot, in particular a defined batch or production run.

According to another preferred embodiment of the present invention, the donor substrate comprises or consists of SiC or the donor substrate comprises or consists of sapphire ($Al_2O_3$). This solution is advantageous since both materials are very hard, and low-loss separating methods are therefore most efficient with such materials because of the material hardness.

The aforementioned object is likewise achieved by a method for separating at least one solid slice from a donor substrate. This method in this case preferably comprises at least one of the preceding methods for generating microcracks in a donor substrate and at least the step mentioned below:

Generating as many modifications in the same plane until the cracks generated by the modifications separate the solid slice from the donor substrate, or initiating an external force in the donor substrate in order to connect the cracks. This solution is advantageous since a for initiating the external force a receiving layer is arranged on an exposed surface of the donor substrate, in particular on the solid layer to be separated, the receiving layer comprising a polymer material, in particular PDMS, and thermal action being applied to the receiving layer for in particular mechanical generation of stresses in the solid, the thermal action representing cooling of the receiving layer to a temperature below the ambient temperature, in particular to a temperature below 0° or to a temperature below −10° or to a temperature of between −20° and −200° C., the cooling being carried out in such a way that the polymer material of the receiving layer completes a glass transition, and because of the stresses the a main crack in the solid propagating along the separating region, in particular while connecting the cracks, in particular subcritical cracks, generated by the modification lines.

According to another preferred embodiment of the present invention, the initiation of the external force is carried out at an ambient temperature and/or a core temperature of the donor substrate of less than 10° C. or less than or equal to 1° C. or less than or equal to 0° C. or less than or equal to −1° C. or less than or equal to −10° C. or less than or equal to −50° C. or less than or equal to −100° C. or less than or equal to −125° C. or less than or equal to −150° C. or less than or equal to −175° C. This solution is advantageous since the lattice planes slide better at low temperatures. This preferably results from their being fewer disruptions of the sliding by movements in the crystal.

According to another preferred embodiment of the present invention, the average propagation rate of the main crack in the radial direction of the donor substrate is less than 5 cm/second or less than 3 cm/second or less than 1 cm/second, in particular less than 0.5 cm/second and preferably less than 0.1 cm/second. The average propagation speed of the main crack in the radial direction of the donor substrate preferably lies between 0.5 cm/second and 0.1 cm/second, in particular between 0.4 cm/second and 0.15 cm/second or between 0.35 cm/second and 0.2 cm/second. This embodiment is advantageous since very precise crack guiding can be achieved by a slow crack propagation rate.

The path of the crack preferably always follows the same pattern. After the start of the crack at the edge, the crack has a higher speed along the edge than in the direction of the middle of the solid. This means that the crack initially continues on two sides (one to the left, the other to the right) of the edge (because the force action is greatest there) and the two cracks meet again on the opposite side of the start of the crack. The fracture then closes concentrically toward the middle. It is possible to advantageously influence the crack speeds by a stress field introduced. If, for example, the intention is for there to be more stresses at the edge than in the middle, for example in order to promote the closure of the fracture, longer microcracks and/or fewer laser modifications and/or more energy in the laser modifications are then advantageous in the edge region. It may likewise be advantageous to generate greater stresses precisely in the middle of the laser modification plane, because the external force action is less there than at the edge. Then, for example, it is advantageous to introduce longer microcracks and/or fewer laser modifications and/or more energy into the laser modifications in an inner radius of less than <7 cm, <5 cm, <3 cm, <1 cm.

The subject-matters of the patent application DE 10 2017 003 830.9 filed by the Applicant at the German Patent and Trade Mark Office (DPMA) are hereby fully incorporated by reference into the subject-matter of the present patent application.

The use of the words "substantially" preferably defines, in all cases in which these words are used in the scope of the present invention, a deviation in the range of 1%-30%, in particular of 1%-20%, in particular of 1%-10%, in particular of 1%-5%, in particular of 1%-2%, from the definition which would be given without the use of these words. Some or all representations in the figures described below are preferably to be regarded as design drawings, i.e. the dimensions, proportions, functional relationships and/or arrangements given by the figure or figures preferably correspond precisely or preferably substantially to those of the apparatus according to the invention or of the product according to the invention. Further advantages, aims and properties of the present invention will be explained with the aid of the description that follows for accompanying drawings, in which apparatuses according to the invention are presented in an exemplary manner. Elements of the apparatuses and methods according to the invention which correspond at least substantially in respect of their function in the figures may in this case be denoted by the same references, although these components or elements need not be numbered or explained in all the figures.

BRIEF DESCRIPTION OF THE FIGURES

The invention will be described purely by way of example below with the aid of the appended figures, in which:

FIG. 1a schematically shows a production facility according to the invention which consists of a simple production unit;

FIG. 1b schematically shows a production facility according to the invention which comprises a plurality of production units, the production units using at least one device in common or with a time offset or in parallel;

FIG. 1c schematically shows a production facility according to the invention which comprises a plurality of production units, the production units using at least one device in common or with a time offset or in parallel;

FIG. 1d schematically shows a concatenation of a plurality of production units;

FIGS. 5a-5d show schematic representations of an exemplary laser device with an air gap bearing;

FIG. 7a schematically shows one example of an application device;

FIG. 7b schematically shows an alternative example of an application device;

FIG. 9a schematically shows one example of an alternative separating device in a starting configuration;

FIG. 9b schematically shows a further representation of the alternative separating device in a crack generation configuration or crack propagation configuration;

FIG. 12 schematically shows the relationship between the doping spot and the variation of the position of the modification generation;

FIG. 13 schematically shows the relationship between the maximization of the output and the reduction of planarization margins;

DETAILED DESCRIPTION

Figure 2:
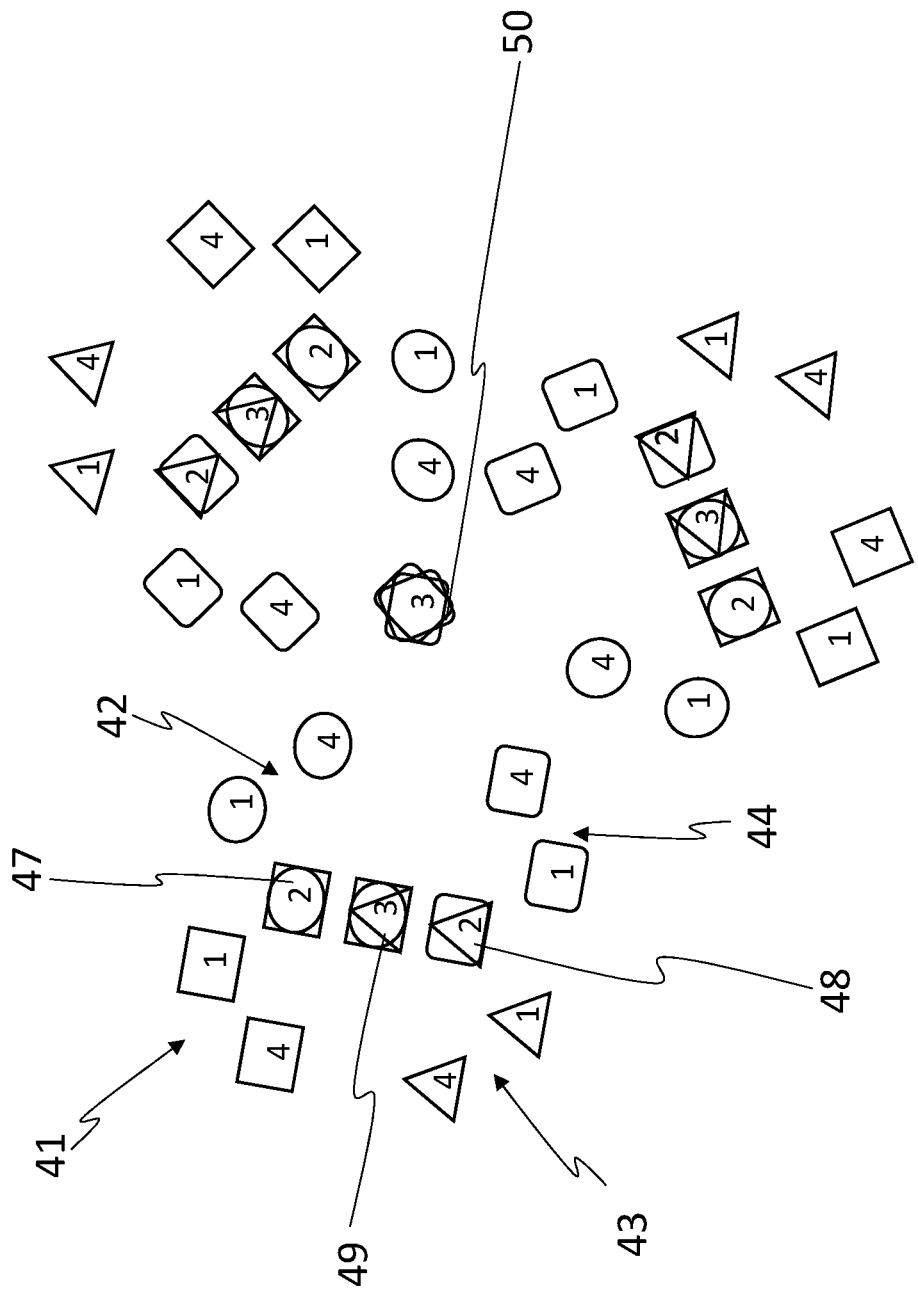
FIG. 2 schematically shows a production facility consisting of 12 production units, some devices being used by two or more production units.

FIG. 1a schematically shows an arrangement of preferred devices of a production facility 40 according to the invention. The device 1 is in this case denoted by the reference 12 and represents a laser device, the device 2 is denoted by the reference 181 and preferably represents an application device, the device 3 is denoted by the reference 18 and represents a separating device, and the device 4 is denoted by the reference 26 and represents a surface treatment device. Preferably, the functional unit of these four devices provides a functional unit 41, wherein a production facility 40 may consist of a multiplicity of production units 41-44 functionally coupled to one another or independently operable.

FIG. 1b shows two exemplary production units 41, 42 of the production facility 40. The production unit 41 and the production unit 42 in this case use the same application device. The delivery direction of the production unit 41 is in this case oriented in the clockwise direction and the delivery direction of the production unit 42 is oriented counter thereto.

FIG. 1c shows a variant of the arrangement shown in FIG. 1b. According to this variant, the two production units 41 and 42 likewise share a device, the transport direction of the two production units 41, 42 extending in the same direction.

The devices used together by two or more production units are in this case preferably selected by means of the processing speed. For example, it is expedient to allocate a device that is operable twice as fast as another device to two production units 41, 42. If one device is operable three times as fast or about three times as fast as another device, this rapidly operable device may be allocated to three production units.

FIG. 1d shows a series arrangement of various production units 41-44 of a production facility 40. Preferably, one production unit may be provided for each wafer to be separated. Particularly preferably, however, processing in a predefined height range or length range of the donor substrate 4 is carried out with each production unit. In the present example, the total length of the donor substrate 4 may be divided between arbitrarily many, in particular between four, production units 41-44. In this example, a high fraction or length fraction L1 of the donor substrate 4 is thus converted into wafers 2 by the production unit 41. That is to say, the production units 41-44 preferably each process the respective high fraction of the donor substrate 4 at least 2 times, and particularly preferably up to 10 times or up to 20 times or up to 50 times or up to 100 times. Processing of the length fraction L2 is therefore carried out by the production unit 42 and processing of the length fraction L3 is preferably carried out by the production unit 43. The production unit L4 is preferably used for processing the length fraction L4. The total length L of the donor substrate in this case consists of a multiplicity of length fractions, in particular of the length fractions L1, L2, L3 and L4. It is in this case possible for the length fractions to have substantially or exactly the same length or to differ from one another in length.

Furthermore, the embodiments shown in FIGS. 1b and 1c and 2 may be combined with the concept of FIG. 1d. That is to say, a plurality of production units form one arrangement for processing a length fraction of a donor substrate 4, in which case the individual production units 41-44 of the respective arrangement may have devices in common.

FIG. 2 shows purely by way of example a representation according to which each production unit comprises the devices 1 and 4. The devices 2 and 3 are in this case used together with other production units. The devices 2 are in this case used by respectively two production units and the devices 3 are in this case used by 3 production units. According to the present representation, 12 production units with 4 devices each can therefore be provided with only 34 devices. That is to say, it is possible to save on 14 devices, so that the requirements for area and machine costs can be reduced significantly.

Figure 3:
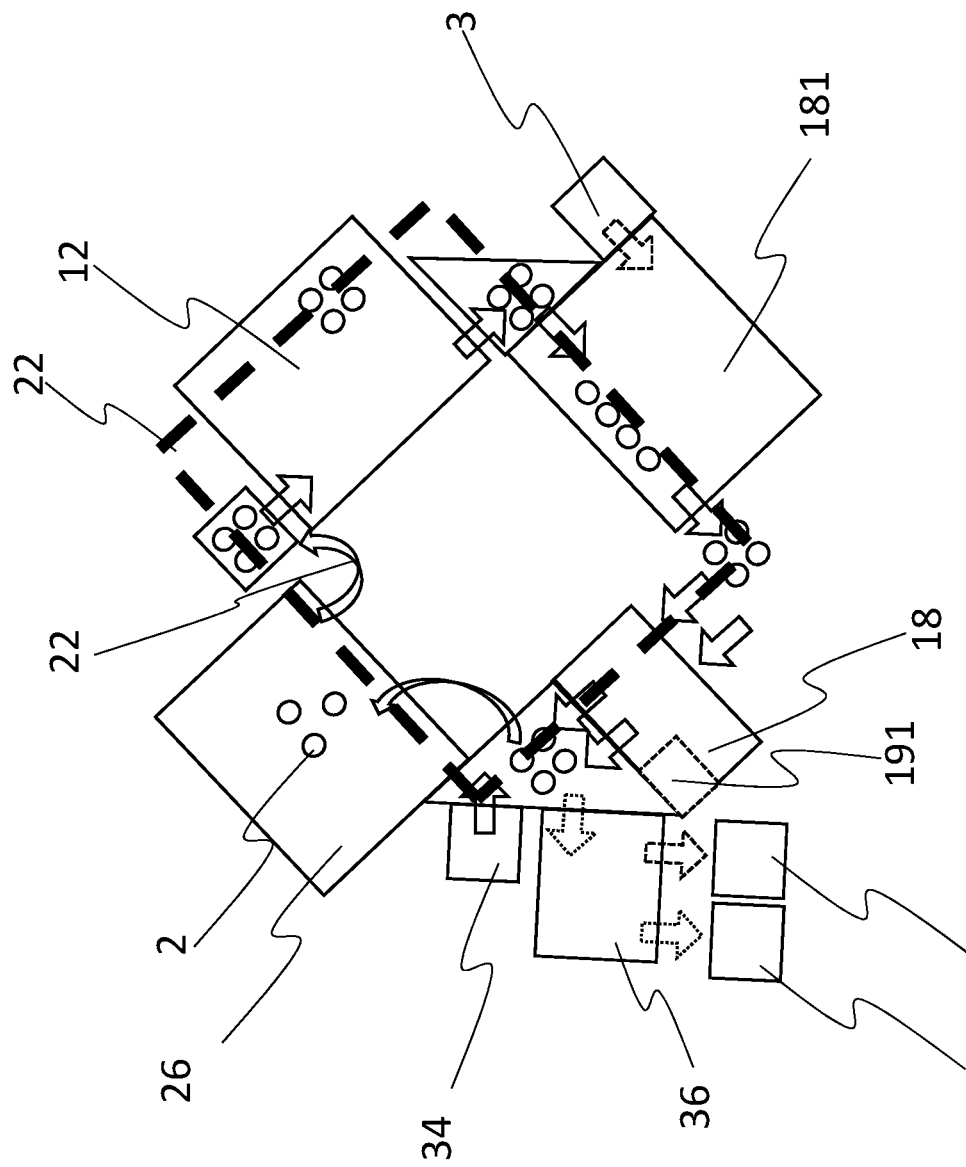
FIG. 3 schematically shows the structure of a preferred production unit.

FIG. 3 shows a preferred configuration of the production facility 40 according to the invention for separating wafers 2 from donor substrates 4. The production facility 40 in this case preferably comprises at least one or a multiplicity of production units (cf. FIG. 1-2). Preferably, each production unit 41-44 preferably individually comprises a laser device 12 for generating modifications 14 (cf. FIG. 8, 9a, 12) inside the donor substrate 4 in order to form a separating region 16 (cf. FIG. 8, 9a, 12) inside the respective donor substrate 4. The laser device 12 is in this case preferably operable as a function of the donor substrate process data of a specific donor substrate 4 in order to process the specific donor substrate 4.

Furthermore, the production unit preferably likewise comprises a separating device 18 for generating mechanical stresses inside the respective donor substrate 4 in order to initiate and/or guide a crack in order to separate respectively at least one wafer 2 from a donor substrate 4 along the separating region 6. Furthermore, each of these production units 41-44 may comprise a surface preparation device 26 and/or an application device 181, in particular a laminating device, for applying or generating a polymer layer 3, or stress generation layer. If the production facility 40 is intended to be formed by a plurality of production units 41-44, some devices such as the surface preparation device 26 and/or the application device 181 and/or the laser device 12 and/or the separating device 18 may then be allocated to a plurality of production units. That is to say, the same device is then understood, or used, as a constituent of a plurality of production units 41-44.

The reference 34 in this case denotes a feed and/or extraction device for feeding or extracting donor substrates. The donor substrate 4 is conveyed by means of a transport device 22 to the surface treatment device 26. After treatment has been carried out, the donor substrate 4 is by means of the transport device 22 to the laser device 12. After treatment has been carried out, the donor substrate is conveyed by means of the transport device 22 to the application device 181. After successful treatment, the donor substrate 4 is conveyed to the separating device 18. The separated wafer 2 is conveyed by means of the transport device 22 or by means of a further transport device preferably to a cleaning device 36 and/or wafer surface treatment device 29. The wafer surface treatment device 29 may in this case be a constituent of the cleaning device 36, or vice versa. The cleaning device 36 causes separation of the wafer 2 and the stress generation layer 3.

In relation to a specific embodiment in relation to the cold splitting process, the aforementioned process chamber or production unit 41-44 preferably represents a minimum configuration which may be expanded by additional stations or treatment devices. It is, however, in this case essential that instead of the thermally induced crack initiation, in addition or as an alternative, another crack initiation effect may be implemented, in particular the alternative introduction of an external force, in particular by means of ultrasound or tensile force application.

In the case of the cold splitting process, a heating station 191 for heating the donor substrate 4 reduced immediately previously as a result of the crack propagation and/or the separated wafer 2 is preferably expedient. In this case, immediately means preferably less than 10 min, in particular less than 5 min or less than 1 min or less than 0.5 min. The heating station 191 may in this case be arranged in the treatment path of the donor wafer 4 or of the wafer 2 after the separating device 18 or as a constituent of the separating device 18.

For the heating of the donor substrate 4, the same preferably applies as for the cooling. A homogeneous volume heat treatment of semiconductor donor substrates 4 is preferred to heterogeneous heat treatment according to the present invention. Heating is therefore preferably carried out, for example, in the radiofrequency AC field of a microwave and less preferably by means of a heating plate.

A microwave treatment preferably involves radiation in the wavelength range of from 1 m to 1 mm, or 300 MHz to 300 GHz. In order to prevent possible interference with other applications from the telecommunication technology or other radar applications, a fixed frequency of 2.45 (±0.05) GHz is preferably used for industrial applications. Microwave reactors are operated according to the invention temporarily or permanently in the radiofrequency range, RF range, in the scope of the present invention a radiofrequency range being understood as from 100 MHz to 100 GHz, in particular between 100 MHz and 50 GHz or also from 100 MHz to 40 GHz. Preferred frequency ranges are, for instance, between 1 MHz to 100 GHz, in which case 10 MHz to 50 GHz are particularly preferred. The reactors are in this case preferably operated in parallel. Particularly preferably, magnetrons, in particular at 1.0 to 5 MHz and preferably at 2.4 MHz, are used for the heating of the donor substrate and/or of the wafer.

This is advantageous since by irradiation of a solid, or a donor substrate 4, in this wavelength range, polarization interaction of freely mobile dipole molecules (for example incorporated water—orientation polarization) or else polarization of electrical charge carriers (ion polarization, electrons) in the solid takes place. At the rate of the radiofrequency microwave field, for example, valence or rotation oscillations are excited, which because of the resulting intermolecular friction absorb the radiofrequency energy and convert it into heat, and therefore allow uniform heating of solids, in particular donor substrates and/or wafers, in a short time, in particular less than 45 min or less than 30 min or less than 15 min. In the case of electron or ion polarization of the dielectrics, the radiofrequency energy in the microwave field (dielectrics) is absorbed and converted into heat energy because of the electrical resistance of the conductor. In the case of metallic conductors, a relatively large part of the radiation introduced is already reflected on the metal surface. In the case of an unfavorable (large) ratio of surface area to volume (for example films, wafers), a strong elevation of the surface temperature may occur since in this case strong electron excitation may occur on the metal surface and, because of the cross section-dependent electrical resistance, this cannot sufficiently be dissipated over the volume. This effect is advantageous since it may be used deliberately to influence the surface topology by local temperature elevation (melting). Preferably, this is applied in the scope of the present invention in order to reduce a frequency of rough peaks (Rz, Sz) present on the splitting surface.

Furthermore, process-accompanying measurement technology (cf. comments regarding FIG. 4) is preferably provided for parameter monitoring, in particular for determining the variation potentials (cf. comments regarding FIG. 15) for reducing margins (cf. comments regarding FIG. 13) and/or for throughput monitoring and/or for documentation. This is advantageous since a further throughput increase, even in the case of full automation, and an improvement of the output per donor substrate may thereby be achieved.

Preferably, in this case a plurality of measurement positions or most of the measurement positions or all the measurement positions comprise additional perturbation categories such as "holdup" or "break in the process chain", etc. This is advantageous since a frictionless and process-spanning flow is thereby provided, since preferably upstream and/or downstream perturbations of the process tools or devices and/or production unit/s involved may also be identified and it is therefore possible to react to them correspondingly. A sufficiently high total facility effectiveness may thus be ensured over all process steps.

Figure 4:
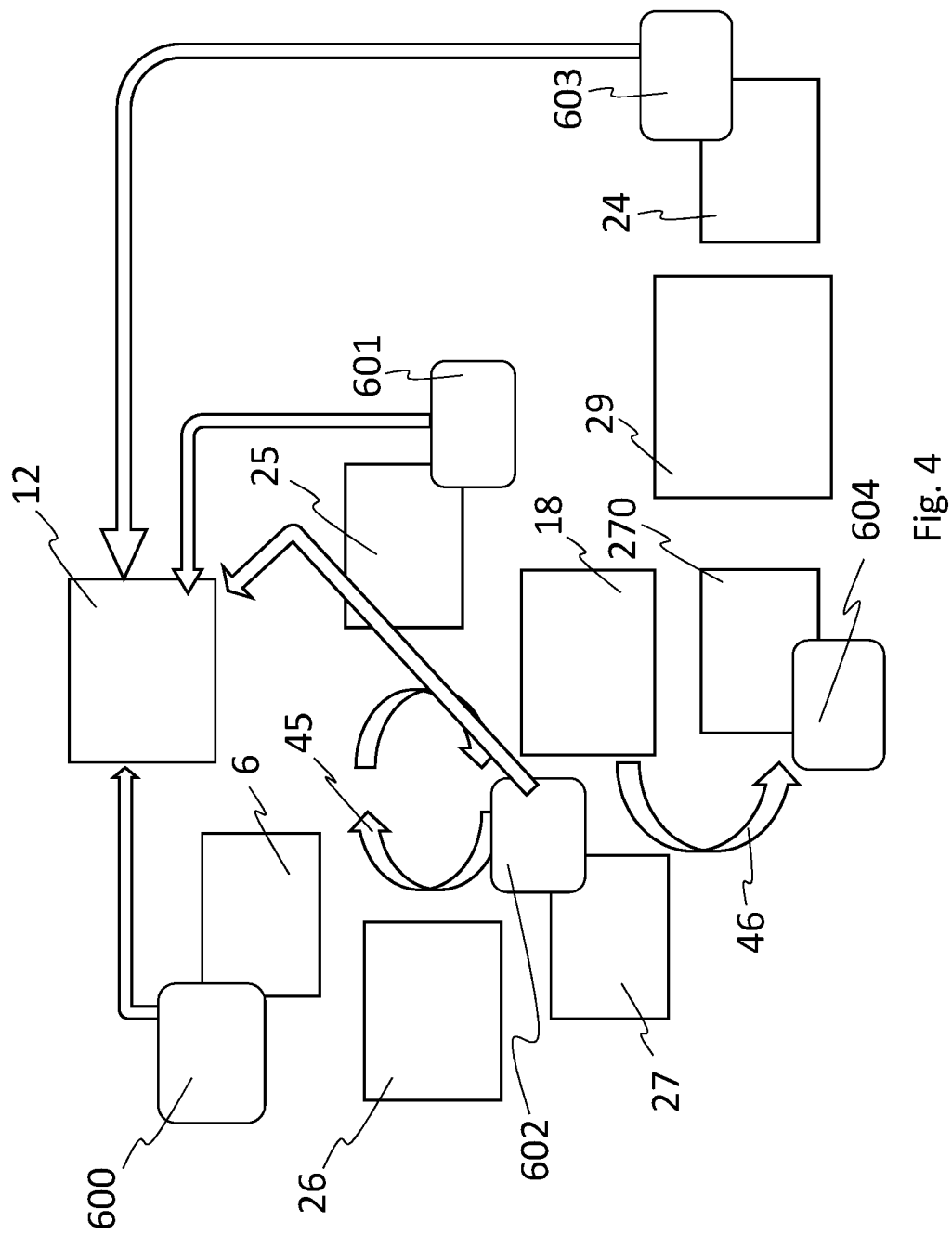
FIG. 4 schematically shows the production unit supplemented with measuring devices for recording measurement values or for generating device-specific and/or donor substrate-specific data.

FIG. 4 shows that the production facility 40 preferably likewise comprises one or at least one analysis device 6 for determining at least one individual property, in particular the doping, of the respective donor substrate 4. A data device D (cf. FIGS. 14-17) or processor device is furthermore provided for generating donor substrate process data for individual donor substrates 4. The donor substrate process data in this case preferably comprise analysis data 600 of the analysis device 6, the analysis data 600 describing at least the one individual property of the donor substrate 4.

The donor substrate process data for driving the laser device 12 may in this case be modified, in particular adapted to the individual properties of the specific donor substrate 4, by data of a plurality of preferably different measuring devices 6, 24, 25, 26, 27, 270.

The measuring device 25 is in this case preferably a modification measuring device and preferably provides modification measurement data. The measuring device 25 is in this case preferably configured as a constituent of the laser device 12 or in the processing path after the laser device 12 or as a constituent of the application device 18. Modification measurement data 601 are preferably generated by the measuring device 25, the modification measurement data 601 preferably describing the roughness and/or the height profile of the modifications, in particular position-resolved, and/or of the microcracks, in particular position-resolved, and/or the length of the microcracks, in particular position-resolved.

The measuring device 27 is preferably configured as a measuring device for determining the surface properties of the exposed surface of the donor substrate 4 after the separating step, or the wafer separation. Data 602 for determining the surface properties of the exposed surface of the donor substrate after the separating step are preferably provided by the measuring device 27. The measurement data 602 may in this case comprise data for the separation surface of the donor substrate 4, in particular for the roughness (x,y) and/or the height profile, in particular position-resolved. The measuring device 27 is preferably configured in the donor substrate treatment sequence after the separating device 18 or as a constituent of the separating device 18. As an alternative, the measuring device 27 may be configured as a constituent of the surface preparation device 26.

The measuring device 270 is preferably configured as a measuring device for determining the surface properties of the exposed surface of the wafer 2 after the separating step, or the wafer separation. Data 604 for determining the surface properties of the exposed surface of the wafer 2 after the separating step are preferably provided by the measuring device 270. The measurement data 604 may in this case comprise data for the separation surface of the wafer 2, in particular for the roughness (x,y) and/or the height profile, in particular position-resolved. The measuring device 270 is preferably configured in the donor substrate treatment sequence after the separating device 18 or as a constituent of the separating device 18. As an alternative, the measuring device 270 may be configured as a constituent of the wafer surface preparation device 29.

The measuring device 24 is preferably configured as a measuring device for recording the final thickness of the wafer. Data of the measuring device, in particular structural data, which for example reflect the thickness of the wafer after the treatment by means of the wafer surface preparation device 29 are preferably generated by the measuring device 24. The measuring device 24 is configured in the wafer treatment sequence preferably after the wafer surface treatment device 29 or as a constituent thereof.

The analysis device 6 is preferably configured for analyzing direct optical properties, in particular the spatially resolved refractive index and absorption values (of the n and k profile (x,y) of the wafer surface) and/or for analyzing indirect optical properties, in particular the doping profile (x,y) and/or for determining the residual thickness of the residual donor substrate or donor substrate 4 treated after the surface preparation by means of the surface preparation device 26. The refractive index values determine the calculation of the scribing depth, and the absorption values must be used in order to achieve a precisely predetermined laser pulse energy at a given scribing depth. The analysis device 6 preferably generates analysis data 600, the analysis data preferably representing the direct optical properties, in particular the "n and k profile (x,y)" and/or the indirect optical properties, in particular the doping profile (x,y), and/or the residual thickness of the donor substrate 4 in particular the boule or ingot. The analysis device 6 is configured in the donor substrate treatment sequence preferably after the surface preparation device 26 or as a constituent of the surface operation device 26. As an alternative, the analysis device may be a constituent of the laser device 12.

Individual or several of the aforementioned data 600, 601, 602, 603, 604 may be used for modification of the donor substrate process data, in particular for driving the laser device 12. The laser device 12 is preferably driven at least as a function of data relating to the height profile of the main surface of the specific donor substrate 4 and/or data for an energy map (x, y) and/or data for the scribing depth. Depending on the donor substrate 4, a look-up table is therefore preferably provided for implementing an in particular continuous data adaptation, in particular adaptation of the donor substrate process data and/or wafer data, in particular for preferably continuously bringing the modifications 14 generated with the laser device 12 closer to an ideal target position, or target layer. This is advantageous since planarization margins may thus be reduced. Preferably, the data generated by means of the measuring devices are combined (or corrected) with the actual values of the previous processing of the identical or the same donor substrate 4. The "identical preceding substrate 4" is in this case preferably an earlier processed donor substrate 4 (for example the same customer, furnace, boule thickness, material, diameter and/or doping profile).

In order to increase the total facility effectiveness, including process reliability/yield, and in order to reduce the manual interaction time, at least semiautomated processes are preferably used. This means that a production unit 41-44 of the production facility 40 comprises an arrangement of independent facilities (preferably at least laser facility/laser device, plasma laminator/laminating device, separating device/cold splitting chamber) with manual or semiautomated or fully automated loading and unloading.

The process management (for example temperature/time control, motorized lamination etc.) within a production unit 41-44, however, preferably takes place automatically (regulated with program control/sensor assistance). Formulae or handling instructions or method sequences may therefore be compiled/defined, optimized and very accurately reproduced.

Preferably, each production unit 41-44 comprises an automated handover of the workpieces/substrates 4 and/or wafers 2 inside the individual units and/or device/s. This is advantageous since a fully automated production unit 41-44 and therefore a fully automated production facility 40, or cluster tool, is thereby provided, in which preferably only or at least one workpiece/donor substrate 4 is loaded and processed until it is fully consumed in the form of slices/wafers 2.

The cycle of cleaving a slice or a wafer 2 may preferably start immediately after the preparation of the surface of the residual piece, or of the donor substrate 4 reduced by the wafer. If polymer layers 3 are applied on the donor substrate 4, these are then preferably separated from the wafer 2 after the respective cleaving of the respective wafer 2 preferably in the respective production unit 41 or in another production unit 42-44 or outside the production units 41-44. Furthermore, a preparation device, in particular a polymer preparation device, is preferably provided for preparing the polymer layers or polymer films 3 used. In addition or as an alternative, a wafer preparation device 29 is preferably provided, in particular for smoothing and/or cleaning the exposed wafer surface. The preparation device and/or of the wafer preparation device 29 may in this case be a constituent of a production unit 41-44 or be arranged at a distance therefrom. It is furthermore conceivable for the polymer layers 3 to remain on the wafers 2.

For a fully automated production facility 40 or production unit 41-44, as schematically shown in FIG. 1, preferably after the loading of the donor substrate 4, automated handling, in particular including buffer storage, is preferably also provided, accordingly. It is furthermore expedient also to carry out important characterizations or measurements or data generation in an automated fashion inside the facility 40, in particular inside a production unit 41-44, in particular inside a device of the respective production unit 41-44.

The donor substrate 4 or workpiece is preferably fixed, in particular clamped, in a receiving device, in particular on a working table 63 or a carrier device. After the fixing or the clamping process, the donor substrate 4 is preferably measured in the production facility 40. The measurement values, which preferably describe the alignment of the main surface 30 or penetration surface of the donor substrate relative to the laser device 12, are preferably provided in order to modify the donor substrate process data. This is advantageous since the autofocus must not exceed corresponding or recorded deviations.

According to another preferred embodiment, a surface-wide interferometric measurement of the workpiece surface or of the donor substrate surface, in particular of the main surface 30, is carried out, or the surface-wide interferometric measurement is carried out outside of the production unit 41-44, and data which represent the measurement results are provided for the specific donor substrate 4, in particular for the specific main surface of the donor substrate 4, in particular for modification of the donor substrate process data and/or documentation. This is advantageous since measurement time is preferably reduced by the surface-wide interferometric measurement in relation to the process time.

Because of the tolerance chains inside the production facility 40, particularly inside the laser device 12, the processing plane is preferably selected directly inside the guide plane, or parallel thereto.

FIGS. 5a-5d show an inverted laser device concept. This arrangement has the properties of overcoming the aforementioned disadvantages and is substantially characterized by the features that no z feed is necessary and/or the AF concept may be used as required and/or there is an optimal stiffness without a portal.

FIG. 5a shows a situation during the introduction of the donor substrate 4 into the working table 63, the air gap generatable by an air bearing system is preferably reduced or fully deactivated in this situation. The main surface 30, i.e. the surface of the donor substrate 4 through which the laser beams enter the donor substrate 4 and which is a constituent of the wafer 2 after the separation of the wafer 2, in this situation preferably lies flat on the bearing device surface 83. The donor substrate 4 is in this case preferably arranged or coupled on a donor substrate carrier 64.

FIG. 5b shows a situation in which fixing of the donor substrate carrier 64 and/or of the donor substrate 4 is initially carried out by means of a fixing device, in particular a clamping device 62, on the working table. After the fixing, the air gap is generated.

FIG. 5c shows a situation in which calibration of the focus is carried out, or the focus is set up. In this case, radiation collected by means of a measuring objective 52, in particular laser radiation of a laser radiation source 121, is preferably delivered to a measuring camera 51. Depending on the beam properties recorded, the alignment of the working table 63 or of the donor substrate 4 relative to the object 53 or the focus adjuster 54 is then carried out by means of one or more adjustment means, in particular adjustment pins 55.

The reference 56 preferably denotes a deviating mirror for deviating laser radiation. As an alternative, however, the laser radiation may also be delivered directly, i.e. without deviation, to the focus adjuster 54 or the objective 53.

FIG. 5d preferably shows a state during the modification generation inside the donor substrate 4. The laser radiation 58 is in this case focused in such a way that the modifications are generated at predetermined positions of the donor substrate 4.

The reference 57 in this case preferably denotes a distance sensor for monitoring the distance.

Preferably, an air bearing system is therefore used. An air bearing system is advantageous since it allows guiding accuracies with negligible deviations in the micrometer range, so that for example the aforementioned preferably external measurement may be carried out very precisely. Air bearing systems are furthermore advantageous since, in these, a very high cycle strength can be achieved. In the air bearing system, the air gap 61 is preferably adjusted for wear-free manipulation by means of pressure regulation and vacuum biasing.

In the loading state, the air bearing 59 is preferably turned off or throttled. The workpiece or donor substrate 4 is therefore pressed directly onto a preferably very planar bearing device surface 83, in particular a hard stone plate, and fixed in the workpiece holder 64. In this case, the position of a compensating plane of the very planar workpiece surface or donor substrate surface, in particular main surface 30, is adjusted automatically. Preferably, the donor substrate 4 is fixed in the mount in a further step. The air bearing 59 is then preferably set in operation, or the throttling is reduced. The air bearing 59 is in this case generated or set up on the bearing apparatus surface preferably precisely on the hard stone plane. The distance of the donor substrate surface (from the bearing) is preferably mapped by sensing, and particularly preferably tracked with the focus adjuster 54. This is advantageous since feeding for different workpiece thicknesses or donor substrate thicknesses is preferably avoided. If the planarity deviation of the donor substrate surface is within a predefined tolerance, if need be it is also possible to operate without a focus adjuster 54, in particular when the guiding error/path error (z tolerance during the manipulation) is negligible. Long-wave deviations may, for example, also be compensated for by means of the air gap regulation 61.

The laser modification 14 generated by means of the laser device 12 introduces suitable preliminary damage as an intended fracture position into the volume of the donor substrate 4. Depending on the desired surface quality as a compromise with process duration, this process (i.e. the process of the modification generation) preferably determines the rate of the overall cycle, i.e. the single or multiple separation of wafers 2 of the same donor substrate 4. The introduction of areal damage with pulsed laser radiation 58 (cf. FIGS. 6c and 6d) requires a narrow-mesh perforation with several thousand runs. The throughput of the laser modification is therefore preferably increased by parallel processing.

In another alternative embodiment, depending on the donor substrate 4, a continuous-wave laser (cw laser) may also be advantageous. This is advantageous since the wear on linear manipulators of the laser device 12 is reduced.

Preferably, there are diffractive beam splitters for multiple foci and/or a plurality of laser heads per laser device 12, in particular for treating the same donor substrate 4. This embodiment is advantageous since the number of runs is thereby greatly reduced.

By the parallelization a hyperlinear improvement is furthermore achieved while, in contrast, the increase of the processing speed acts hypolinearly. This is based on the acceleration and braking movements at the movement turnaround which are required particularly in the case of X-Y tables, and which cannot be used for the processing. While the accelerations are also increased when there is an increase of the speed, the ratio of processing time to turnaround time becomes worse. In the case of parallelization, however, the turnaround times are divided by parallelization factors (number of heads and number of foci). This is advantageous since, in the case of multiple foci, the destruction threshold and transmission and image field size determines the maximum possible number of foci. Preferably, the required laser power is divided between a plurality of processing heads in order to achieve an optimum. It is, however, likewise possible in the scope of the present invention for the donor substrate 4 to be moved, in particular rotated, during the modification generation by the laser device 12 with a rotation device, in particular a rotation table, relative to the laser device 12.

One advantageous development of this laser device 12 is when the multiple head arrangement reduces the outlay for preferably sensor-assisted distance monitoring.

If the workpiece or the donor substrate 4 contains inhomogeneous optical properties (for example doping inhomogeneities), recording thereof inside the production facility is advantageous. With the aid of suitable measurement technology, optical properties may also be included besides the surface topography for the autofocus.

The autofocus readjusts the surface topography during the runs, i.e. during the generation of the modifications 14 inside the donor substrate 4. Such axes usually do not have large movement paths. The z movement is therefore preferably distributed over different axes. Thus, the coarse feed of the workpiece thickness or donor substrate thicknesses is preferably carried out with a linear axis (for example servo drive). The focus adjustment is preferably carried out with a drive that preferably has a high stiffness and low mass compared with a servo drive (for example piezo adjuster/plunger coil drive with solid-state articulation).

According to one advantageous embodiment of the present invention, differently thick workpieces or donor substrates 4 may be processed simultaneously, or in one working step, with the same laser device 12.

For the exact position of the laser damage layer or the separating region 16 (cf. FIGS. 8-9b) inside the donor substrate volume, in addition or as an alternative to the surface topography (planarity deviations, tilts), the guide characteristic of individual or all manipulators is preferably recorded and evaluated, in particular converted into data form, and provided for modification of the donor substrate process data and/or for documentation.

Figure 6:
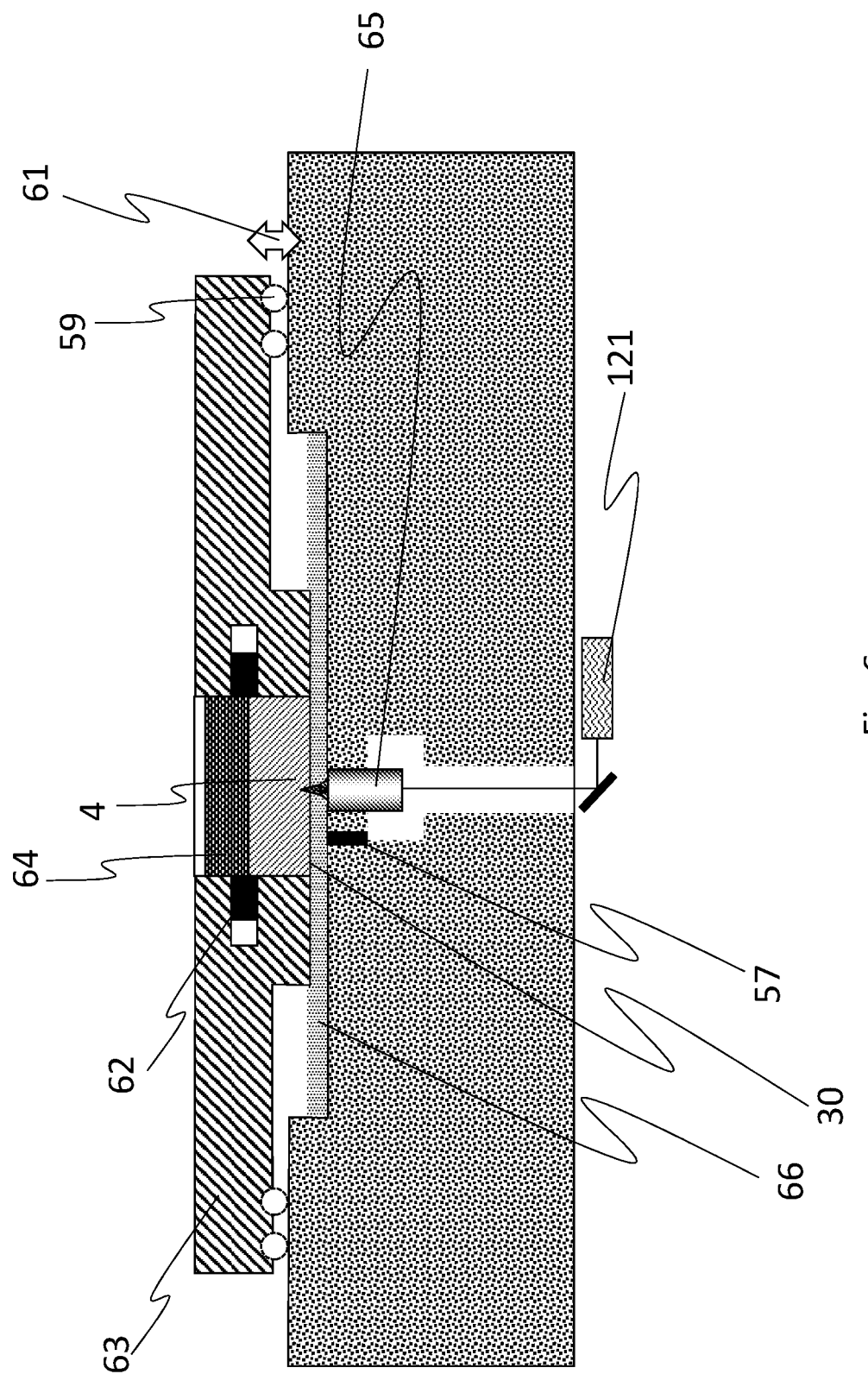
FIG. 6 shows schematic representations of an exemplary laser device with an air gap bearing and immersion fluid.

Another advantage of this arrangement is the very simple implementation of immersion laser processing (cf. FIG. 6). Immersion means that the air gap between the immersion objective 65 and the donor substrate 4 is filled with an immersion liquid 66, which allows significantly higher aperture angles of the laser radiation 58 and therefore even higher selectivity even in the case of very small layer thicknesses. Because of the arrangement, the gravity helps the immersion medium 66 to remain in the processing gap.

FIGS. 7a and 7b show two examples of application devices 181.

The application devices 181 shown are in this case preferably configured as laminating devices. The use of a laminating device, or a film laminator, is advantageous since a simplification of the process sequence is thereby achieved, because the number of individual steps and tools required is minimized, and the total process is configured more functionally reliably. It is furthermore advantageous that thermally based adhesive methods may thereby be replaced, since many individual process steps susceptible to error are required for these (cleaning, pretreatment, application, joining, curing, heat treatment, cleaning, finishing).

One particularly advantageous embodiment consists in the use of plasma-based cleaning and activation and subsequent connecting of the functional surfaces involved, i.e. the donor substrate surface 30 and the surface of the polymer film 3. The application device 181 therefore preferably comprises a cleaning and/or activation device. In this way, the number of process steps required is likewise reduced, in particular since, for example, no finishing of adhesive residues etc. is entailed. Furthermore, individual process steps, in particular cleaning and activation, may be carried out very efficiently with the same facility tool. The cleaning and/or activation device is preferably a constituent of the laminating device. As an alternative, the cleaning and/or activation device may be arranged before, or immediately before, the laminating device 181 in the transport path or treatment path of the donor substrate 4.

In addition or as an alternative to a plasma treatment, further treatment variants may be used for the surface treatment.

For example, a corona treatment is possible. The corona treatment implements an electrochemical method for surface modification of plastics. In this case, the surface is exposed to a high-voltage electrical discharge, for example in order to promote bonding in the case of plastics, films etc. (PE, PP).

In addition or as an alternative, a flame treatment is possible. In this case, above all near-surface oxidation of the respective compounds exerts an effect. Essentially, oxidation processes take place by which, depending on the material and experimental conditions, different polar functional groups are formed (for example oxides, alcohols, aldehydes, carboxylic acids, esters, ethers, peroxides).

In addition or as an alternative, there is treatment by dielectric barrier discharge (nonequilibrium cold plasma): the dielectric barrier discharge (DBD, AC voltage gas discharge, DBD treatment) is similar to a low-temperature plasma or a glow discharge (for example GDMS). In the DBD treatment, uni- or bipolar pulses with pulse durations of from a few microseconds down to a few tens of nanoseconds and amplitudes in the single-figure kilovolt range are applied to the surface. In this case, there are no metal electrodes in the discharge space and therefore no metallic impurities or electrode wear are to be expected. Advantages of DBD depending on the application, no metal electrodes in the discharge space, and therefore no metallic impurities or electrode wear; high efficiency, since no charge carriers need to leave or enter at the electrodes (omission of the cathode drop, no glow emission necessary); dielectric surfaces may be modified and chemically activated at low temperatures. The surface modification is in this case carried out by an interaction and reaction of the surface species by ion bombardment and the effect of ultraviolet radiation on the surface species (for example 80 nm-350 nm, incoherent light UV and VUV, by power radiofrequency generators).

In addition or as an alternative, fluoridation or ozonation is also possible.

In addition or as an alternative, UV treatment—excimer irradiation is also possible. In this case, UV radiation, in particular radiation with wavelengths of between 120 nm and 380 nm, is preferably used. The gas discharge is in this case caused by a radiofrequency electromagnetic field. This is advantageous since no electrodes are required for the gas discharge.

In addition or as an alternative, it is possible to use offset printing machines and plotter machines. Mechanical application of patterns of different compounds for iterative surface treatment is made possible in this way.

According to one particularly preferred embodiment of the present invention, instead of the application of a thermally curing liquid adhesive, plasma-based cleaning, activation and adhesive bonding is used. In this case, a polymer film 3 is optimized for a nonequilibrium cold plasma process. The (piezoelectric) cold plasma source preferably operates with a gas temperature in the plasma volume of 300+/−20 K and therefore damages the polymer surface only very little and only near the surface. One special arrangement of these plasma sources allows linear processing. Thus, the donor substrate surface and the foil surface may be cleaned and subsequently activated by single runs of the linear plasma source.

Likewise advantageous for increasing the throughput is the transition from scanning to continuous methods. One important prerequisite for this is preferably functioning in an atmosphere, i.e. without evacuation of any kind of chamber.

The activated surfaces may therefore be laminated directly in the lamination method free from gas inclusions without an additional adhesive. Suitable for the lamination are laminators, in particular hot-roll laminators, area vacuum laminators with a heating plate or membrane laminators in the atmosphere with subsequent treatment.

The lamination method without liquid adhesive furthermore works without exact trimming of the films.

For the separation as a result of temperature-induced crack propagation, following thermally caused generation of mechanical stresses in the donor substrate, it is essential that no adhesive meniscus prevents the crack occurrence on the donor substrate side. This is advantageous since adhesive menisci do not therefore need to be mechanically removed manually and a reduction in the risk of edge eruption is achieved. Such edge eruptions are extremely negative since they may easily lead to fracture of the thin slice or of the wafer 2 during the separating process.

FIG. 7a in this case shows an application device 181 in which a donor substrate 4 is arranged by means of a fixing device, in particular a clamping device 62, and a donor substrate holder 64 and a height adjuster 101 on a working table 63. The reference 104 denotes a preferred film base on which a polymer film with a carrier film 103 is preferably arranged in a frame.

By means of a plasma source, in particular a linear plasma source 106, the main surface 30 and/or that surface of the stress generation layer 3 which can be brought into contact with the main surface 30 is pretreated or conditioned. Furthermore, a heating device, in particular a heating radiator 100, is provided for heat-treating the main surface 30 and/or the stress generation layer 3. Furthermore, at least one laminator element is provided, in particular at least one roll laminator 105 for laminating the stress generation layer 3 onto the main surface of the donor substrate 4. The roll laminator 105 and/or the plasma source 106 are preferably movable over the main surface 30, or displaceable in one or more directions. The reference 102 furthermore also denotes a vacuum valve for generating a reduced pressure.

FIG. 7b shows an alternative configuration of the application device 181. According to this embodiment, the donor substrate 4 is arranged by means of a fixing device, in particular a clamping apparatus 62, a donor substrate holder 64 and a height adjuster 101 on a displaceable table 111. The displaceable table 111 is preferably displaceable in one direction, and particularly preferably in the xy direction, in particular along a guide. The reference 112 preferably denotes plasma sources, in particular linear plasma sources, arranged fixed in position. By means of the plasma sources, conditioning, in particular activation and/or cleaning, of the main surface 30 and/or of that surface of the stress generation layer 3 which is brought into contact with the main surface 30 of the donor substrate 4, is carried out. The stress generation layer 3 is in this case preferably provided as a polymer film arranged on a carrier film 108. The provision is in this case preferably carried out by means of a stock roll 107. The composite film arrangement consisting of the carrier film, or the carrier film 108 and the polymer layer 3, preferably passes over a (hot) lamination roll 110. By the (hot) lamination roll 110, the polymer layer 3 is applied onto the donor substrate 3 and therefore separated from the carrier film 108. The carrier film 108 then travels to a carrier film roll 109 and is taken up thereby. The reference 100 denotes a heating device, in particular at least one heating radiator, for heat-treating the polymer layer 3 and/or for heat-treating the donor substrate 4.

The reference 104 denotes a film base. The film base is in this case preferably arranged opposite the plasma source 112 as a support for the composite film.

Figure 8:
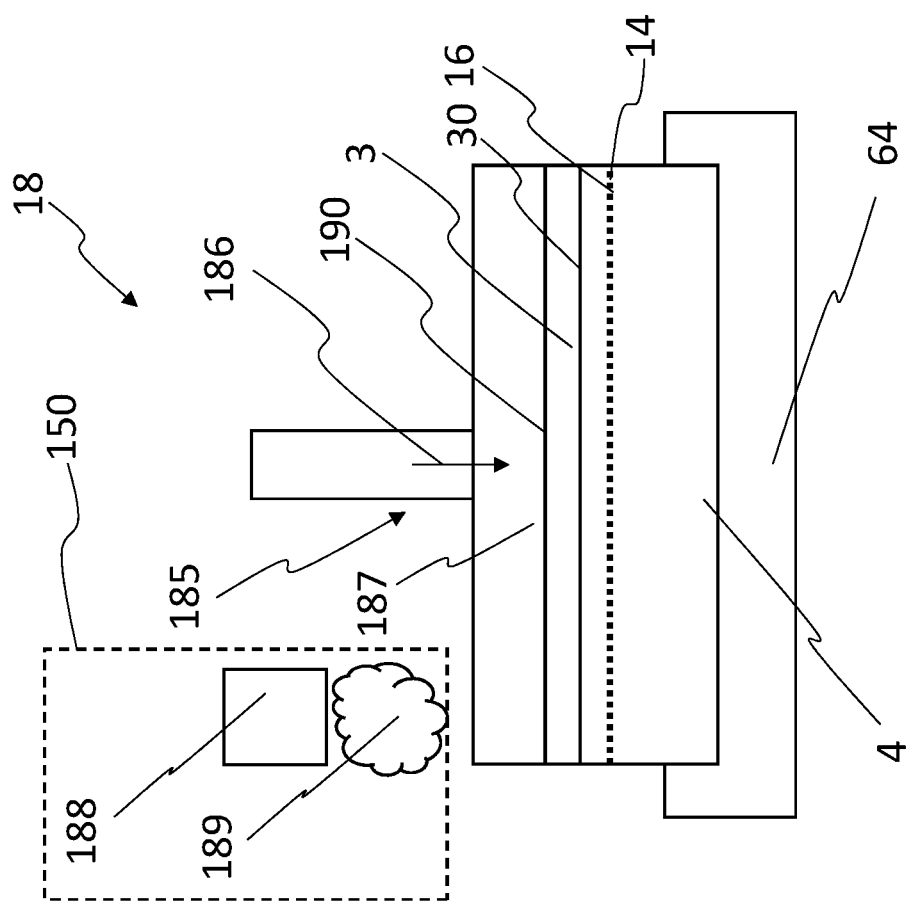
FIG. 8 schematically shows one example of a separating device with an integrated pressing device and heat treatment device.

FIGS. 8-9b show schematic examples of separating devices 18.

The separating device 18 is used for separating the wafer 2 from the donor substrate 4.

The separating device 18 may be configured in order to introduce an external force into the donor substrate 4.

Preferably, the external force is generated by the heat treatment of a polymer layer 3, in particular a film comprising a polymer, arranged on the donor substrate 4. Preferably, in this case "vitrification" of the polymer layer is carried out at temperatures which are preferably below 20° C. or below 10° C. or below 0° C. or below −50° C. or below −100° C., in particular below the glass transition temperature of the polymer material of the polymer layer. Below the glass transition temperature, the polymer film or elastomers film behaves as a supercooled liquid, for example like glass. In this case, the polymer chains are reversibly bonded to one another by weak van-der-Waals forces (solid-state with predominant short-range order). During the glass transition of a polymer, the modulus of elasticity increases very greatly and very strong, but nevertheless homogeneous, forces act on the predamaged zone, so that a critical crack in order to remove the wafer from the donor substrate is released and/or propagates.

In order to implement this process step, the force generation device 150 preferably comprises a heat treatment device 188 for cooling the polymer material of the polymer layer 3, or of the stress generation layer. The heat treatment device 188 is particularly preferably configured for delivering a functional fluid 189, in particular a liquid or a gas at a temperature of less than 20° C., in particular less than 0° or less than −30° C. or less than −50° C. or less than −100° C.

The throughput of this process step is crucially influenced by the thermodynamics. The process generally functions more rapidly when there are low heat capacities, high thermal conductivities and large temperature gradients. The essential manipulated variables, or parameters, for adjustment of the separating step are therefore:

Polymer: modify, in particular increase, glass transition temperature and/or modify, in particular reduce, film thickness and/or improve thermal conductivity by fillers (without impairing the homogeneity and intensity of the force action, activatability for the adhesive bonding process).

According to another preferred embodiment of the present invention, the stress generation layer comprises or consists of a polymer material, the polymer material having a glass transition temperature of below 20° C., in particular below 10° C. or below 0° C., and the polymer material being cooled to a temperature below the glass transition temperature, the mechanical stresses in the donor substrate being generated by the glass transition taking place.

According to another preferred embodiment of the present invention, the stress generation layer comprises in terms of mass at least mostly and preferably entirely a polymer material, or consists thereof, the glass transition of the polymer material being between −100° C. and 0° C., in particular between −85° C. and −10° C. or between −80° C. and −20° C. or between −65° C. and −40° C. or between −60° C. and −50° C.

The stress generation layer or the polymer layer or the polymer film preferably consists of or comprises a polymer hybrid material, which particularly preferably forms a polymer matrix, the polymer matrix containing a filler, the polymer matrix preferably being a polydimethylsiloxane matrix and the mass fraction of the polymer matrix in the polymer hybrid material preferably being from 80% to 99%, and particularly preferably from 90% to 99%.

The stress generation layer is preferably provided as a prefabricated film and coupled, in particular adhesively bonded, or bonded, onto the solid.

According to the invention, a polymer hybrid material for use in a splitting method is therefore provided, in which at least two solid portions are generated from a solid starting material. The polymer hybrid material according to the invention comprises a polymer matrix and at least a first filler embedded therein. When a or the filler is referred to below, the possibility of a plurality of fillers is likewise intended to be included. For example, the filler may comprise a mixture of different materials, for example metal particles and inorganic fibers.

As a polymer matrix, it is possible to use any polymer or a mixture of different polymers, with the aid of which stresses required for splitting the solid starting material may be generated. For example, the polymer matrix may be configured as an elastomer matrix, preferably as a polydiorganosiloxane matrix, particularly preferably as a polydimethylsiloxane matrix. Such polymer materials may be used particularly simply as a matrix material in combination with fillers, since the properties can be flexibly adjusted because of the variable degree of crosslinking and can be adapted to the respective filler and the solid starting material to be split. According to one alternative embodiment, the mass fraction of the polymer matrix in the polymer hybrid material is from 80% to 99%, preferably from 90% to 99%.

Donor substrate/workpiece: laser damage may be adapted dependently with the parameters of the parameter film.

Substrate carrier/workpiece carrier: low specific heat capacity with low thickness, thermal expansion coefficient adapted to the workpiece. The substrate carrier in a cooling device must always be jointly cooled as a thermal mass, and thus entails energy (cooling) costs and delayed process times. Correspondingly, in this case a thickness that is as small as possible is desirable, with a heat capacity that is as low as possible. Ceramic materials are particularly suitable in this case. Furthermore, the thermal expansion coefficient of the substrate carrier should be close to that of the substrate in order to avoid stresses between the carrier and the substrate. Ideally, for example, a silicon carbide ceramic is employed in this case as a substrate carrier for silicon carbide substrates.

Convection cooling based on the gas phase (for example on a nitrogen mist or on a liquid nitrogen bath) has the advantage that a homogeneous temperature distribution is obtained in the case of nonturbulent cooling gas delivery. For a time-optimized embodiment, a thermal conduction-based embodiment is possible, since in this case rapid cooling rates may be achieved.

The heat transport is preferably made possible by means of thermal conduction, in particular by contact. If heat transport is carried out more rapidly than thermal conduction can internally compensate for, the homogeneity of the temperature and therefore the force distribution are more relevant.

Cooling by a cooling plate through which a coolant flows is advantageous when there is good contact with a good conductor of heat. Advantages of the cooling plate pressed on are the better regulatability in the closed coolant circuit and the avoidance of excessively large warping of the polymer film, which could cause the thin slice (wafer) to break.

The cooling plate is, however, pressed onto the polymer layer and therefore the worst conductor of heat in the assembly. Thus, if the intention is to induce vitrification of the film rapidly, thermal conduction cooling may be carried out through the workpiece, which to this end may for example be immersed in sections in a coolant. Cold mixtures have the advantage that the process temperature is complied with very accurately.

A combination of a cooling plate (in order to avoid warping) and a coolant for thermal conduction in the film and the workpiece may therefore also be advantageous.

Once the separating step is completed, it is important to make the workpiece available again as rapidly as possible for the remaining processes of the method, while the assembly consisting of the cold-split film and the thin slice must be brought to room temperature as far as possible without stresses/gently. The aim is in this case to minimize as far as possible the time between two process steps on the same workpiece (successive wafers from the same substrate).

FIG. 8 furthermore shows an example of a pressing device 185. The pressing device 185 in this case preferably comprises a displacement or feed part 186 for bringing at least one pressure application element 187 into contact with the stress generation layer or polymer layer 3. The reference 190 in this case denotes a contact position between the pressure application element 187 and the polymer layer 3. The pressure application element 187 is preferably introduced by means of a predefined force or a predefined force profile (as a function of area and/or as a function of time). The predefined force, or the predefined force profile, may in this case be determined as a function of the donor substrate process data.

Preferably, in addition or as an alternative, the external force may be generated in the donor substrate 4 by introducing tensile forces (cf. FIGS. 9a and 9b).

In this case, before the introduction of the external force, a separating region 16 inside the donor substrate 4 is preferably likewise defined by introducing or generating modifications 14. The introduction or generation of modifications is in this case preferably carried out by means of a laser device, the laser beams preferably being introduced into the donor substrate 4 through the main surface 30 of the donor substrate 4. Preferably, by means of the modifications 14 predetermined weakening of the internal structure of the donor substrate is provided or caused. Particularly preferably, cracks are initiated by the modifications 14 in a predetermined region inside the donor substrate, which cracks cause continuous separation (gap 37) of the wafer 2 from the donor substrate 4. The continuous cracks 15 (separating position) in this case extend over a fraction of the surface to be exposed from 1% to 90%, in particular from 2% to 80% or 5% to 75% or 10% to 60% or 15% to 50% or 15% to 35%, in particular exclusively inside the donor substrate 4. Preferably, on the main surface 30 of the donor substrate 4, and preferably at least in sections or partially or fully superimposed with the continuous cracks, a force introduction device 39 for introducing tensile forces into the donor substrate 4 is coupled on by means of a coupling device 38, in particular a vacuum device or a bonding layer.

FIG. 9b shows the introduction of tensile forces by means of the tensile element 39.

In a region of the material weakening, particularly in the region of the continuous cracks or full separation, the wafer 2 is pulled apart so that a crack propagates outward to the edge of the donor substrate 4 along the separating region 16. The separating region 16 preferably extends only inside the donor substrate 4, and the separating region 16 is preferably at a distance from the circumferential surface of the donor substrate 4, in particular at a distance of more than 0.001 mm or more than 0.01 mm or more than 0.1 mm or more than 1 mm.

As an alternative, a separating device 18 may be provided, by which it is possible to apply waves, in particular sound waves, for example ultrasound waves, to the donor substrate 4.

The reference 26 in this case denotes a surface propagation device, in particular a grinding or polishing wheel.

Figure 10:
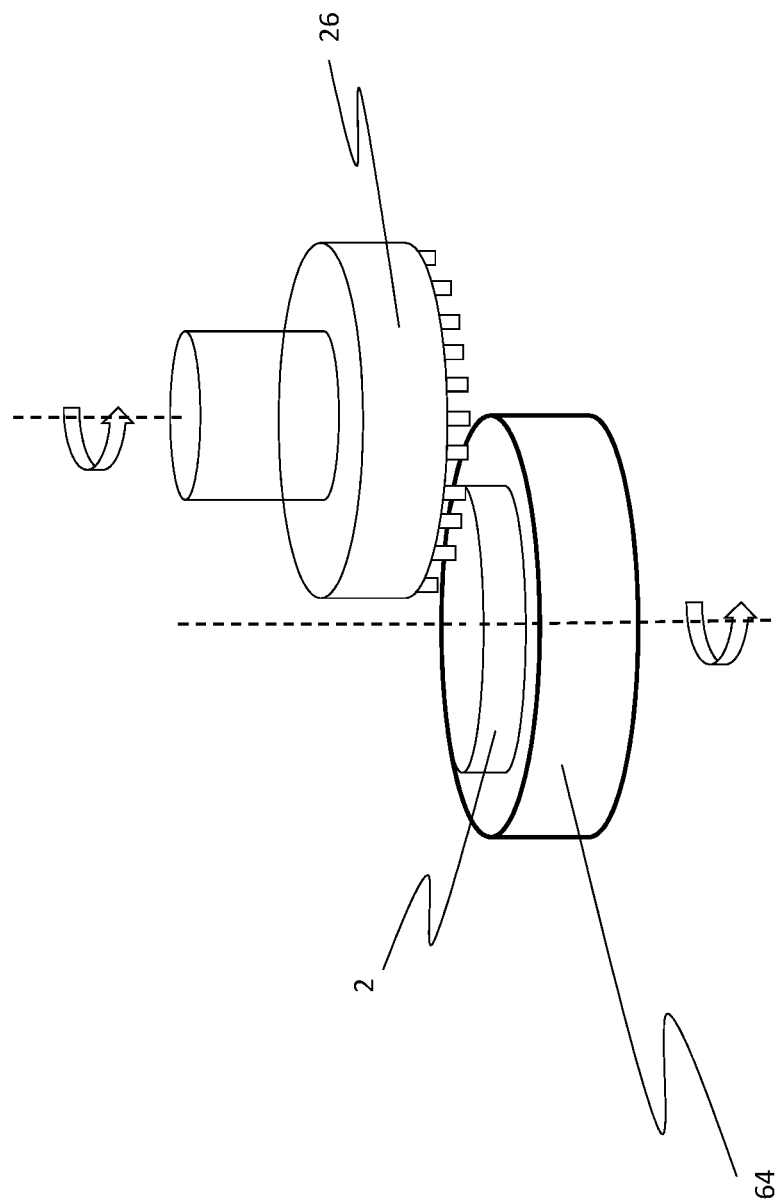
FIG. 10 schematically shows an example of a surface treatment device.

FIG. 10 schematically shows an example of a surface treatment device. For the surface preparation of the workpiece or of the donor substrate or of the wafer 2, single-sided processing is mandatory. The workpiece or donor substrate and workpiece carrier have a sufficient stiffness and are preferably arranged on a workpiece holder/donor substrate holder/wafer holder 64, in which case the workpiece holder/donor substrate holder/wafer holder 64 may be a constituent of a rotation table or formed thereby or represent such. For rapid removal, a cup wheel grinding method is therefore preferably used. This is advantageous since in this case only a small grinding body is respectively in contact with the workpiece and it is possible to operate with very high pressures and therefore high removal rates in comparison with surface-wide lapping. In this case, other than in the case of wafer grinding, the facility needs to learn to deal only with the workpiece carrier and the decreasing workpiece thickness. Multistage grinding processes with a different grain size are advantageous. The required planarization removal is preferably carried out in a coarse grinding process, while in a preferably subsequent fine grinding process the surface roughnesses are optimized and microcracks are gently removed.

The two processes are preferably adjusted in such a way that approximately equal process times are obtained. More important, however, is the total cost optimization, since fine-grained abrasives entail significantly higher costs per removal.

For the maximum yield in the case of thin slices or wafers, machine handling is preferred. Handling steps are particularly preferably minimized in order to introduce as little stress as possible when handling the surface provided with the microcracks.

For two-sided processing, the film would thus need to be removed from the damaged thin slice. Separation of the polymer is, however, preferably not carried out until after a stress release, i.e. the removal (grinding/polishing) of the modification fractions. This means that an assembly consisting of the polymer layer, in particular the resilient film, and a thin slice (wafer) which is hard and brittle depending on the material, needs to be treated, in particular ground or polished. Preferably, this material removal is carried out by means of a flatly acting machining method, in particular a flat fine grinding method, preferably similar or identical to lapping.

The grinding costs represent a very substantial fraction of the total process costs, and it is therefore a further object of the present invention to reduce the need for material removal outlay, in particular grinding outlay. According to the invention, this is done by reducing planarization margin/s and/or by reducing or limiting the propagation of microcracks in the longitudinal direction of the solid.

Besides abrasive methods for removing the damaged surface or the modification fractions, in addition or as an alternative an etching step may be carried out according to the present invention. The etching step in this case preferably comprises wet-chemical or chemical-physical etching.

According to another preferred embodiment of the present invention, before the material-removing treatment or abrasive treatment of the donor substrate preferably consisting of SiC or comprising SiC, for example carbonation of the wafer surface exposed by the separation of the wafer and/or of the exposed donor substrate surface may.

Figure 11:
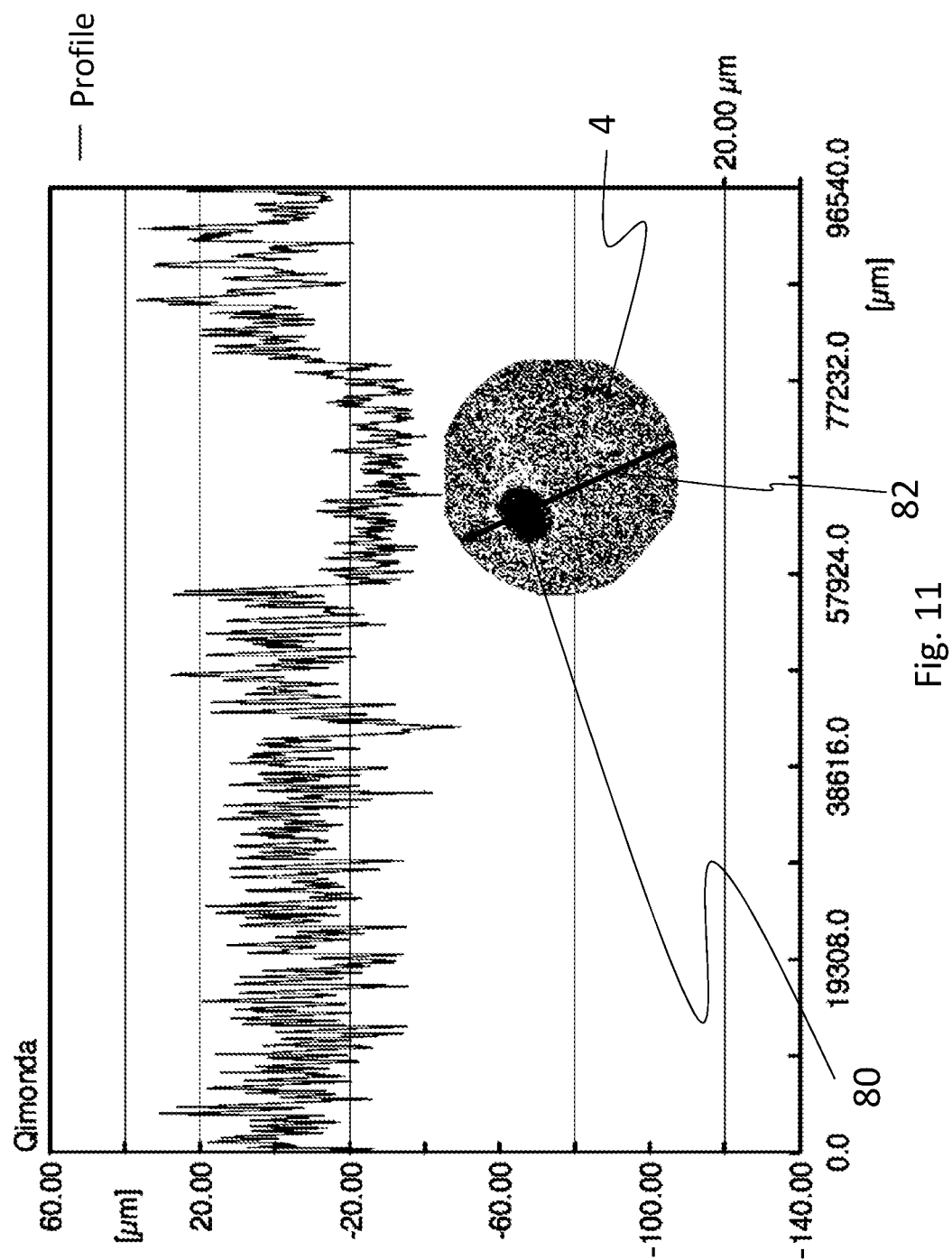
FIG. 11 schematically shows a height deviation of the generated modifications as a function of a doping spot.

FIG. 11 shows dopings of a donor substrate 4 and deviations of the modification positions as a function of the doping. The reference 82 in this case denotes an analysis direction, along which the position variations or introduction height variations are recorded. The variation of the curve shown in this case represents the position of the doping spot 80. In order to provide splitting, or crack formation, which allows reduced or no finishing requirement, the greatest or maximum laser energy is preferably applied at the most heavily doped position in the donor substrate. The height deviation in the doping spot results from the higher optical density (refractive index increases). If, however, the entire separating region 16 is processed with a maximum laser energy, this represents overexposure, and therefore increased roughness in the regions not affected by doping spots. According to the invention, therefore, a position-resolved laser energy map or laser energy data are determined for optimum "exposure" (in particular laser energy application) in order to reduce the roughness. In addition or as an alternative, according to the invention a position-resolved refractive index map or refractive index data are determined for corrections of the autofocus heights. The refractive index data and/or laser energy data are in this case preferably a constituent of the donor substrate process data, and preferably likewise the wafer data.

FIG. 12 represents the position variation of the modification position occurring as a result of a doping spot. This takes place because the doping spot 80 has a higher optical density and therefore causes different refraction of the laser radiation compared with an undoped or lightly doped region.

In the left-hand part of the figure there is no doping, so that the laser radiation 90 impinging on the donor substrate from the outside is guided according to the predetermined path 91 to the predetermined modification position 93.

In the right-hand part of the figure there is doping, so that the path of the radiation in the donor substrate 4 is varied. Because of the higher density, with a conventional autofocus, the modification 94 is generated at a further distance from the main surface 30. An uneven modification layer 95 is obtained in this case. If knowledge is then available about the doping distribution, the focusing may be adapted doping-dependently and/or position-dependently and/or accurately in terms of modification, so that a modification layer 96 with a refractive index-compensated autofocus is generated.

FIG. 13 represents the relationship between the reduction of a planarization margin and the productivity increase thereby possible.

Crack guidings, which are carried out with a constant and preferably with a decreasing planarization margin, are denoted by the reference 67. The donor substrate 4 in this case comprises a doping spot 80. From the donor substrate 4, according to this variant a first wafer 71 is initially separated with a predetermined planarization margin 70. It can be seen that the doping spots 80, 81 may vary over the donor substrate height. Doping homogeneities as well as the basic doping may vary in position, size, intensity, number and distribution over the donor substrate height or the boule/ingot (during the growth). The donor substrate process data are preferably adapted thereto, so that a significant output increase may be achieved. As a result of the analysis of the properties of the separated wafer 2 and/or as a result of the analysis of the properties of the exposed surface of the donor substrate 4 and/or as a result of including data of further measuring devices 24, 25, 27, 270, a reduction of the planarization margin may be carried out for one or more further wafer separations from the same donor substrate 4. On the basis of the generated measurement and/or analysis data 600, 601, 602, 603 and/or 604, the donor substrate process data for driving the laser device 12 and/or for driving an optionally provided application device 181 and/or for driving the separating device 18 and/or for driving an optionally provided surface preparation device 26 may be modified.

Particularly preferably, a successive approximation of the average substrate refractive index (corresponding to the scribing depth) is carried out with an accuracy better than 0.1% or better than 1% or better than 2%. The determination of the substrate refractive index is in this case preferably carried out by means of grinding feedback and/or by means of chromatic thickness measurements, in particular with two points.

In the splitting formula, the parameter set to be used in the cooling step is compiled. This includes the splitting application pressure, the temperature profile until reaching the target temperature, the target temperature and/or the temperature profile in the subsequent reheating step.

In the laser formula, the parameters used in the laser step and the processing strategy are compiled. This involves inter alia laser pulse spacings, line spacings, pulse energies as a function of the doping level, line orientations, the scribing sequence of introducing lines (for example multistage process), the laser polarization, the laser repetition rate, laser pulse duration and also workpiece thickness dependency of the laser pulse energies.

Preferably, the donor substrate process data are continuously modified iteratively.

In other words, learning splitting, or adapted crack generation, is provided, so that a planarization margin 70 can be successively reduced, with the result that additional wafers may be obtained from the same donor substrate 4 with this material saving.

It can be seen from the representation that the planarization margin 70 is preferably reduced continuously. As an alternative, however, it is likewise possible to reduce the planarization margin 70 in steps, i.e. a reduction of the planarization margin 70 is respectively not carried out until after the separation of the respectively predefined number of wafers 2. In addition or as an alternative, it is furthermore possible not to reduce the planarization margin until a predetermined minimum reduction of the planarization margin 70 is exceeded.

Particularly preferably, the donor substrate process data comprise output data relating to donor substrates of the same origin and/or same production type and/or same size and/or same materials and/or same mass and/or the same producer. Preferably, the donor substrate process data are provided or stored for each wafer 2 of the same donor substrate 4, and particularly preferably the variations of the donor substrate process data from one wafer to the next and/or over a plurality of wafers, in particular over all the wafers, are recorded, documented and/or stored, in particular transmitted to a data medium. For example, a doping tomogram of the entire donor substrate 4 may therefore be derived from the donor substrate process data. Such a doping tomogram may, for example, be used for controlling growth processes of donor substrates.

The reference 68 denotes wafers of a donor substrate 4 which have all been separated substantially or precisely without a planarization margin 70, so that a further productivity increase 69 can be achieved.

Figures 14A, 14B:
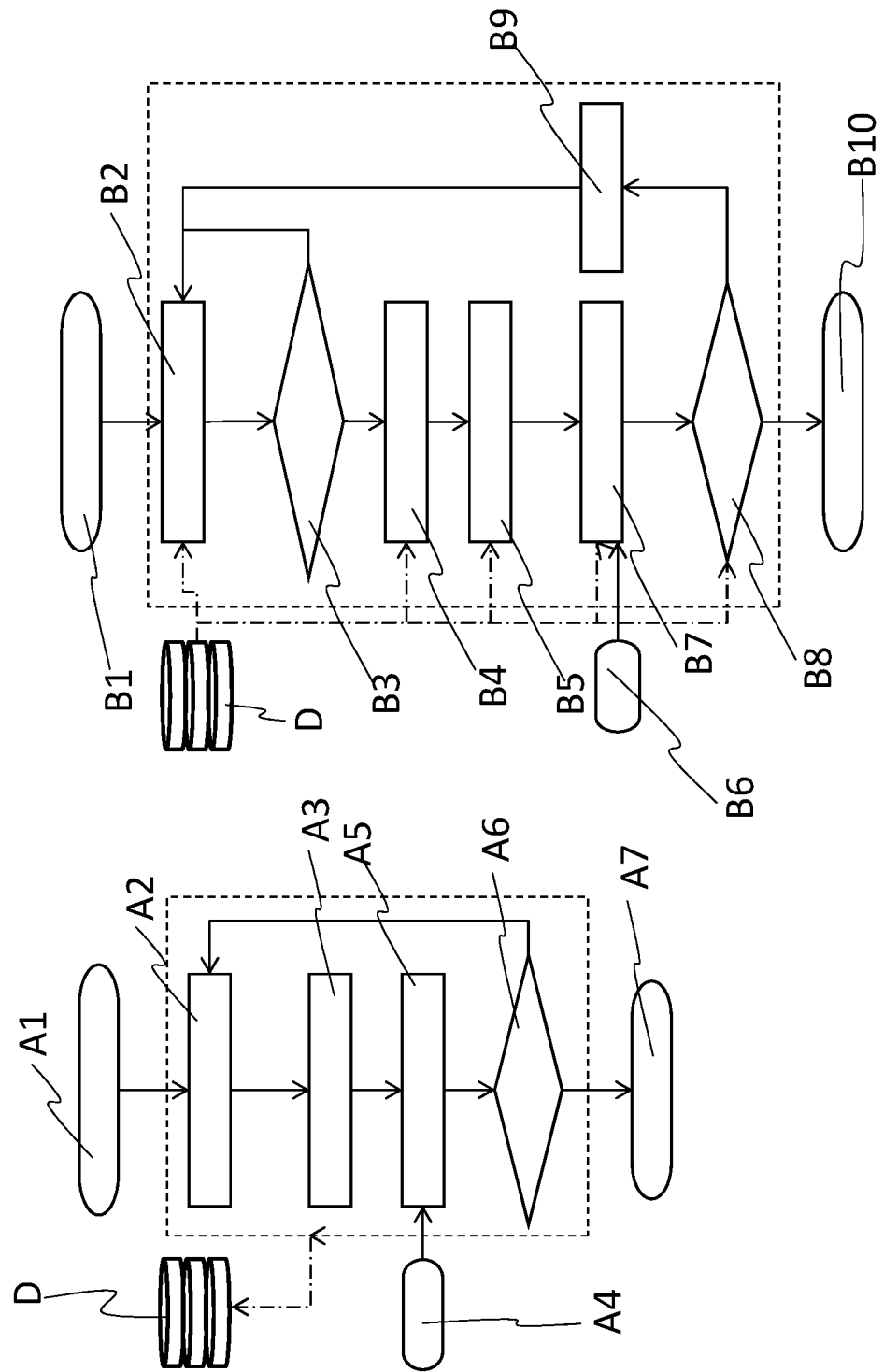
FIG. 14a schematically shows a first exemplary flowchart of the method according to the invention.
FIG. 14b schematically shows a second (alternative) flowchart of the method according to the invention.

FIG. 14a schematically shows the steps in a preferred method according to the present invention. In this case, in step A1 a donor substrate 4 is delivered to the production facility. In step A2, this donor substrate 4 receives a surface treatment before a laser treatment, in particular the generation of modifications 14 inside the donor substrate 4, is carried out in step A3. In step A5, a polymer layer, in particular comprising PDMS, is arranged or generated on an exposed surface of the donor substrate 4. Preferably, the reference A4 denotes provision of a polymer film, the polymer film then being applied, in particular adhesively bonded, or bonded, as a polymer layer onto the donor substrate 4. According to the reference A6, a separating step is carried out in order to separate a wafer 2 from the donor substrate 4. The separating step in this case particularly preferably comprises thermal action on the polymer layer, in particular cooling of the polymer layer to a temperature below the glass transition temperature of the polymer layer. By the thermal action, mechanical stresses are generated in the donor substrate 4 by the polymer layer or receiving layer, so that crack propagation is carried out along the previously generated modifications 14. The remaining residual substrate is delivered according to a surface treatment again according to A2. The treatment station may in this case be the same or different. The cycle of A2-A6 is in this case preferably continued until the donor substrate 4 falls below a predetermined residual thickness. According to A7, the separated wafers 2 with polymer film arranged thereon are processed further.

Preferably, some or all the process data or operating parameters of some or all treatment device/s used when carrying out the cycle (A2-A6) are recorded by the database D or the processor device 32 and stored in relation to the donor substrate 4 and/or stored for the respective specific wafer 2.

FIG. 14*b* schematically shows the steps in an alternative preferred method according to the present invention. According to step B1, in a similar way to step A1, the donor substrate 4 is provided. In a similar way to step A2, step B2 likewise represents a surface treatment, in particular a surface optimization. As step B3, an analysis of the donor substrate 4 is preferably carried out, particularly in order to determine the local surface quality and/or the local doping and/or the local refractive index and/or crystal lattice dislocations. Depending on the analysis result, the donor substrate 4 may be delivered for renewed surface preparation (B2), or forwarded or conveyed to the laser treatment (B4). The laser treatment in this case preferably corresponds to the laser treatment A3 i.e. modifications 14 inside the donor substrate 4 are preferably generated in order to guide a crack. After the laser treatment (B4), a surface treatment of the donor substrate 4 is preferably carried out in step B5, in particular cleaning and/or activation of the main surface. Steps B6 to B8 in this case correspond to steps A4 to A6. The remaining residual donor substrate is preferably delivered again to the surface treatment B2. Particularly preferably a heat treatment, in particular heating, of the donor substrate 4 is carried out (chronologically) before the surface treatment. The donor substrate 4 is in this case preferably heated by at least 10° or by at least 20° C. or by at least 30° C. or by at least 50° C., in particular to up to 20° C. or to up to 30° C. or to up to 50° C. (cf. reference B9). The reference B10 denotes a step which is preferably configured in a similar way to step A7. The reference D in this case likewise denotes a database or processor device 32. The database D or the processor device 32 particularly preferably carries out adaptation of one or more treatment parameters of one or more treatment devices, in particular the adaptation to a thickness reduced in each cycle and/or doping. Preferably, at least two steps B2, B3, B4, B5, B7 and/or B8 are driven and/or supplied with process data by the database D or processor device 32.

Preferably, some or all the process data or operating parameters of some or all treatment device/s used when carrying out the cycle (A2-A6) are recorded by the database D or the processor device 32 and stored in relation to the donor substrate 4 and/or stored for the respective specific wafer 2.

Figure 15:
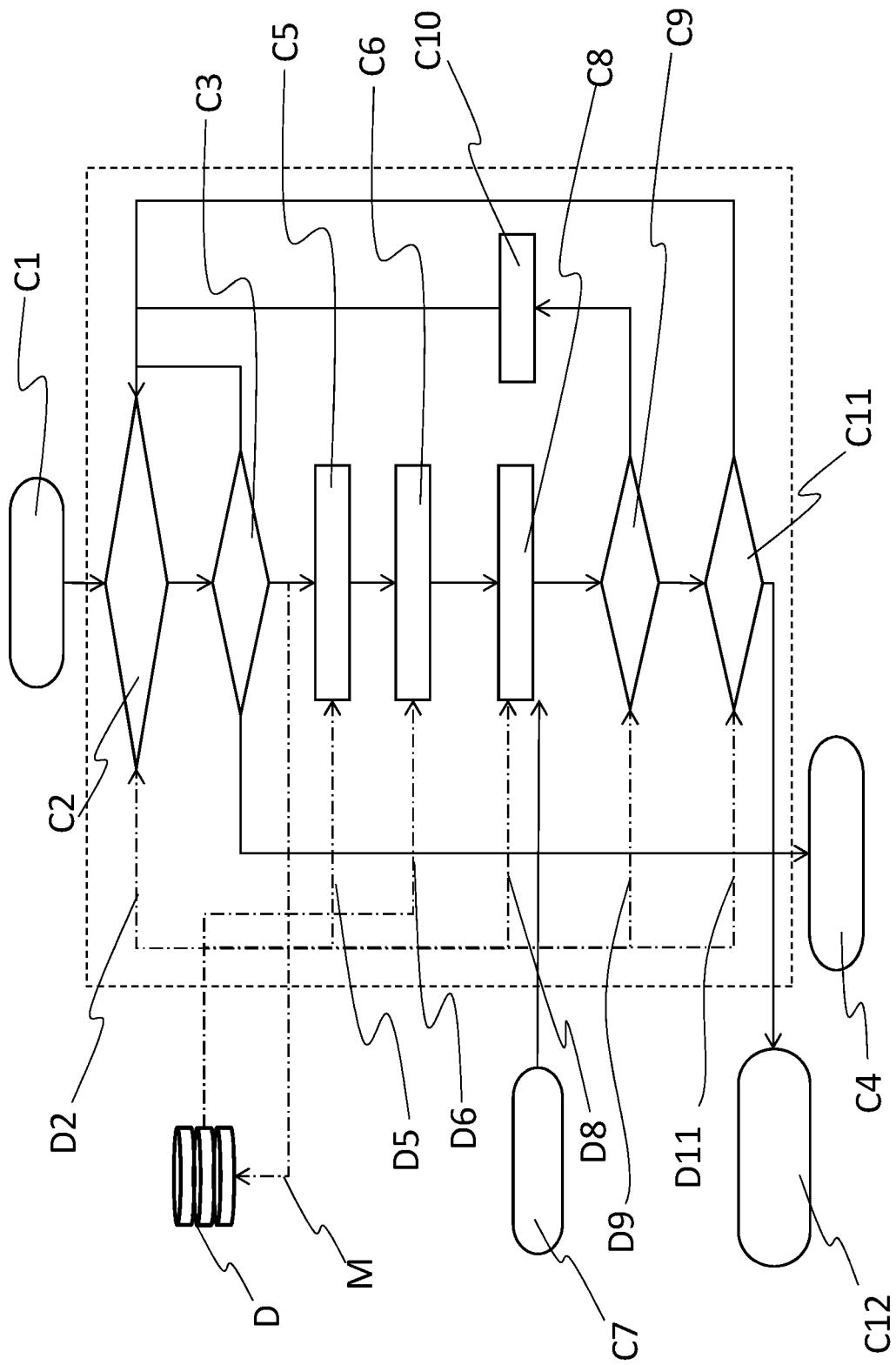
FIG. 15 schematically shows a third (alternative) flowchart of the method according to the invention.

FIG. 15 schematically shows the steps in an alternative preferred method according to the present invention. Steps C1 to C3 in this case preferably correspond to steps B1 to B3. The reference C4 denotes a step of measuring and/or analyzing the separated wafer 2. The measurement and/or analysis results obtained in this case may be stored in the database D or processor device 32 in relation to the specific donor substrate 4 and/or the specific wafer 2. Steps C5 to C10 in this case preferably correspond to steps B4 to B9 (cf. FIG. 14*b*). In step C11, the polymer layer is preferably removed from the wafer 2. The wafer 2 may then be sent back to the Station C2 for further preparation or conveyed to an alternative surface preparation station. Subsequently, an analysis of the wafer 2 is preferably carried out and the wafer is subsequently output according to step C4, or released for further treatment, particularly in a downstream facility.

The reference C12 denotes a further treatment, in particular preparation or disposal, of the separated polymer layer.

In individual or several or all of the steps mentioned above, operating parameters and/or donor substrate parameters and/or wafer parameters and/or polymer layer parameters are preferably recorded at least during the treatment or processing of the donor substrate and/or of the separated wafer, and transmitted to the database D or the processor device 32. This is illustrated by the reference M.

The references D2 to D11 in this case preferably represent data for driving the individual devices. The reference D2 preferably denotes the provision of process parameters, these process parameters preferably being specific to the donor substrate and the wafer respectively to be separated. The reference D5 preferably denotes donor substrate process data for driving the laser device. The reference D6 preferably denotes donor substrate process data for driving the cleaning and/or activation device. The reference D8 preferably denotes donor substrate process data for driving the application device, in particular the laminating device. The reference D9 preferably denotes donor substrate process data for driving the separating device, and the reference D11 preferably denotes donor substrate process data for driving a device for removing the film.

Figure 16:
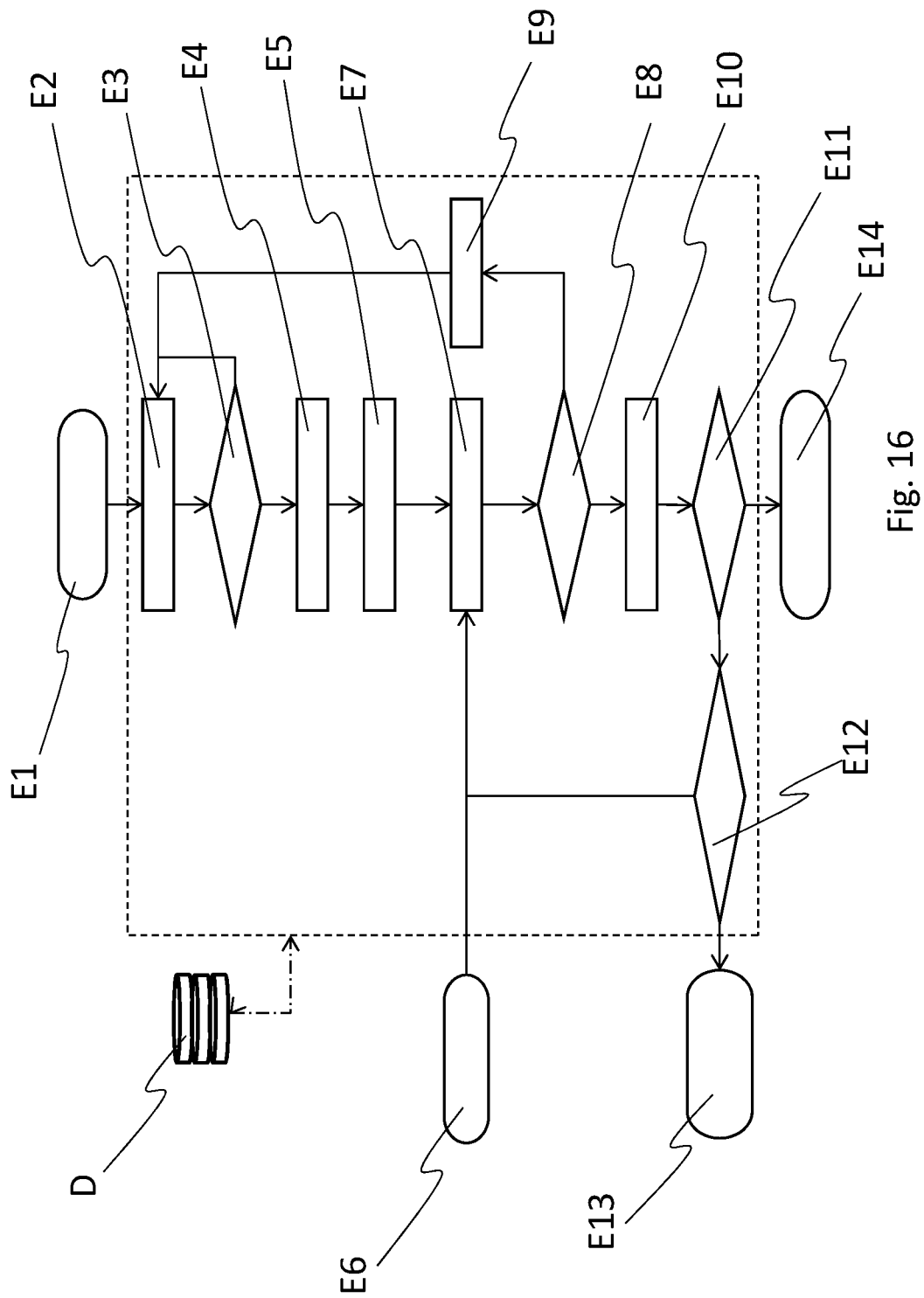
FIG. 16 schematically shows a fourth (alternative) flowchart of the method according to the invention.

FIG. 16 schematically shows the steps in an alternative preferred method of the present invention. Steps E1 to E9 preferably correspond to steps B1 to B9. Step E10 is preferably carried out by a device for material removal. A surface treatment is therefore preferably carried out, the surface treatment particularly preferably comprising removal, in particular machining removal, of material of the wafer. Preferably, in this case only or at least the material fraction modified by means of the laser beam is in this case removed. This is advantageous since this material fraction is under stresses, in particular compressive stresses, because of the modifications. The stresses in the wafer are therefore reduced by the material removal, so that it is protected better against damage. Preferably, according to step E11 separation of the polymer layer from the wafer 2 is carried out subsequently to step E10 or before step E10. The polymer layer is then prepared according to step E12 or disposed of (cf. step E13). The prepared layer may then be used again by way of step E6 for application onto the donor substrate. The wafer 2 is preferably output according to E14.

Figure 17:
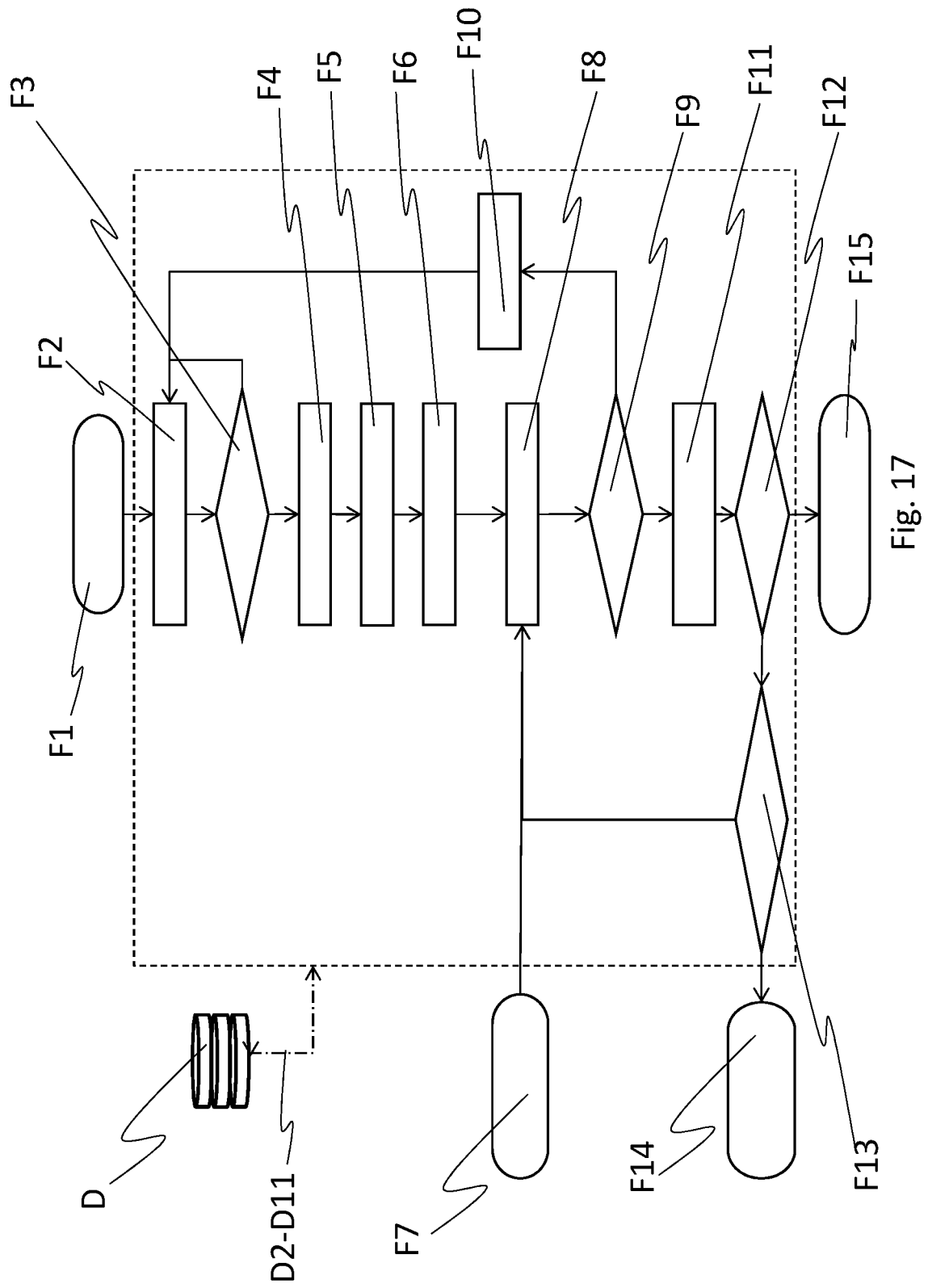
FIG. 17 schematically shows a fifth (alternative) flowchart of the method according to the invention.

FIG. 17 schematically shows the steps in an alternative preferred method of the present invention. Steps F1 to F4 in this case correspond to steps B1 to B4. Step F5 represents a treatment of the donor substrate 4 by means of a presplitting tool, in particular an ablation laser or a milling tool or a grinding tool. Steps F6 to F10 in this case preferably correspond to steps B5 to B9. According to step F11, a surface treatment is preferably carried out in a similar way to step E10. Steps F12 to F15 preferably correspond to steps E11 to E14. In addition or as an alternative, it is in this case conceivable for separating step F9 to comprise an application of sound, in particular an application of ultrasound to the donor substrate 4 in order to initiate the crack.

Figure 18:
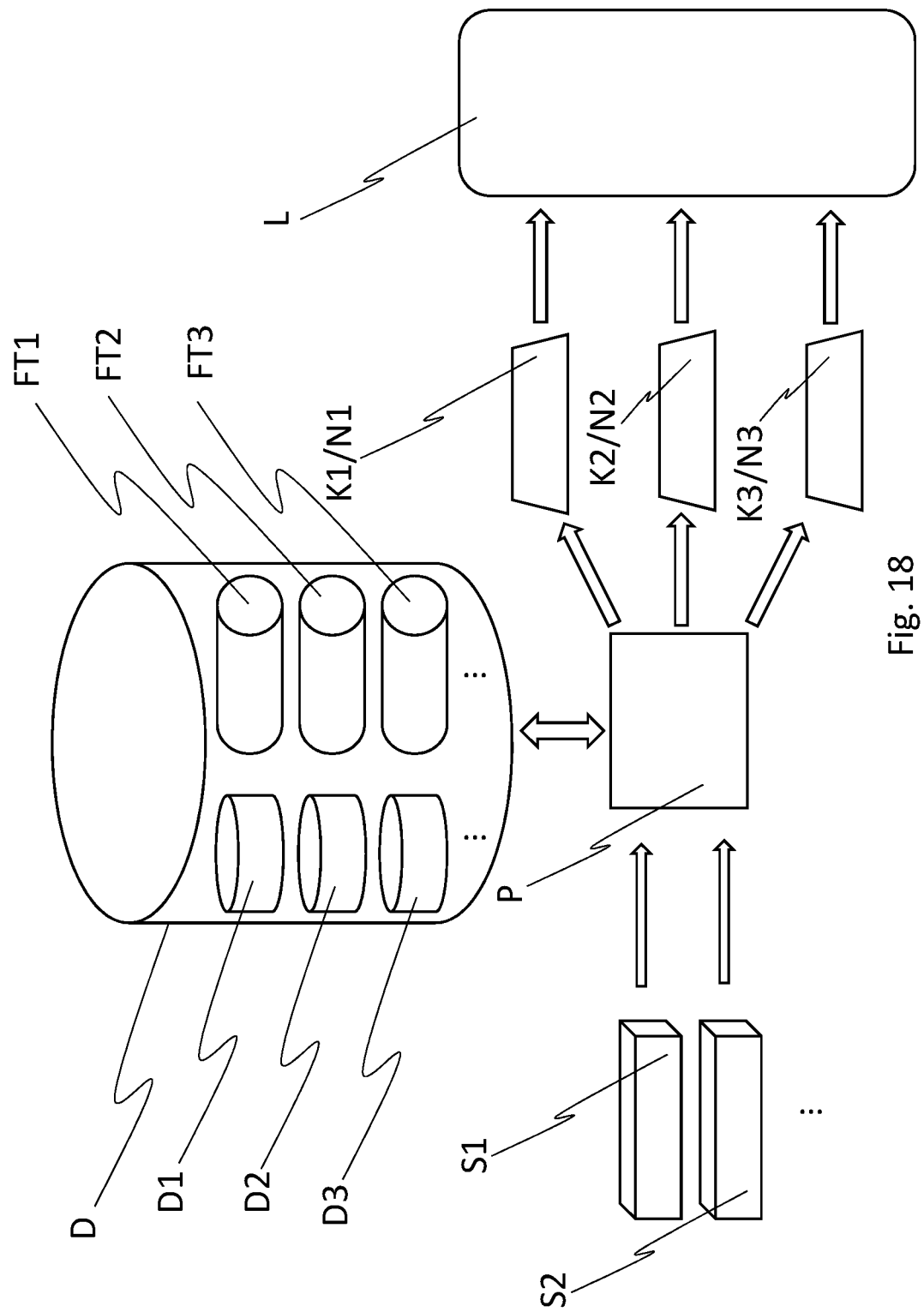
FIG. 18 schematically shows a production facility control concept based on donor substrate process data and/or wafer data, and FIG. 19 possibilities for the refractive index determination.

FIG. 18 schematically shows the adaptation of the laser parameters over all of the solid layers, or wafers, separated from a donor substrate.

To this end, a database D is provided. This database preferably holds standard data for doping, the laser depth, the laser energy distribution and/or the damage layer of at least one donor substrate.

In addition or as an alternative, the database may hold actual data relating to the doping, the laser depth, the laser energy distribution, the damage layer, the height of the donor substrate before the separation of a specific solid layer, the height of the donor substrate after the separation of the solid layer, the average thickness of the separated solid layer, the thickness distribution of the solid layer after the splitting and/or the thickness of the solid layer after a surface preparation, in particular a grinding step, of at least one wafer previously separated from the same donor substrate.

Preferably, the data, recorded in relation to the splitting of each wafer of a specific donor substrate, relating to the doping D1, the laser depth D2, the laser energy distribution D3, the damage layer, the height of the donor substrate before the separation of a specific solid layer, the height of the donor substrate after the separation of the solid layer, the average thickness of the separated solid layer, the thickness distribution of the solid layer after the splitting and/or the thickness of the solid layer after a surface preparation, in particular a grinding step, are held in the database D.

If n wafers or solid layers are split from a donor substrate m, adaptation of the laser parameters is preferably carried out n times or up to n times or up to n−x times (where x is preferably 1). The data described above in this case preferably comprise data for the separated wafer n and for the donor substrate m before the separation of the wafer n and for the donor substrate m after the separation of the wafer n.

The data for the separated wafer n and for the donor substrate after the separation of the wafer n are preferably recorded by the sensor devices or measuring devices S1-S3. Thus, the reference S1 denotes, for example, a height sensor by means of which a height measurement/height profile data is preferably carried out before the generation of the modifications in order to separate the solid layer n+1 from the donor substrate (in particular boule). The reference S2 denotes, for example, a doping sensor or a refractive index determination sensor. By means of the doping sensor S2, the doping of the donor substrate, particularly in a predetermined plane, is preferably determined with position resolution before the generation of the modifications in order to separate the solid layer n+1.

That is to say, before the generation of the modifications inside the residual donor substrate in order to separate the wafer n+1, the doping of the residual donor substrate, the height of the residual donor substrate after the separation of the solid layer n, the average thickness of the separated solid layer n, the thickness distribution of the solid layer n after the splitting and/or the thickness of the solid layer n after a surface preparation, in particular a grinding step, is recorded or determined. On the basis of these actual data for the residual donor substrate and/or for the wafer n and preferably with the data held in the database D for the specific donor substrate m before the separation of the wafer n and/or with the data held in the database D for the wafer n−1, determination of correction values for the laser parameters, in particular for the laser depth adjustment, laser energy distribution and/or for the absolute laser energy is preferably carried out by means of functions and/or conversion tables FT1-FT3 held in the database. As an alternative, instead of determining the correction values, redetermination of the laser parameters, in particular the laser depth adjustment, laser energy distribution and/or for the absolute laser energy may also be carried out. Particularly preferably, the newly determined laser parameters, or the correction values for the laser parameters, are likewise stored in the database D, in particular allocated to the respective specific donor substrate m and/or the wafer n. The determination of the correction values K1-K3 or the redetermination of the laser parameters N1-N3 is in this case preferably carried out by a processor device or data processing device P. K1 may therefore denote a correction of the laser depth settings for the wafer n+1 of the specific donor substrate m and K2 may therefore denote a correction of the laser energy distribution for the wafer n+1 of the specific donor substrate m and K3 may therefore denote a correction of the absolute laser energy for the wafer n+1 of the specific donor substrate m. The correction values K1-K3 or the alternatively newly determined laser parameters N1-N3 are then used as input control parameters for the operation of the laser device for generating modifications in order to separate the wafer n+1. The functions and/or conversion tables FT1-FT3 held in the database preferably define relationships between individual recorded and/or stored data. Thus, FT1 (laser depth), may for example comprise the determination of the laser depth the data donor substrate height before the splitting in order to separate the wafer n+1, the laser correction data relating to the laser depth adjustment from the wafer n−1 to the wafer n and the thickness (in particular average thickness) of the wafer n. FT2 (laser energy distribution) may, for example, comprise the doping data of the donor substrate before the separation of the wafer n+1, the laser energy map used when generating the modifications for the separation of the wafer n, the corrections of the laser energy distribution carried out from the separation of the wafer n−1 to n, and the thickness distribution of the wafer n after the splitting. FT3 (damage layer) may, for example, comprise the correction values of the absolute laser energy determined from the separation of n−1 to n, the differential thickness of the donor substrate after the separation of wafer n, and the thickness of the wafer n after a surface treatment, in particular grinding.

Figure 19:
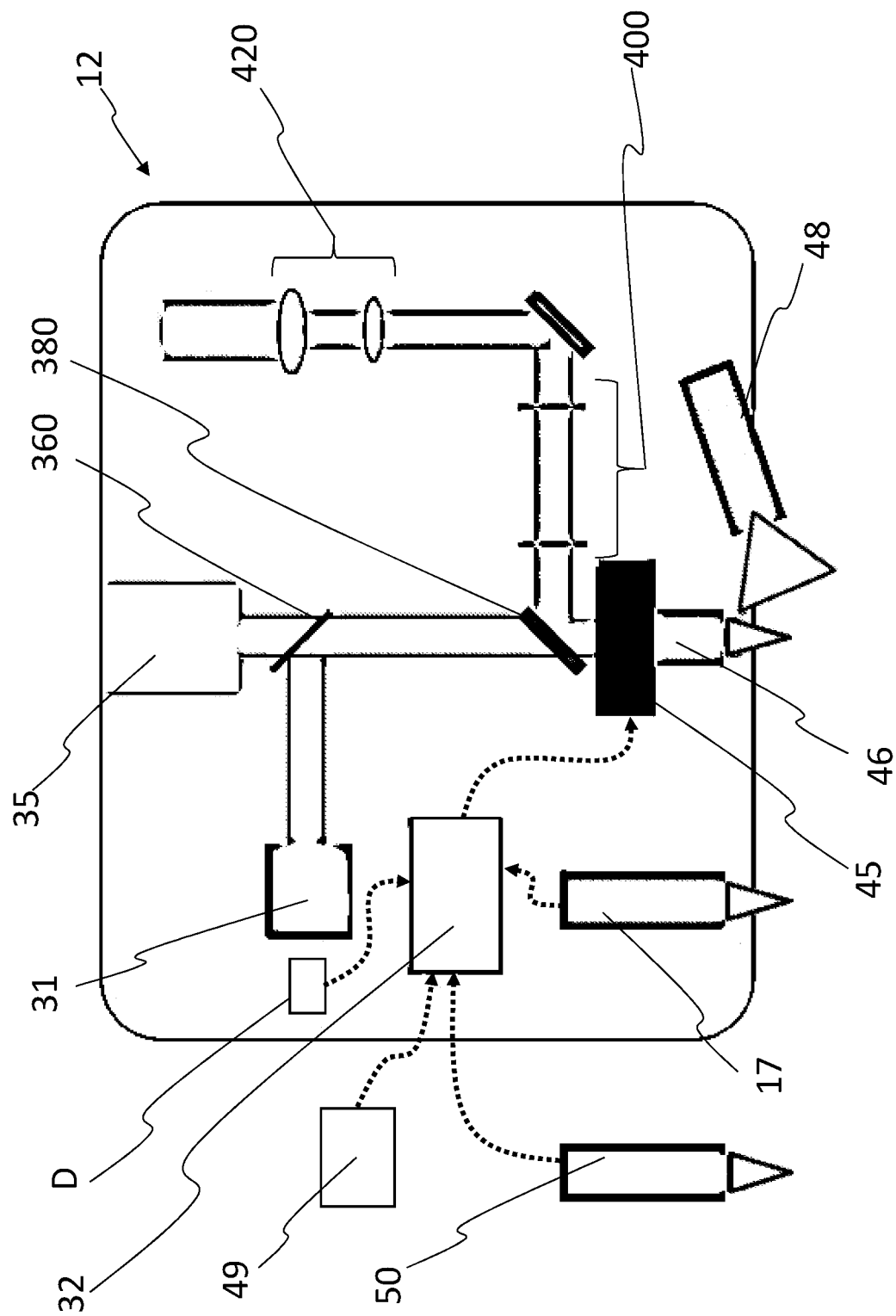

FIG. 19 shows a laser application device or a laser device 12 according to the invention, such as is preferably provided in the method according to the invention and the apparatus or production facility 40 according to the invention in order to generate modifications 14 in a solid 4.

The laser application device 12 in this case comprises at least one laser beam source 31, particularly with focus marking. The laser beam source 31 may therefore preferably specifically be a coaxial light source with focus marking. The light beams 58 generated by the laser beam source 31 are preferably guided on a predetermined path from the laser beam source 31 to a focus device 45 or an adjusting device 45 for adjusting a focal size and a focal position in the solid 4. The adjusting device 45 may in this case preferably be a fine focusing device, particularly in the Z direction or in the laser beam profile direction. The adjusting device may preferably be configured as a piezo fine focusing device. The laser beams 58 travelling through the adjusting device 45 preferably pass through a microscope with a long working distance 46. Particularly preferably, the laser radiation is adapted or adjusted or modified by the microscope with the long working distance 46 and the adjusting device 45 so that the modification 14 is generated at the predefined position. It is in this case conceivable for the modification 14 to be generated at a position which, for example, deviates or is at a distance from the predefined position by less than 5 μm or preferably less than 2 μm and particularly preferably less than 1 μm. The adjusting device 45 is preferably driven by means of a control device 32, preferably calculating or determining or using the relative position and orientation of the solid 4 relative to the laser application device 12 or the distance of the current surface fraction, into which laser radiation is intended to be introduced, from the laser application device 12 as well as the local refractive index or average refractive index of the solid material and the processing depth of the solid 4 at the respective position for adjustment of the laser application device 12, in particular at least the adjusting device 45. The control device 32 may record or receive the required data in real time by corresponding sensor devices or sensor means connected in communication therewith. As an alternative, however, it is likewise conceivable that, for example, for one or both of the parameters refractive index and processing depth before the start of processing, an analysis of the surface through which the laser beams 58 enter the solid 4 in order to generate the modifications 14 is carried out or performed. The parameters may then be held or input into a memory device or a data memory D in the form of corresponding position-dependent data. The data memory D may in this case be a part of the laser application device 12 as a replaceable medium, in particular a memory card, or as a permanently installed memory.

As an alternative, however, it is likewise conceivable for the data memory to be arranged outside the laser application device 12 and to be connectable at least temporarily in communication with the laser application device 12. In addition or as an alternative, working procedures or changes in the working procedure may be specified to the control device 32 by a user 49. It is furthermore conceivable for the data memory or the database D to be configured as a constituent of the control device 32. In addition or as an alternative, distance data for the distance between predetermined surface points of the solid 4 and the laser application device 12 may be recorded by means of a sensor device 17. These distance data are preferably likewise provided to the control device 32 for processing.

It is furthermore conceivable for the laser application device 12 to comprise a camera 35, in particular a coaxial focus camera. The camera 35 is preferably arranged in the direction of the beam path of the laser beams 58 emerging from the laser processing device 12. It is in this case conceivable for an optical element 360, in particular a partially transparent mirror, to be arranged in the optical field of the camera 35. Preferably, the laser beam 58 is introduced into the optical field of the camera by the optical element 35.

It is furthermore conceivable for a further optical element 380, or a diffractive optical element, in particular a beam splitter 380, to be provided. By the beam splitter 380, in this case a part of the laser beam 58 may be diverted or separated from the main beam. Furthermore, the separated or diverted fraction of the laser beam may be modified by an optional spherical aberration compensation 400 and/or by an optional beam expansion 420 or ray expander.

Furthermore, the reference 48 denotes a preferably provided fluid provision device 48, in particular for providing a cooling fluid. Preferably, a heat treatment, in particular cooling, of the solid 4 and/or of the microscope may be carried out by means of the fluid provision device 48.

The reference 50 denotes a refractive index determination means which may preferably also analyse transparent and reflective surfaces. Preferably, the refractive index determination is carried out with the refractive index determination means 50 in advance of the modification generation. As an alternative, it is in this case conceivable for the refractive index determination to be carried out on a different facility and for the recorded data to be delivered to the present laser application device 12 by means of data transfer.

The dotted lines represented in FIG. 19 with an arrowhead in this case preferably denote data and/or signal transmissions.

| | List of References |
|---|---|
| 2 | wafer |
| 3 | polymer layer |
| 4 | donor substrate |
| 6 | analysis device |
| 12 | laser device |
| 14 | modification |
| 15 | separating position generated by modification |
| 16 | separating region |
| 17 | sensor device |
| 18 | separating device |
| 20 | allocation means |
| 22 | transport device |
| 24 | measuring device (preferably for recording the final thickness of the wafer) |
| 25 | modification measuring device |
| 26 | surface preparation device |
| 27 | measuring device for determining the surface properties of the exposed surface of the donor substrate after the separating step |
| 29 | wafer surface treatment device |
| 30 | main surface |
| 31 | laser beam source |
| 32 | processor device/control device |
| 34 | feed device/removal device |
| 35 | camera |
| 36 | cleaning device |
| 37 | gap |
| 38 | coupling element |
| 39 | tensile element |
| 40 | production facility |
| 41 | first production unit |
| 42 | second production unit |
| 43 | third production unit |
| 44 | fourth production unit |
| 45 | adjusting device |
| 46 | distance |
| 48 | fluid provision device |
| 49 | user |
| 50 | refractive index determination means |
| 51 | camera |
| 52 | measuring objective |
| 53 | objective |
| 54 | focus adjuster |
| 55 | adjustment pin |
| 56 | deviating mirror |
| 57 | distance sensor |
| 58 | laser radiation |
| 59 | air bearing |
| 61 | regulated air gap |
| 62 | clamping apparatus |

List of References

| | |
|---|---|
| 63 | working table |
| 64 | workpiece holder/donor substrate holder |
| 65 | immersion objective |
| 66 | immersion liquid |
| 67 | splitting with planarization margin |
| 68 | splitting without planarization margin |
| 69 | additional productivity |
| 70 | planarization margin |
| 71 | wafer 1 |
| 72 | wafer 2 |
| 77 | wafer 7 |
| 78 | wafer 8 |
| 79 | wafer 9 |
| 80 | doping spot with high optical density |
| 81 | further doping spot |
| 82 | analysis direction |
| 83 | bearing device surface |
| 90 | laser radiation outside the donor substrate |
| 91 | laser radiation inside the donor substrate without doping spot |
| 92 | laser radiation inside the donor substrate with doping spot |
| 93 | modification position without doping spot |
| 94 | modification position with doping spot |
| 95 | modification position with conventional autofocus |
| 96 | modification position with refractive index-compensated autofocus |
| 100 | heating radiator |
| 101 | height adjustment |
| 102 | vacuum valve |
| 103 | polymer layer/splitting film on carrier film in frame |
| 104 | film base |
| 105 | roll laminator |
| 106 | linear plasma source |
| 107 | stock roll |
| 108 | carrier film |
| 109 | carrier film roll |
| 110 | (hot) lamination roll |
| 111 | displacement table |
| 112 | linear plasma source |
| 120 | further laser device |
| 121 | laser beam source |
| 150 | force generation device of the separating device |
| 180 | further separating device |
| 181 | application device preferably laminating device |
| 185 | pressing device |
| 186 | displacement part of the pressing device |
| 187 | pressure application element |
| 188 | heat treatment device |
| 189 | functional fluid |
| 190 | contact position between the pressure application element and polymer layer |
| 190 | heating device |
| 260 | further surface preparation device |
| 270 | measuring device for determining the surface properties of the exposed surface of the wafer after the separating step |
| 360 | optical element |
| 380 | beam splitter |
| 400 | aberration compensation |
| 420 | beam expansion |
| 600 | data of the analysis device |
| 601 | data of the modification measuring device or modification measurement data |
| 602 | data of the measuring device for determining the surface properties of the exposed surface of the donor substrate after the separating step |
| 603 | data of the measuring device (preferably for recording the final thickness of the wafer) |
| 604 | data of the measuring device for determining the surface properties of the exposed surface of the wafer after the separating step |
| A1 | delivery of the donor substrate/raw material (boule/ingot, etc.) |
| A2 | surface treatment, in particular surface optimization |
| A3 | surface optimization |
| | laser treatment, in particular generation of modifications inside the donor substrate |
| A4 | provision of the polymer layer, in particular as a film |
| A5 | application or generation of the polymer layer on the main surface of the donor substrate |
| A6 | carrying out the separating step, in particular by introducing an external force, in particular by means of cold splitting |
| A7 | handling of the separated wafer with the film applied thereon |
| B1 | delivery of the donor substrate/raw material (boule/ingot, etc.) |
| B2 | surface treatment, in particular surface optimization |
| B3 | carrying out an analysis of the donor substrate, in particular by means of the analysis device |
| B4 | laser treatment, in particular generation of modifications inside the donor substrate |
| B5 | surface treatment of the donor substrate, in particular cleaning and/or activation of the main surface of the donor substrate, in particular with a cleaning and/or activation device |
| B6 | provision of the polymer layer, in particular as a film |
| B7 | application or generation of the polymer layer on the main surface of the donor substrate, in particular also curing of the polymer layer preferably provided as a film |
| B8 | carrying out the separating step, in particular by introducing an external force, in particular by means of cold splitting |
| B9 | heat treatment of the remaining donor substrate, in particular heating, in particular by means of the heat treatment device 188 |
| B10 | handling of the separated wafer with the film applied thereon |
| C1 | delivery of the donor substrate/raw material (boule/ingot, etc.) |
| C2 | surface treatment, in particular surface optimization |
| C3 | carrying out an analysis of the donor substrate, in particular by means of the analysis device |
| C4 | measuring and/or analyzing the separated wafer |
| C5 | laser treatment, in particular generation of modifications inside the donor substrate |
| C6 | surface treatment of the donor substrate, in particular cleaning and/or activation of the main surface |

List of References

| | |
|---|---|
| | of the donor substrate, in particular with a cleaning and/or activation device |
| C7 | provision of the polymer layer, in particular as a film |
| C8 | application or generation of the polymer layer on the main surface of the donor substrate, in particular also curing of the polymer layer preferably provided as a film |
| C9 | carrying out the separating step, in particular by introducing an external force, in particular by means of cold splitting |
| C10 | heat treatment of the remaining donor substrate, in particular heating, in particular by means of the heat treatment device 188 |
| C11 | separating the polymer layer from the wafer |
| C12 | further treatment of the removed polymer layer |
| D | database |
| D2 | provision of process parameters specifically for the donor substrate and the wafer respectively to be separated |
| D5 | donor substrate process data for driving the laser device |
| D6 | donor substrate process data for driving the cleaning and/or activation device |
| D8 | donor substrate process data for driving the application device, in particular laminating device |
| D9 | donor substrate process data for driving the separating device |
| D11 | donor substrate process data for driving a device for removing the film |
| E1 | delivery of the donor substrate/raw material (boule/ingot, etc.) |
| E2 | surface treatment, in particular surface optimization |
| E3 | carrying out an analysis of the donor substrate, in particular by means of the analysis device |
| E4 | laser treatment, in particular generation of modifications inside the donor substrate |
| E5 | surface treatment of the donor substrate, in particular cleaning and/or activation of the main surface of the donor substrate, in particular with a cleaning and/or activation device |
| E6 | provision of the polymer layer, in particular as a film |
| E7 | application or generation of the polymer layer on the main surface of the donor substrate, in particular also curing of the polymer layer preferably provided as a film |
| E8 | carrying out the separating step, in particular by introducing an external force, in particular by means of cold splitting |
| E9 | heat treatment of the remaining donor substrate, in particular heating, in particular by means of the heat treatment device 188 |
| E10 | carrying out a surface treatment, in particular removing material, in particular removing modified fractions for stress relief |
| E11 | separating the polymer layer from the wafer |
| E12 | further treatment of the removed polymer layer, in particular recycling |
| E13 | material recycling/waste |
| E14 | provision of the wafer |
| F1 | delivery of the donor substrate/raw material (boule/ingot, etc.) |
| F2 | surface treatment, in particular surface optimization |
| F3 | carrying out an analysis of the donor substrate, in particular by means of the analysis device |
| F4 | laser treatment, in particular generation of modifications inside the donor substrate |
| F5 | treatment of the donor substrate by means of a presplitting tool, in particular for edge preparation, in particular by means of a grinding mark tool or laser cutter |
| F6 | surface treatment of the donor substrate, in particular cleaning and/or activation of the main surface of the donor substrate, in particular with a cleaning and/or activation device |
| F7 | provision of the polymer layer, in particular as a film |
| F8 | application or generation of the polymer layer on the main surface of the donor substrate, in particular also curing of the polymer layer preferably provided as a film |
| F9 | carrying out the separating step, in particular by introducing an external force, in particular by means of cold splitting |
| F10 | heat treatment of the remaining donor substrate, in particular heating, in particular by means of the heat treatment device 188 |
| F11 | carrying out a surface treatment, in particular removing material, in particular removing modified fractions for stress relief |
| F12 | separating the polymer layer from the wafer |
| F13 | further treatment of the removed polymer layer, in particular recycling |
| F14 | material recycling/waste |
| F15 | provision of the wafer |
| M | provision of measurement data and/or analysis data to the database |
| Z | tensile force |

What is claimed is:

1. A method for separating wafers from donor substrates, the method comprising:
    determining at least one individual property of a respective donor substrate, the at least one individual property comprising doping and/or crystal lattice dislocations of the respective donor substrate;
    generating a donor substrate process data for the respective donor substrate, the donor substrate process data comprising analysis data that describes the at least one individual property of the respective donor substrate;
    generating, via a laser device, modifications inside the respective donor substrate to form a separating region inside the respective donor substrate, the laser device being operable as a function of the donor substrate process data of the respective donor substrate; and
    generating mechanical stresses inside the respective donor substrate to initiate and/or guide a crack for separating at least one wafer from the respective donor substrate.

2. The method of claim 1, further comprising:
recording a wafer process data or associating wafer process data, respectively, with at least one specific wafer separated from the respective donor substrate,
wherein the wafer process data comprises at least parts of the analysis data generated for the respective donor wafer from which the at least one specific wafer was separated.

3. The method of claim 2, wherein the wafer process data additionally comprise position data describing a position of the at least one wafer in the respective donor substrate, and/or a measurement data comprising a thickness of the at least one specific wafer separated from the respective donor substrate.

4. The method of claim 1, further comprising:
moving the respective donor substrate reduced by separating the at least one wafer to an analysis device to determine the at least one property again,
wherein the donor substrate process data is allocable to a specific donor substrate being modified by a newly recorded analysis data.

5. The method of claim 1, further comprising:
generating measurement data that describes a thickness of the at least one wafer separated from the respective donor substrate,
wherein the measurement data is processable as a fraction of the donor substrate process data,
wherein a refractive index determination is performable by means of the donor substrate process data used to separate a specific wafer and the measurement data of the specific wafer, to determine refractive index data for adapting the donor substrate process data for generating modifications again inside the specific donor substrate.

6. The method of claim 1, further comprising:
preparing a surface of the respective donor substrate exposed by separating the at least one wafer from the respective donor substrate; and
generating preparation data that describes a material fraction eroded during the preparation of the surface of the respective donor substrate.

7. The method of claim 1, wherein the preparation data describes an average thickness of an eroded material fraction and/or a surface roughness.

8. The method of claim 1, wherein the respective donor substrate comprises a crystalline material having crystal lattice planes which are inclined with respect to a planar main surface, the planar main surface bounding the respective donor substrate on one side in a longitudinal direction of the donor substrate, and a crystal lattice plane normal being inclined in a first direction relative to a main surface normal, the method further comprising:
introducing, via the laser device, laser radiation into an interior of the respective donor substrate through the main surface to modify material properties of the donor substrate in a region of at least one laser focus, the laser focus being formable by laser beams emitted by the laser device; and
moving the donor substrate with respect to the laser device to vary the material property and vary a penetration position of the laser radiation into the donor substrate, such that a linear configuration is formable in the respective donor substrate by the variation of the material property and by the variation of a penetration position of the laser radiation into the donor substrate,
wherein the variations of the material property are generated on at least one generation plane in the respective donor substrate,
wherein the crystal lattice planes of the respective donor substrate are aligned with an inclination relative to the generation plane,
wherein the linear configuration is inclined relative to a line of intersection resulting at an intersection between the generation plane and the crystal lattice plane,
wherein the donor substrate cracks in the form of subcritical cracks because of the varied material property.

9. The method of claim 1, wherein the generating mechanical stresses comprises:
applying a layer comprising at least one polymer material onto the respective donor substrate;
pressing at least in sections or fully onto the layer comprising the at least one polymer material; and
cooling the layer of at least one polymer material which is arranged on the respective donor substrate and to which pressure is applied.

10. The method of claim 9, further comprising:
providing a layer data relating to at least one parameter of the layer comprising at least one polymer material.

11. The method of claim 10, wherein the layer data comprises material composition and/or layer thickness.

12. The method of claim 9, wherein the pressing is performed in accordance with pressing force data.

13. The method of claim 12, wherein the pressing force data comprises a pressing force on the layer comprising at least one polymer material per unit area and/or a force distribution over an area of the pressing force.

14. The method of claim 9, wherein the cooling is performed in accordance with heat treatment data.

15. The method of claim 14, wherein the heat treatment data comprises a temperature of the layer comprising the at least one polymer at an instant of crack initiation and/or crack propagation.

16. The method of claim 1, further comprising:
modifying the donor substrate process data, predefined supplementing data and/or adaptation of donor substrate process starting data by means of at least two types of data brought about by the modification of the donor substrate process data to adapt at least one operating parameter of the laser device, the at least two types of data being selected from a group of data which comprises analysis data, measurement data, refractive index data and/or preparation data.

17. The method of claim 16, wherein the at least one operating parameter of the laser device comprises focal depth and/or laser energy.

18. The method of claim 16, further comprising:
adapting the at least one operating parameter as a function of the at least two types of data based on a specific wafer separation; and
adapting the at least one operating parameter of the laser device for all or for more than 25% of all wafers separated from a specific donor substrate to reduce a planarization margin.

* * * * *